(12) United States Patent
Waldern et al.

(10) Patent No.: US 12,092,914 B2
(45) Date of Patent: Sep. 17, 2024

(54) SYSTEMS AND METHODS FOR MANUFACTURING WAVEGUIDE CELLS

(71) Applicant: DigiLens Inc., Sunnyvale, CA (US)

(72) Inventors: Jonathan David Waldern, Diablo, CA (US); Ratson Morad, Palo Alto, CA (US); Alastair John Grant, San Jose, CA (US); Sihui He, Sunnyvale, CA (US); Shibu Abraham, Sunnyvale, CA (US); Milan Momcilo Popovich, Leicester (GB)

(73) Assignee: DigiLens Inc., Sunnyvale, CA (US)

( * ) Notice: Subject to any disclaimer, the term of this patent is extended or adjusted under 35 U.S.C. 154(b) by 641 days.

(21) Appl. No.: 17/136,884

(22) Filed: Dec. 29, 2020

(65) Prior Publication Data

US 2021/0223585 A1    Jul. 22, 2021

Related U.S. Application Data

(63) Continuation of application No. 16/203,071, filed on Nov. 28, 2018, now abandoned.
(Continued)

(51) Int. Cl.
*G02F 1/13*     (2006.01)
*B05C 5/00*     (2006.01)
(Continued)

(52) U.S. Cl.
CPC ............ *G02F 1/1326* (2013.01); *B05C 5/004* (2013.01); *B05C 5/0204* (2013.01);
(Continued)

(58) Field of Classification Search
CPC ..... B05C 5/004; B05C 5/0204; B05C 5/0291; B05C 5/0295; G03H 1/00; G03H 1/02;
(Continued)

(56) References Cited

U.S. PATENT DOCUMENTS 1,043,938 A   11/1912   Huttenlocher
2,141,884 A   12/1938   Sonnefeld
(Continued)

FOREIGN PATENT DOCUMENTS

BR   PI0720469 A2   1/2014
CA   2889727 A1   6/2014
(Continued)

OTHER PUBLICATIONS

European search report for EP18898841.4.*
(Continued)

*Primary Examiner* — Sonya M Sengupta

(57) ABSTRACT

Systems for the manufacturing of waveguide cells in accordance with various embodiments can be configured and implemented in many different ways. In many embodiments, various deposition mechanisms are used to deposit layer(s) of optical recording material onto a transparent substrate. A second transparent substrate can be provided, and the three layers can be laminated to form a waveguide cell. Suitable optical recording material can vary widely depending on the given application. In some embodiments, the optical recording material deposited has a similar composition throughout the layer. In a number of embodiments, the optical recording material spatially varies in composition, allowing for the formation of optical elements with varying characteristics. Regardless of the composition of the optical recording material, any method of placing or depositing the optical recording material onto a substrate can be utilized.

14 Claims, 14 Drawing Sheets

Related U.S. Application Data

(60) Provisional application No. 62/703,329, filed on Jul. 25, 2018, provisional application No. 62/667,891, filed on May 7, 2018, provisional application No. 62/663,864, filed on Apr. 27, 2018, provisional application No. 62/614,813, filed on Jan. 8, 2018, provisional application No. 62/614,831, filed on Jan. 8, 2018, provisional application No. 62/614,932, filed on Jan. 8, 2018.

(51) Int. Cl.
| | |
|---|---|
| *B05C 5/02* | (2006.01) |
| *B29D 11/00* | (2006.01) |
| *B82Y 20/00* | (2011.01) |
| *G02B 5/18* | (2006.01) |
| *G02B 5/30* | (2006.01) |
| *G02B 6/12* | (2006.01) |
| *G02B 6/122* | (2006.01) |
| *G02B 6/13* | (2006.01) |
| *G02B 27/00* | (2006.01) |
| *G02B 27/01* | (2006.01) |
| *G02B 27/09* | (2006.01) |
| *G03H 1/00* | (2006.01) |

(52) U.S. Cl.
CPC .......... *B05C 5/0291* (2013.01); *B05C 5/0295* (2013.01); *B29D 11/0074* (2013.01); *B29D 11/00769* (2013.01); *B82Y 20/00* (2013.01); *G02B 5/1828* (2013.01); *G02B 5/1857* (2013.01); *G02B 6/122* (2013.01); *G02B 6/13* (2013.01); *G02B 27/0081* (2013.01); *G02B 27/0172* (2013.01); *G02B 27/0944* (2013.01); *G03H 1/00* (2013.01); *G02B 5/1871* (2013.01); *G02B 5/3016* (2013.01); *G02B 2006/12107* (2013.01); *G02B 2006/12116* (2013.01); *G02B 2006/12166* (2013.01); *G02B 2207/101* (2013.01)

(58) Field of Classification Search
CPC ............. G03H 1/0248; G03H 2260/34; G02B 2006/12107; G02B 2006/12116; G02B 2006/12166; G02B 2207/101; G02B 27/0081; G02B 27/0172; G02B 27/0944; G02B 5/1828; G02B 5/1857; G02B 5/1871; G02B 5/3016; G02B 6/122; G02B 6/13; G02F 1/1326; B82Y 20/00; B29D 11/00682; B29D 11/0074; B29D 11/00769

See application file for complete search history.

(56) References Cited

U.S. PATENT DOCUMENTS

| | | |
|---|---|---|
| 3,482,498 A | 12/1969 | Becker |
| 3,620,601 A | 11/1971 | Leonard et al. |
| 3,741,716 A | 6/1973 | Johne et al. |
| 3,843,231 A | 10/1974 | Borel et al. |
| 3,851,303 A | 11/1974 | Muller |
| 3,885,095 A | 5/1975 | Wolfson et al. |
| 3,940,204 A | 2/1976 | Withrington |
| 3,965,029 A | 6/1976 | Arora |
| 3,975,711 A | 8/1976 | McMahon |
| 3,993,399 A | 11/1976 | Jacoby et al. |
| 4,035,068 A | 7/1977 | Rawson |
| 4,066,334 A | 1/1978 | Fray et al. |
| 4,082,432 A | 4/1978 | Kirschner |
| 4,099,841 A | 7/1978 | Ellis |
| 4,133,152 A | 1/1979 | Penrose |
| 4,178,074 A | 12/1979 | Heller |
| 4,218,111 A | 8/1980 | Withrington et al. |
| 4,232,943 A | 11/1980 | Rogers |
| 4,248,093 A | 2/1981 | Andersson et al. |
| 4,251,137 A | 2/1981 | Knop et al. |
| 4,309,070 A | 1/1982 | St. Leger Searle |
| 4,322,163 A | 3/1982 | Schiller |
| 4,386,361 A | 5/1983 | Simmonds |
| 4,389,612 A | 6/1983 | Simmonds et al. |
| 4,403,189 A | 9/1983 | Simmonds |
| 4,418,993 A | 12/1983 | Lipton |
| 4,472,037 A | 9/1984 | Lipton |
| 4,523,226 A | 6/1985 | Lipton et al. |
| 4,544,267 A | 10/1985 | Schiller |
| 4,562,463 A | 12/1985 | Lipton |
| 4,566,758 A | 1/1986 | Bos et al. |
| 4,583,117 A | 4/1986 | Lipton et al. |
| 4,643,515 A | 2/1987 | Upatnieks |
| 4,647,967 A | 3/1987 | Kirschner et al. |
| 4,688,900 A | 8/1987 | Doane et al. |
| 4,711,512 A | 12/1987 | Upatnieks |
| 4,714,320 A | 12/1987 | Banbury |
| 4,728,547 A | 3/1988 | Vaz et al. |
| 4,729,640 A | 3/1988 | Sakata et al. |
| 4,743,083 A | 5/1988 | Schimpe |
| 4,749,256 A | 6/1988 | Bell et al. |
| 4,765,703 A | 8/1988 | Suzuki et al. |
| 4,775,218 A | 10/1988 | Wood et al. |
| 4,791,788 A | 12/1988 | Simmonds et al. |
| 4,792,850 A | 12/1988 | Liptoh et al. |
| 4,799,765 A | 1/1989 | Ferrer |
| 4,811,414 A | 3/1989 | Fishbine et al. |
| 4,848,093 A | 7/1989 | Simmonds et al. |
| 4,854,688 A | 8/1989 | Hayford et al. |
| 4,860,294 A | 8/1989 | Winzer et al. |
| 4,884,876 A | 12/1989 | Lipton et al. |
| 4,890,902 A | 1/1990 | Doane et al. |
| 4,928,301 A | 5/1990 | Smoot |
| 4,933,976 A | 6/1990 | Fishbine et al. |
| 4,938,568 A | 7/1990 | Margerum et al. |
| 4,946,245 A | 8/1990 | Chamberlin et al. |
| 4,960,311 A | 10/1990 | Moss et al. |
| 4,964,701 A | 10/1990 | Dorschner et al. |
| 4,967,268 A | 10/1990 | Lipton et al. |
| 4,970,129 A | 11/1990 | Ingwall et al. |
| 4,971,719 A | 11/1990 | Vaz et al. |
| 4,994,204 A | 2/1991 | Doane et al. |
| 5,004,323 A | 4/1991 | West |
| 5,007,711 A | 4/1991 | Wood et al. |
| 5,009,483 A | 4/1991 | Rockwell et al. |
| 5,011,624 A | 4/1991 | Yamagishi et al. |
| 5,016,953 A | 5/1991 | Moss et al. |
| 5,033,814 A | 7/1991 | Brown et al. |
| 5,035,734 A | 7/1991 | Honkanen et al. |
| 5,053,834 A | 10/1991 | Simmonds |
| 5,063,441 A | 11/1991 | Lipton et al. |
| 5,076,664 A | 12/1991 | Migozzi |
| 5,079,416 A | 1/1992 | Filipovich |
| 5,096,282 A | 3/1992 | Margerum et al. |
| 5,099,343 A | 3/1992 | Margerum et al. |
| 5,109,465 A | 4/1992 | Klopotek |
| 5,110,034 A | 5/1992 | Simmonds et al. |
| 5,117,285 A | 5/1992 | Nelson et al. |
| 5,117,302 A | 5/1992 | Lipton |
| 5,119,454 A | 6/1992 | McMahon et al. |
| 5,124,821 A | 6/1992 | Antier et al. |
| 5,138,687 A | 8/1992 | Horie et al. |
| 5,139,192 A | 8/1992 | Simmonds et al. |
| 5,142,357 A | 8/1992 | Lipton et al. |
| 5,142,644 A | 8/1992 | Vansteenkiste et al. |
| 5,148,302 A | 9/1992 | Nagano et al. |
| 5,150,234 A | 9/1992 | Takahashi et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,181,133 A | 1/1993 | Lipton |
| 5,183,545 A | 2/1993 | Branca et al. |
| 5,187,597 A | 2/1993 | Kato et al. |
| 5,193,000 A | 3/1993 | Lipton et al. |

(56) References Cited

U.S. PATENT DOCUMENTS

| | | |
|---|---|---|
| 5,198,912 A | 3/1993 | Ingwall et al. |
| 5,198,914 A | 3/1993 | Arns |
| 5,200,861 A | 4/1993 | Moskovich et al. |
| 5,210,624 A | 5/1993 | Matsumoto et al. |
| 5,218,360 A | 6/1993 | Goetz et al. |
| 5,218,480 A | 6/1993 | Moskovich et al. |
| 5,224,198 A | 6/1993 | Jachimowicz et al. |
| 5,225,918 A | 7/1993 | Taniguchi et al. |
| 5,239,372 A | 8/1993 | Lipton |
| 5,240,636 A | 8/1993 | Doane et al. |
| 5,241,337 A | 8/1993 | Betensky et al. |
| 5,242,476 A | 9/1993 | Bartel et al. |
| 5,243,413 A | 9/1993 | Gitlin et al. |
| 5,251,048 A | 10/1993 | Doane et al. |
| 5,264,950 A | 11/1993 | West et al. |
| 5,268,792 A | 12/1993 | Kreitzer et al. |
| 5,284,499 A | 2/1994 | Harvey et al. |
| 5,289,315 A | 2/1994 | Makita et al. |
| 5,295,208 A | 3/1994 | Caulfield et al. |
| 5,296,967 A | 3/1994 | Moskovich et al. |
| 5,299,289 A | 3/1994 | Omae et al. |
| 5,303,085 A | 4/1994 | Rallison |
| 5,306,923 A | 4/1994 | Kazmierski et al. |
| 5,309,283 A | 5/1994 | Kreitzer et al. |
| 5,313,330 A | 5/1994 | Betensky |
| 5,315,324 A | 5/1994 | Kubelik et al. |
| 5,315,419 A | 5/1994 | Saupe et al. |
| 5,315,440 A | 5/1994 | Betensky et al. |
| 5,317,405 A | 5/1994 | Kuriki et al. |
| 5,327,269 A | 7/1994 | Tilton et al. |
| 5,329,363 A | 7/1994 | Moskovich et al. |
| 5,341,230 A | 8/1994 | Smith |
| 5,343,147 A | 8/1994 | Sager et al. |
| 5,351,151 A | 9/1994 | Levy |
| 5,359,362 A | 10/1994 | Lewis et al. |
| 5,363,220 A | 11/1994 | Kuwayama et al. |
| 5,368,770 A | 11/1994 | Saupe et al. |
| 5,369,511 A | 11/1994 | Amos |
| 5,371,626 A | 12/1994 | Betensky |
| 5,400,069 A | 3/1995 | Braun et al. |
| 5,408,346 A | 4/1995 | Trissel et al. |
| 5,410,370 A | 4/1995 | Janssen |
| 5,416,510 A | 5/1995 | Lipton et al. |
| 5,416,514 A | 5/1995 | Janssen et al. |
| 5,418,584 A | 5/1995 | Larson |
| 5,418,871 A | 5/1995 | Revelli et al. |
| 5,428,480 A | 6/1995 | Betensky et al. |
| 5,437,811 A | 8/1995 | Doane et al. |
| 5,438,357 A | 8/1995 | McNelley |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,463,428 A | 10/1995 | Lipton et al. |
| 5,465,311 A | 11/1995 | Caulfield et al. |
| 5,471,326 A | 11/1995 | Hall et al. |
| 5,473,222 A | 12/1995 | Thoeny et al. |
| 5,476,611 A | 12/1995 | Nolan et al. |
| 5,481,321 A | 1/1996 | Lipton |
| 5,485,313 A | 1/1996 | Betensky |
| 5,493,430 A | 2/1996 | Lu et al. |
| 5,493,448 A | 2/1996 | Betensky et al. |
| 5,496,621 A | 3/1996 | Makita et al. |
| 5,499,118 A | 3/1996 | Wreede et al. |
| 5,499,140 A | 3/1996 | Betensky |
| 5,500,671 A | 3/1996 | Andersson et al. |
| 5,500,769 A | 3/1996 | Betensky |
| 5,510,913 A | 4/1996 | Hashimoto et al. |
| 5,515,184 A | 5/1996 | Caulfield et al. |
| 5,516,455 A | 5/1996 | Jacobine et al. |
| 5,524,272 A | 6/1996 | Podowski et al. |
| 5,528,720 A | 6/1996 | Winston et al. |
| 5,530,566 A | 6/1996 | Kumar |
| 5,532,736 A | 7/1996 | Kuriki et al. |
| 5,532,875 A | 7/1996 | Betemsky |
| 5,537,232 A | 7/1996 | Biles |
| RE35,310 E | 8/1996 | Moskovich |
| 5,543,950 A | 8/1996 | Lavrentovich et al. |
| 5,559,637 A | 9/1996 | Moskovich et al. |
| 5,572,248 A | 11/1996 | Allen et al. |
| 5,572,250 A | 11/1996 | Lipton et al. |
| 5,576,888 A | 11/1996 | Betensky |
| 5,579,026 A | 11/1996 | Tabata |
| 5,583,795 A | 12/1996 | Smyth |
| 5,585,035 A | 12/1996 | Nerad et al. |
| 5,593,615 A | 1/1997 | Nerad et al. |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,614 A | 9/1997 | Chien et al. |
| 5,668,907 A | 9/1997 | Veligdan |
| 5,677,797 A | 10/1997 | Betensky et al. |
| 5,680,231 A | 10/1997 | Grinberg et al. |
| 5,680,411 A | 10/1997 | Ramdane et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,694,230 A | 12/1997 | Welch |
| 5,695,682 A | 12/1997 | Doane et al. |
| 5,701,132 A | 12/1997 | Kollin et al. |
| 5,706,108 A | 1/1998 | Ando et al. |
| 5,706,136 A | 1/1998 | Okuyama et al. |
| 5,707,925 A | 1/1998 | Akada et al. |
| 5,710,645 A | 1/1998 | Phillips et al. |
| 5,724,189 A | 3/1998 | Ferrante |
| 5,724,463 A | 3/1998 | Deacon et al. |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,760,931 A | 6/1998 | Saburi et al. |
| 5,764,414 A | 6/1998 | King et al. |
| 5,790,288 A | 8/1998 | Jager et al. |
| 5,790,314 A | 8/1998 | Duck et al. |
| 5,798,641 A | 8/1998 | Spagna et al. |
| 5,804,609 A | 9/1998 | Ohnishi et al. |
| 5,808,804 A | 9/1998 | Moskovich |
| 5,812,608 A | 9/1998 | Valimaki et al. |
| 5,822,089 A | 10/1998 | Phillips et al. |
| 5,822,127 A | 10/1998 | Chen et al. |
| 5,825,448 A | 10/1998 | Bos et al. |
| 5,831,700 A | 11/1998 | Li et al. |
| 5,835,661 A | 11/1998 | Tai et al. |
| 5,841,507 A | 11/1998 | Barnes |
| 5,841,587 A | 11/1998 | Moskovich et al. |
| 5,847,787 A | 12/1998 | Fredley et al. |
| 5,856,842 A | 1/1999 | Tedesco |
| 5,857,043 A | 1/1999 | Cook et al. |
| 5,867,238 A | 2/1999 | Miller et al. |
| 5,867,618 A | 2/1999 | Ito et al. |
| 5,868,951 A | 2/1999 | Schuck, III et al. |

(56) References Cited

U.S. PATENT DOCUMENTS

| | | |
|---|---|---|
| 5,870,228 A | 2/1999 | Kreitzer et al. |
| 5,875,012 A | 2/1999 | Crawford et al. |
| 5,877,826 A | 3/1999 | Yang et al. |
| 5,886,822 A | 3/1999 | Spitzer |
| 5,892,598 A | 4/1999 | Asakawa et al. |
| 5,892,599 A | 4/1999 | Bahuguna |
| 5,898,511 A | 4/1999 | Mizutani et al. |
| 5,900,987 A | 5/1999 | Kreitzer et al. |
| 5,900,989 A | 5/1999 | Kreitzer |
| 5,903,395 A | 5/1999 | Rallison et al. |
| 5,903,396 A | 5/1999 | Rallison |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,949,508 A | 9/1999 | Kumar et al. |
| 5,956,113 A | 9/1999 | Crawford |
| 5,962,147 A | 10/1999 | Shalhub et al. |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |
| 5,973,727 A | 10/1999 | McGrew et al. |
| 5,974,162 A | 10/1999 | Metz et al. |
| 5,985,422 A | 11/1999 | Krauter |
| 5,986,746 A | 11/1999 | Metz et al. |
| 5,991,087 A | 11/1999 | Rallison |
| 5,999,089 A | 12/1999 | Carlson et al. |
| 5,999,282 A | 12/1999 | Suzuki et al. |
| 5,999,314 A | 12/1999 | Asakura et al. |
| 6,014,187 A | 1/2000 | Taketomi et al. |
| 6,023,375 A | 2/2000 | Kreitzer |
| 6,042,947 A | 3/2000 | Asakura et al. |
| 6,043,585 A | 3/2000 | Plessky et al. |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,069,728 A | 5/2000 | Huignard et al. |
| 6,075,626 A | 6/2000 | Mizutani et al. |
| 6,078,427 A | 6/2000 | Fontaine et al. |
| 6,094,311 A | 7/2000 | Moskovich |
| 6,097,551 A | 8/2000 | Kreitzer |
| 6,104,448 A | 8/2000 | Doane et al. |
| 6,107,943 A | 8/2000 | Schroeder |
| 6,115,152 A | 9/2000 | Popovich et al. |
| 6,118,908 A | 9/2000 | Bischel et al. |
| 6,121,899 A | 9/2000 | Theriault |
| 6,127,066 A | 10/2000 | Ueda et al. |
| 6,128,058 A | 10/2000 | Walton et al. |
| 6,133,971 A | 10/2000 | Silverstein et al. |
| 6,133,975 A | 10/2000 | Li et al. |
| 6,137,630 A | 10/2000 | Tsou et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,156,243 A | 12/2000 | Kosuga et al. |
| 6,167,169 A | 12/2000 | Brinkman et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,176,837 B1 | 1/2001 | Foxlin |
| 6,185,016 B1 | 2/2001 | Popovich |
| 6,188,462 B1 | 2/2001 | Lavrentovich et al. |
| 6,191,887 B1 | 2/2001 | Michaloski et al. |
| 6,195,206 B1 | 2/2001 | Yona et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,222,297 B1 | 4/2001 | Perdue |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,266,166 B1 | 7/2001 | Katsumata et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,285,813 B1 | 9/2001 | Schultz et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,083 B1 | 11/2001 | Johnson et al. |
| 6,317,189 B1 | 11/2001 | Yuan et al. |
| 6,317,227 B1 | 11/2001 | Mizutani et al. |
| 6,317,228 B2 | 11/2001 | Popovich et al. |
| 6,317,528 B1 | 11/2001 | Gadkaree et al. |
| 6,320,563 B1 | 11/2001 | Yang et al. |
| 6,321,069 B1 | 11/2001 | Piirainen |
| 6,323,970 B1 | 11/2001 | Popovich |
| 6,323,989 B1 | 11/2001 | Jacobson et al. |
| 6,324,014 B1 | 11/2001 | Moskovich et al. |
| 6,327,089 B1 | 12/2001 | Hosaki et al. |
| 6,330,109 B1 | 12/2001 | Ishii et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,356,674 B1 | 3/2002 | Davis et al. |
| 6,359,730 B2 | 3/2002 | Tervonen |
| 6,359,737 B1 | 3/2002 | Stringfellow |
| 6,366,281 B1 | 4/2002 | Lipton et al. |
| 6,366,369 B2 | 4/2002 | Ichikawa et al. |
| 6,366,378 B1 | 4/2002 | Tervonen et al. |
| 6,377,238 B1 | 4/2002 | McPheters |
| 6,377,321 B1 | 4/2002 | Khan et al. |
| 6,388,797 B1 | 5/2002 | Lipton et al. |
| 6,392,812 B1 | 5/2002 | Howard |
| 6,407,724 B2 | 6/2002 | Waldern et al. |
| 6,409,687 B1 | 6/2002 | Foxlin |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,437,563 B1 | 8/2002 | Simmonds et al. |
| 6,437,886 B1 | 8/2002 | Trepanier et al. |
| 6,445,512 B1 | 9/2002 | Moskovich et al. |
| 6,449,095 B1 | 9/2002 | Ohtaki et al. |
| 6,456,584 B1 | 9/2002 | Nagata et al. |
| 6,470,132 B1 | 10/2002 | Nousiainen et al. |
| 6,473,209 B1 | 10/2002 | Popovich |
| 6,476,974 B1 | 11/2002 | Kreitzer et al. |
| 6,483,303 B2 | 11/2002 | Simmonds et al. |
| 6,486,997 B1 | 11/2002 | Bruzzone et al. |
| 6,504,518 B1 | 1/2003 | Kuwayama et al. |
| 6,504,629 B1 | 1/2003 | Popovich et al. |
| 6,509,937 B1 | 1/2003 | Moskovich et al. |
| 6,518,747 B2 | 2/2003 | Sager et al. |
| 6,519,088 B1 | 2/2003 | Lipton |
| 6,522,794 B1 | 2/2003 | Bischel et al. |
| 6,522,795 B1 | 2/2003 | Jordan et al. |
| 6,524,771 B2 | 2/2003 | Maeda et al. |
| 6,529,336 B1 | 3/2003 | Kreitzer et al. |
| 6,534,977 B1 | 3/2003 | Duncan et al. |
| 6,538,775 B1 | 3/2003 | Bowley et al. |
| 6,545,778 B2 | 4/2003 | Ono et al. |
| 6,550,949 B1 | 4/2003 | Bauer et al. |
| 6,552,789 B1 | 4/2003 | Modro |
| 6,557,413 B2 | 5/2003 | Nieminen et al. |
| 6,559,813 B1 | 5/2003 | DeLuca et al. |
| 6,563,648 B2 | 5/2003 | Gleckman et al. |
| 6,563,650 B2 | 5/2003 | Moskovich et al. |
| 6,567,014 B1 | 5/2003 | Hansen et al. |
| 6,567,573 B1 | 5/2003 | Domash et al. |

(56) References Cited

U.S. PATENT DOCUMENTS

| | | |
|---|---|---|
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,583,873 B1 | 6/2003 | Goncharov et al. |
| 6,587,619 B1 | 7/2003 | Kinoshita |
| 6,594,090 B2 | 7/2003 | Kruschwitz et al. |
| 6,596,193 B2 | 7/2003 | Coates et al. |
| 6,597,176 B2 | 7/2003 | Simmonds et al. |
| 6,597,475 B1 | 7/2003 | Shirakura et al. |
| 6,598,987 B1 | 7/2003 | Parikka |
| 6,600,590 B2 | 7/2003 | Roddy et al. |
| 6,608,720 B1 | 8/2003 | Freeman |
| 6,611,253 B1 | 8/2003 | Cohen |
| 6,618,104 B1 | 9/2003 | Date et al. |
| 6,625,381 B2 | 9/2003 | Roddy et al. |
| 6,646,772 B1 | 11/2003 | Popovich et al. |
| 6,646,810 B2 | 11/2003 | Harter, Jr. et al. |
| 6,661,495 B1 | 12/2003 | Popovich |
| 6,661,578 B2 | 12/2003 | Hedrick |
| 6,667,134 B1 | 12/2003 | Sutherland et al. |
| 6,674,578 B2 | 1/2004 | Sugiyama et al. |
| 6,677,086 B1 | 1/2004 | Sutehrland et al. |
| 6,686,815 B1 | 2/2004 | Mirshekarl-Syahkal et al. |
| 6,690,516 B2 | 2/2004 | Aritake et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,714,329 B2 | 3/2004 | Sekine et al. |
| 6,721,096 B2 | 4/2004 | Bruzzone et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,741,189 B1 | 5/2004 | Gibbons, II et al. |
| 6,744,478 B1 | 6/2004 | Asakura et al. |
| 6,747,781 B2 | 6/2004 | Trisnadi et al. |
| 6,748,342 B1 | 6/2004 | Dickhaus |
| 6,750,941 B2 | 6/2004 | Satoh et al. |
| 6,750,995 B2 | 6/2004 | Dickson |
| 6,750,996 B2 | 6/2004 | Jagt et al. |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,824,929 B2 | 11/2004 | Taggi et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,844,989 B1 | 1/2005 | Jo et al. |
| 6,847,274 B2 | 1/2005 | Salmela et al. |
| 6,847,488 B2 | 1/2005 | Travis |
| 6,850,210 B1 | 2/2005 | Lipton et al. |
| 6,853,491 B1 | 2/2005 | Ruhle et al. |
| 6,853,493 B2 | 2/2005 | Kreitzer et al. |
| 6,861,107 B2 | 3/2005 | Klasen-Memmer et al. |
| 6,864,861 B2 | 3/2005 | Schehrer et al. |
| 6,864,927 B1 | 3/2005 | Cathey |
| 6,867,888 B2 | 3/2005 | Sutherland et al. |
| 6,873,443 B1 | 3/2005 | Joubert et al. |
| 6,878,494 B2 | 4/2005 | Sutehrland et al. |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,919,003 B2 | 7/2005 | Ikeda et al. |
| 6,922,267 B2 | 7/2005 | Endo et al. |
| 6,926,429 B2 | 8/2005 | Barlow et al. |
| 6,927,570 B2 | 8/2005 | Simmonds et al. |
| 6,927,694 B1 | 8/2005 | Smith et al. |
| 6,940,361 B1 | 9/2005 | Jokio et al. |
| 6,943,788 B2 | 9/2005 | Tomono |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,952,435 B2 | 10/2005 | Lai et al. |
| 6,958,662 B1 | 10/2005 | Salmela et al. |
| 6,958,868 B1 | 10/2005 | Pender |
| 6,963,454 B1 | 11/2005 | Martins et al. |
| 6,972,788 B1 | 12/2005 | Robertson et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,987,908 B2 | 1/2006 | Bond et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,003,075 B2 | 2/2006 | Miyake et al. |
| 7,003,187 B2 | 2/2006 | Frick et al. |
| 7,006,732 B2 | 2/2006 | Gunn, III et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,018,744 B2 | 3/2006 | Otaki et al. |
| 7,019,793 B2 | 3/2006 | Moskovich et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,046,439 B2 | 5/2006 | Kaminsky et al. |
| 7,053,735 B2 | 5/2006 | Salmela et al. |
| 7,053,991 B2 | 5/2006 | Sandusky |
| 7,054,045 B2 | 5/2006 | McPheters et al. |
| 7,058,434 B2 | 6/2006 | Wang et al. |
| 7,068,405 B2 | 6/2006 | Sutherland et al. |
| 7,068,898 B2 | 6/2006 | Buretea et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,095,562 B1 | 8/2006 | Peng et al. |
| 7,099,080 B2 | 8/2006 | Lipton et al. |
| 7,101,048 B2 | 9/2006 | Travis |
| 7,108,383 B1 | 9/2006 | Mitchell et al. |
| 7,110,184 B1 | 9/2006 | Yona et al. |
| 7,119,965 B1 | 10/2006 | Rolland et al. |
| 7,123,418 B2 | 10/2006 | Weber et al. |
| 7,123,421 B1 | 10/2006 | Moskovich et al. |
| 7,126,418 B2 | 10/2006 | Hunton et al. |
| 7,126,583 B1 | 10/2006 | Breed |
| 7,132,200 B1 | 11/2006 | Ueda et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,167,286 B2 | 1/2007 | Anderson et al. |
| 7,175,780 B1 | 2/2007 | Sutherland et al. |
| 7,181,105 B2 | 2/2007 | Teramura et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,190,849 B2 | 3/2007 | Katase |
| 7,198,737 B2 | 4/2007 | Natarajan et al. |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |

(56) References Cited

U.S. PATENT DOCUMENTS

| | | |
|---|---|---|
| 7,212,175 B1 | 5/2007 | Magee et al. |
| 7,230,767 B2 | 6/2007 | Walck et al. |
| 7,230,770 B2 | 6/2007 | Kreitzer et al. |
| 7,242,527 B2 | 7/2007 | Spitzer et al. |
| 7,248,128 B2 | 7/2007 | Mattila et al. |
| 7,256,915 B2 | 8/2007 | Sutherland et al. |
| 7,259,906 B1 | 8/2007 | Islam |
| 7,265,882 B2 | 9/2007 | Sutherland et al. |
| 7,265,903 B2 | 9/2007 | Sutherland et al. |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| RE39,911 E | 11/2007 | Moskovich |
| 7,299,983 B2 | 11/2007 | Piikivi |
| 7,301,601 B2 | 11/2007 | Lin et al. |
| 7,312,906 B2 | 12/2007 | Sutherland et al. |
| 7,313,291 B2 | 12/2007 | Okhotnikov et al. |
| D559,250 S | 1/2008 | Pombo |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,333,685 B2 | 2/2008 | Stone et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,369,911 B1 | 5/2008 | Volant et al. |
| 7,375,870 B2 | 5/2008 | Schorpp |
| 7,375,886 B2 | 5/2008 | Lipton et al. |
| 7,376,068 B1 | 5/2008 | Khoury |
| 7,376,307 B2 | 5/2008 | Singh et al. |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,413,678 B1 | 8/2008 | Natarajan et al. |
| 7,413,679 B1 | 8/2008 | Sutherland et al. |
| 7,415,173 B2 | 8/2008 | Kassamakov et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,433,116 B1 | 10/2008 | Islam |
| 7,436,568 B1 | 10/2008 | Kuykendall, Jr. |
| D581,447 S | 11/2008 | Yee |
| 7,447,967 B2 | 11/2008 | Onggosanusi et al. |
| 7,453,612 B2 | 11/2008 | Mukawa |
| 7,454,103 B2 | 11/2008 | Parriaux |
| 7,457,040 B2 | 11/2008 | Amitai |
| 7,466,994 B2 | 12/2008 | Pihlaja et al. |
| 7,477,206 B2 | 1/2009 | Cowan et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,499,217 B2 | 3/2009 | Cakmakci et al. |
| 7,500,104 B2 | 3/2009 | Goland |
| 7,511,891 B2 | 3/2009 | Messerschmidt |
| 7,513,668 B1 | 4/2009 | Peng et al. |
| 7,522,344 B1 | 4/2009 | Curatu et al. |
| 7,525,448 B1 | 4/2009 | Wilson et al. |
| 7,528,385 B2 | 5/2009 | Volodin et al. |
| 7,545,429 B2 | 6/2009 | Travis |
| 7,550,234 B2 | 6/2009 | Otaki et al. |
| 7,558,446 B2 | 7/2009 | Wimberger-friedl et al. |
| 7,567,372 B2 | 7/2009 | Schorpp |
| 7,570,322 B1 | 8/2009 | Sutherland et al. |
| 7,570,405 B1 | 8/2009 | Sutherland et al. |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,583,423 B2 | 9/2009 | Sutherland et al. |
| 7,587,110 B2 | 9/2009 | Singh et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,605,719 B1 | 10/2009 | Wenger et al. |
| 7,605,774 B1 | 10/2009 | Brandt et al. |
| 7,605,882 B1 | 10/2009 | Sutherland et al. |
| 7,616,270 B2 | 11/2009 | Hirabayashi et al. |
| 7,617,022 B1 | 11/2009 | Wood et al. |
| 7,618,750 B2 | 11/2009 | Ueda et al. |
| 7,619,739 B1 | 11/2009 | Sutherland et al. |
| 7,619,825 B1 | 11/2009 | Peng et al. |
| 7,629,086 B2 | 12/2009 | Otaki et al. |
| 7,639,208 B1 | 12/2009 | Ha et al. |
| 7,639,911 B2 | 12/2009 | Lee et al. |
| 7,643,214 B2 | 1/2010 | Amitai |
| 7,643,225 B1 | 1/2010 | Tsai |
| 7,656,585 B1 | 2/2010 | Powell et al. |
| 7,660,047 B1 | 2/2010 | Travis et al. |
| 7,672,055 B2 | 3/2010 | Amitai |
| 7,672,549 B2 | 3/2010 | Ghosh et al. |
| 7,691,248 B2 | 4/2010 | Ikeda et al. |
| 7,710,622 B2 | 5/2010 | Takabayashi et al. |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,571 B1 | 6/2010 | Li |
| 7,733,572 B1 | 6/2010 | Brown et al. |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,843,642 B2 | 11/2010 | Shaoulov et al. |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,866,869 B2 | 1/2011 | Karakawa |
| 7,872,707 B1 | 1/2011 | Sutherland et al. |
| 7,872,804 B2 | 1/2011 | Moon et al. |
| 7,884,593 B2 | 2/2011 | Simmonds et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,928,862 B1 | 4/2011 | Matthews |
| 7,936,519 B2 | 5/2011 | Mukawa et al. |
| 7,944,428 B2 | 5/2011 | Travis |
| 7,944,616 B2 | 5/2011 | Mukawa |
| 7,949,214 B2 | 5/2011 | DeJong et al. |
| D640,310 S | 6/2011 | Suzuki et al. |
| 7,961,117 B1 | 6/2011 | Zimmerman et al. |
| 7,969,644 B2 | 6/2011 | Tilleman et al. |
| 7,969,657 B2 | 6/2011 | Cakmakci et al. |
| 7,970,246 B2 | 6/2011 | Travis et al. |
| 7,976,208 B2 | 7/2011 | Travis |
| 7,984,884 B1 | 7/2011 | Iliev et al. |
| 7,999,982 B2 | 8/2011 | Endo et al. |
| 8,000,020 B2 | 8/2011 | Amitai et al. |
| 8,000,491 B2 | 8/2011 | Brodkin et al. |
| 8,004,765 B2 | 8/2011 | Amitai |
| 8,014,050 B2 | 9/2011 | McGrew |
| 8,016,475 B2 | 9/2011 | Travis |

(56) References Cited

U.S. PATENT DOCUMENTS

| | | |
|---|---|---|
| 8,018,579 B1 | 9/2011 | Krah |
| 8,022,942 B2 | 9/2011 | Bathiche et al. |
| 8,023,783 B2 | 9/2011 | Mukawa et al. |
| RE42,992 E | 12/2011 | David |
| 8,073,296 B2 | 12/2011 | Mukawa et al. |
| 8,077,274 B2 | 12/2011 | Sutherland et al. |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,093,451 B2 | 1/2012 | Spangenberg et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,120,548 B1 | 2/2012 | Barber |
| 8,132,948 B2 | 3/2012 | Owen et al. |
| 8,132,976 B2 | 3/2012 | Odell et al. |
| 8,134,434 B2 | 3/2012 | Diederichs et al. |
| 8,136,690 B2 | 3/2012 | Fang et al. |
| 8,137,981 B2 | 3/2012 | Andrew et al. |
| 8,142,016 B2 | 3/2012 | Legerton et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| D659,137 S | 5/2012 | Matsumoto |
| 8,167,173 B1 | 5/2012 | Simmonds et al. |
| 8,186,874 B2 | 5/2012 | Sinbar et al. |
| 8,188,925 B2 | 5/2012 | DeJean |
| 8,189,263 B1 | 5/2012 | Wang et al. |
| 8,189,973 B2 | 5/2012 | Travis et al. |
| D661,334 S | 6/2012 | Cho et al. |
| D661,335 S | 6/2012 | Jeon |
| 8,194,325 B2 | 6/2012 | Levola et al. |
| 8,199,803 B2 | 6/2012 | Hauske et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,253,914 B2 | 8/2012 | Kajiya et al. |
| 8,254,031 B2 | 8/2012 | Levola |
| 8,264,498 B1 | 9/2012 | Vanderkamp et al. |
| 8,294,749 B2 | 10/2012 | Cable |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,310,327 B2 | 11/2012 | Willers et al. |
| 8,314,819 B2 | 11/2012 | Kimmel et al. |
| 8,314,993 B2 | 11/2012 | Levola et al. |
| 8,320,032 B2 | 11/2012 | Levola |
| 8,321,810 B2 | 11/2012 | Heintze |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| D673,996 S | 1/2013 | Kim et al. |
| 8,351,744 B2 | 1/2013 | Travis et al. |
| 8,354,640 B2 | 1/2013 | Hamre et al. |
| 8,354,806 B2 | 1/2013 | Travis et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,384,694 B2 | 2/2013 | Powell et al. |
| 8,384,730 B1 | 2/2013 | Vanderkamp et al. |
| 8,396,339 B2 | 3/2013 | Mukawa et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,432,614 B2 | 4/2013 | Amitai |
| 8,441,731 B2 | 5/2013 | Sprague |
| 8,447,365 B1 | 5/2013 | Imanuel |
| 8,466,953 B2 | 6/2013 | Levola |
| 8,472,119 B1 | 6/2013 | Kelly |
| 8,472,120 B2 | 6/2013 | Border et al. |
| 8,477,261 B2 | 7/2013 | Travis et al. |
| 8,481,130 B2 | 7/2013 | Harding et al. |
| 8,482,858 B2 | 7/2013 | Sprague |
| 8,488,246 B2 | 7/2013 | Border et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,494,229 B2 | 7/2013 | Jarvenpaa et al. |
| 8,508,848 B2 | 8/2013 | Saarikko |
| 8,520,309 B2 | 8/2013 | Sprague |
| D691,192 S | 10/2013 | Stanley et al. |
| 8,547,638 B2 | 10/2013 | Levola |
| 8,548,290 B2 | 10/2013 | Travers et al. |
| 8,565,560 B2 | 10/2013 | Popovich et al. |
| D694,310 S | 11/2013 | Cho et al. |
| D694,311 S | 11/2013 | Cho et al. |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| D697,130 S | 1/2014 | Lövgren |
| 8,633,786 B2 | 1/2014 | Ermolov et al. |
| 8,634,120 B2 | 1/2014 | Popovich et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,670,029 B2 | 3/2014 | McEldowney |
| 8,693,087 B2 | 4/2014 | Nowatzyk et al. |
| 8,698,705 B2 | 4/2014 | Burke |
| 8,731,350 B1 | 5/2014 | Lin et al. |
| 8,736,802 B2 | 5/2014 | Kajiya et al. |
| 8,736,963 B2 | 5/2014 | Robbins et al. |
| 8,742,952 B1 | 6/2014 | Bold |
| 8,746,008 B1 | 6/2014 | Mauritsen et al. |
| 8,749,886 B2 | 6/2014 | Gupta |
| 8,749,890 B1 | 6/2014 | Wood et al. |
| 8,767,294 B2 | 7/2014 | Chen et al. |
| 8,786,923 B2 | 7/2014 | Chuang et al. |
| 8,810,600 B2 | 8/2014 | Bohn et al. |
| 8,810,913 B2 | 8/2014 | Simmonds et al. |
| 8,810,914 B2 | 8/2014 | Amitai |
| 8,814,691 B2 | 8/2014 | Haddick et al. |
| 8,816,578 B1 | 8/2014 | Peng et al. |
| 8,817,350 B1 | 8/2014 | Robbins et al. |
| 8,824,836 B2 | 9/2014 | Sugiyama |
| 8,830,143 B1 | 9/2014 | Pitchford et al. |
| 8,830,584 B2 | 9/2014 | Saarikko et al. |
| 8,830,588 B1 | 9/2014 | Brown et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| D718,304 S | 11/2014 | Heinrich |
| D718,366 S | 11/2014 | Mehin et al. |
| 8,885,112 B2 | 11/2014 | Popovich et al. |
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,324 B2 | 12/2014 | Schrader |
| 8,913,865 B1 | 12/2014 | Bennett |
| 8,917,453 B2 | 12/2014 | Bohn |
| 8,917,962 B1 | 12/2014 | Nichol et al. |
| 8,933,144 B2 | 1/2015 | Enomoto et al. |

(56) References Cited

U.S. PATENT DOCUMENTS

| | | |
|---|---|---|
| 8,934,743 B2 | 1/2015 | Nishiwaki et al. |
| 8,937,771 B2 | 1/2015 | Robbins et al. |
| 8,937,772 B1 | 1/2015 | Burns et al. |
| 8,938,141 B2 | 1/2015 | Magnusson |
| 8,950,867 B2 | 2/2015 | Macnamara |
| 8,964,298 B2 | 2/2015 | Haddick et al. |
| 8,965,152 B2 | 2/2015 | Simmonds |
| D725,102 S | 3/2015 | Lee et al. |
| 8,985,803 B2 | 3/2015 | Bohn |
| 8,989,535 B2 | 3/2015 | Robbins |
| D726,180 S | 4/2015 | Roat et al. |
| 9,019,595 B2 | 4/2015 | Jain |
| 9,025,253 B2 | 5/2015 | Hadad et al. |
| 9,035,344 B2 | 5/2015 | Jain |
| D733,709 S | 7/2015 | Kawai |
| 9,075,184 B2 | 7/2015 | Popovich et al. |
| 9,081,178 B2 | 7/2015 | Simmonds et al. |
| 9,097,890 B2 | 8/2015 | Miller et al. |
| 9,103,978 B2 | 8/2015 | Nishiwaki et al. |
| 9,128,226 B2 | 9/2015 | Fattal et al. |
| 9,129,295 B2 | 9/2015 | Border et al. |
| 9,164,290 B2 | 10/2015 | Robbins et al. |
| 9,176,324 B1 | 11/2015 | Scherer et al. |
| 9,201,270 B2 | 12/2015 | Fattal et al. |
| 9,215,293 B2 | 12/2015 | Miller |
| D746,896 S | 1/2016 | Markovitz et al. |
| 9,244,275 B1 | 1/2016 | Li |
| 9,244,280 B1 | 1/2016 | Tiana et al. |
| 9,244,281 B1 | 1/2016 | Zimmerman et al. |
| D749,074 S | 2/2016 | Cazalet et al. |
| 9,253,359 B2 | 2/2016 | Takahashi |
| 9,269,854 B2 | 2/2016 | Jain |
| D751,551 S | 3/2016 | Ho et al. |
| D752,129 S | 3/2016 | Lee et al. |
| 9,274,338 B2 | 3/2016 | Robbins et al. |
| 9,274,339 B1 | 3/2016 | Brown et al. |
| 9,274,349 B2 | 3/2016 | Popovich et al. |
| D754,782 S | 4/2016 | Kokinakis et al. |
| 9,310,566 B2 | 4/2016 | Valera et al. |
| 9,329,325 B2 | 5/2016 | Simmonds et al. |
| 9,335,604 B2 | 5/2016 | Popovich et al. |
| 9,341,846 B2 | 5/2016 | Popovich et al. |
| 9,354,366 B2 | 5/2016 | Jain |
| 9,366,862 B2 | 6/2016 | Haddick et al. |
| 9,366,864 B1 | 6/2016 | Brown et al. |
| 9,372,347 B1 | 6/2016 | Levola et al. |
| 9,377,623 B2 | 6/2016 | Robbins et al. |
| 9,377,852 B1 | 6/2016 | Shapiro et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,429,692 B1 | 8/2016 | Saarikko et al. |
| 9,431,794 B2 | 8/2016 | Jain |
| 9,456,744 B2 | 10/2016 | Popovich et al. |
| 9,459,451 B2 | 10/2016 | Saarikko et al. |
| 9,464,779 B2 | 10/2016 | Popovich et al. |
| 9,465,213 B2 | 10/2016 | Simmonds |
| 9,465,227 B2 | 10/2016 | Popovich et al. |
| 9,494,799 B2 | 11/2016 | Robbins et al. |
| 9,507,150 B1 | 11/2016 | Stratton et al. |
| 9,513,480 B2 | 12/2016 | Saarikko et al. |
| 9,516,193 B2 | 12/2016 | Aramaki |
| 9,519,089 B1 | 12/2016 | Brown et al. |
| 9,523,852 B1 | 12/2016 | Brown et al. |
| 9,535,253 B2 | 1/2017 | Levola et al. |
| 9,541,383 B2 | 1/2017 | Abovitz et al. |
| 9,541,763 B1 | 1/2017 | Heberlein et al. |
| 9,547,174 B2 | 1/2017 | Gao et al. |
| 9,551,468 B2 | 1/2017 | Jones |
| 9,551,874 B2 | 1/2017 | Amitai |
| 9,551,880 B2 | 1/2017 | Amitai |
| 9,599,813 B1 | 3/2017 | Stratton et al. |
| 9,612,403 B2 | 4/2017 | Abovitz et al. |
| 9,632,226 B2 | 4/2017 | Waldern et al. |
| 9,635,352 B1 | 4/2017 | Henry et al. |
| 9,648,313 B1 | 5/2017 | Henry et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,671,612 B2 | 6/2017 | Kress et al. |
| 9,674,413 B1 | 6/2017 | Tiana et al. |
| 9,678,345 B1 | 6/2017 | Melzer et al. |
| 9,679,367 B1 | 6/2017 | Wald |
| 9,715,067 B1 | 7/2017 | Brown et al. |
| 9,715,110 B1 | 7/2017 | Brown et al. |
| D793,468 S | 8/2017 | Yu et al. |
| D795,865 S | 8/2017 | Porter et al. |
| D795,866 S | 8/2017 | Porter et al. |
| 9,726,540 B2 | 8/2017 | Popovich et al. |
| 9,727,772 B2 | 8/2017 | Popovich et al. |
| 9,733,475 B1 | 8/2017 | Brown et al. |
| 9,746,688 B2 | 8/2017 | Popovich et al. |
| 9,754,507 B1 | 9/2017 | Wenger et al. |
| 9,762,895 B1 | 9/2017 | Henry et al. |
| 9,766,465 B1 | 9/2017 | Tiana et al. |
| 9,785,231 B1 | 10/2017 | Zimmerman |
| 9,791,694 B1 | 10/2017 | Haverkamp et al. |
| 9,791,696 B2 | 10/2017 | Woltman et al. |
| 9,804,316 B2 | 10/2017 | Drolet et al. |
| 9,804,389 B2 | 10/2017 | Popovich et al. |
| 9,823,423 B2 | 11/2017 | Waldern et al. |
| 9,874,931 B1 | 1/2018 | Koenck et al. |
| 9,933,684 B2 | 4/2018 | Brown et al. |
| 9,977,247 B1 | 5/2018 | Brown et al. |
| D827,641 S | 9/2018 | Morisawa |
| 10,089,516 B2 | 10/2018 | Popovich et al. |
| 10,156,681 B2 | 12/2018 | Waldern et al. |
| 10,185,154 B2 | 1/2019 | Popovich et al. |
| D840,454 S | 2/2019 | Han et al. |
| 10,209,517 B2 | 2/2019 | Popovich et al. |
| 10,216,061 B2 | 2/2019 | Popovich et al. |
| 10,234,696 B2 | 3/2019 | Popovich et al. |
| 10,241,330 B2 | 3/2019 | Popovich et al. |
| 10,330,777 B2 | 6/2019 | Popovich et al. |
| 10,359,736 B2 | 7/2019 | Popovich et al. |
| D855,687 S | 8/2019 | Villalpando |
| D859,510 S | 9/2019 | Harmon et al. |
| 10,409,144 B2 | 9/2019 | Popovich et al. |
| 10,423,813 B2 | 9/2019 | Popovich et al. |
| 10,459,311 B2 | 10/2019 | Popovich et al. |
| D871,494 S | 12/2019 | Yamada et al. |
| D872,170 S | 1/2020 | Evans et al. |
| D872,794 S | 1/2020 | Wilkins |
| 10,527,797 B2 | 1/2020 | Waldern et al. |
| 10,532,594 B2 | 1/2020 | Akahane et al. |
| 10,545,346 B2 | 1/2020 | Waldern et al. |
| 10,569,449 B1 | 2/2020 | Curts et al. |
| 10,578,876 B1 | 3/2020 | Lam et al. |
| 10,598,938 B1 | 3/2020 | Huang et al. |
| D880,575 S | 4/2020 | Thixton |
| 10,613,268 B1 | 4/2020 | Colburn et al. |
| 10,642,058 B2 | 5/2020 | Popovich et al. |
| 10,649,119 B2 | 5/2020 | Mohanty et al. |
| 10,678,053 B2 | 6/2020 | Waldern et al. |
| 10,690,831 B2 | 6/2020 | Calafiore |
| 10,690,916 B2 | 6/2020 | Popovich et al. |
| 10,705,281 B2 | 7/2020 | Fattal et al. |
| 10,732,351 B2 | 8/2020 | Colburn et al. |
| 10,732,569 B2 | 8/2020 | Waldern et al. |
| 10,823,887 B1 | 11/2020 | Calafiore et al. |
| 10,859,768 B2 | 12/2020 | Popovich et al. |
| 10,890,707 B2 | 1/2021 | Waldern et al. |
| 10,983,257 B1 | 4/2021 | Colburn et al. |
| 11,103,892 B1 | 8/2021 | Liao et al. |
| 11,107,972 B2 | 8/2021 | Diest et al. |
| 11,137,603 B2 | 10/2021 | Zhang |
| 11,243,333 B2 | 2/2022 | Ouderkirk et al. |
| 11,306,193 B1 | 4/2022 | Lane et al. |
| 11,307,357 B2 | 4/2022 | Mohanty |
| 11,340,386 B1 | 5/2022 | Ouderkirk et al. |
| 11,391,950 B2 | 7/2022 | Calafiore |
| 11,402,801 B2 | 8/2022 | Waldern et al. |
| 11,703,799 B2 | 7/2023 | Waldern et al. |
| 2001/0024177 A1 | 9/2001 | Popovich |

(56) References Cited

U.S. PATENT DOCUMENTS

| | | |
|---|---|---|
| 2001/0033400 A1 | 10/2001 | Sutherland et al. |
| 2001/0043163 A1 | 11/2001 | Waldern et al. |
| 2001/0046142 A1 | 11/2001 | Van Santen et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0012064 A1 | 1/2002 | Yamaguchi |
| 2002/0018040 A1 | 2/2002 | Aye et al. |
| 2002/0021407 A1 | 2/2002 | Elliott |
| 2002/0021461 A1 | 2/2002 | Ono et al. |
| 2002/0036825 A1 | 3/2002 | Lipton et al. |
| 2002/0047837 A1 | 4/2002 | Suyama et al. |
| 2002/0075240 A1 | 6/2002 | Lieberman et al. |
| 2002/0093701 A1 | 7/2002 | Zhang et al. |
| 2002/0110077 A1 | 8/2002 | Drobot et al. |
| 2002/0126332 A1 | 9/2002 | Popovich |
| 2002/0127497 A1 | 9/2002 | Brown et al. |
| 2002/0131175 A1 | 9/2002 | Yagi et al. |
| 2002/0150032 A1 | 10/2002 | Nishiuchi et al. |
| 2002/0196332 A1 | 12/2002 | Lipton et al. |
| 2003/0007070 A1 | 1/2003 | Lipton et al. |
| 2003/0030912 A1 | 2/2003 | Gleckman et al. |
| 2003/0038912 A1 | 2/2003 | Broer et al. |
| 2003/0039442 A1 | 2/2003 | Bond et al. |
| 2003/0058490 A1 | 3/2003 | Brotherton-ratcliffe et al. |
| 2003/0063042 A1 | 4/2003 | Friesem et al. |
| 2003/0063884 A1 | 4/2003 | Smith et al. |
| 2003/0067685 A1 | 4/2003 | Niv |
| 2003/0086670 A1 | 5/2003 | Moridaira et al. |
| 2003/0107809 A1 | 6/2003 | Chen et al. |
| 2003/0149346 A1 | 8/2003 | Arnone et al. |
| 2003/0175004 A1 | 9/2003 | Garito et al. |
| 2003/0193709 A1 | 10/2003 | Mallya et al. |
| 2003/0197154 A1 | 10/2003 | Manabe et al. |
| 2003/0197157 A1 | 10/2003 | Sutherland et al. |
| 2003/0202247 A1 | 10/2003 | Niv et al. |
| 2003/0206329 A1 | 11/2003 | Ikeda et al. |
| 2003/0228019 A1 | 12/2003 | Eichler et al. |
| 2004/0004767 A1 | 1/2004 | Song |
| 2004/0012833 A1 | 1/2004 | Newswanger et al. |
| 2004/0047938 A1 | 3/2004 | Kosuga et al. |
| 2004/0075830 A1 | 4/2004 | Miyake et al. |
| 2004/0089842 A1 | 5/2004 | Sutehrland et al. |
| 2004/0109234 A1 | 6/2004 | Levola |
| 2004/0112862 A1 | 6/2004 | Willson et al. |
| 2004/0130797 A1 | 7/2004 | Leigh |
| 2004/0141217 A1 | 7/2004 | Endo et al. |
| 2004/0156008 A1 | 8/2004 | Reznikov et al. |
| 2004/0174348 A1 | 9/2004 | David |
| 2004/0175627 A1 | 9/2004 | Sutherland et al. |
| 2004/0179764 A1 | 9/2004 | Melikechi et al. |
| 2004/0184156 A1 | 9/2004 | Gunn, III et al. |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2004/0225025 A1 | 11/2004 | Sullivan et al. |
| 2004/0263969 A1 | 12/2004 | Lipton et al. |
| 2004/0263971 A1 | 12/2004 | Lipton et al. |
| 2005/0018304 A1 | 1/2005 | Lipton et al. |
| 2005/0079663 A1 | 4/2005 | Masutani et al. |
| 2005/0083564 A1 | 4/2005 | Mallya et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0135747 A1 | 6/2005 | Greiner et al. |
| 2005/0136260 A1 | 6/2005 | Garcia |
| 2005/0141066 A1 | 6/2005 | Ouchi |
| 2005/0174321 A1 | 8/2005 | Ikeda et al. |
| 2005/0180687 A1 | 8/2005 | Amitai |
| 2005/0195276 A1 | 9/2005 | Lipton et al. |
| 2005/0218377 A1 | 10/2005 | Lawandy |
| 2005/0231774 A1 | 10/2005 | Hayashi et al. |
| 2005/0232530 A1 | 10/2005 | Kekas |
| 2005/0259217 A1 | 11/2005 | Lin et al. |
| 2005/0259302 A9 | 11/2005 | Metz et al. |
| 2005/0259944 A1 | 11/2005 | Anderson et al. |
| 2005/0265585 A1 | 12/2005 | Rowe |
| 2005/0269481 A1 | 12/2005 | David et al. |
| 2005/0271258 A1 | 12/2005 | Rowe |
| 2005/0286133 A1 | 12/2005 | Lipton |
| 2006/0002274 A1 | 1/2006 | Kihara et al. |
| 2006/0012878 A1 | 1/2006 | Lipton et al. |
| 2006/0013977 A1 | 1/2006 | Duke et al. |
| 2006/0043938 A1 | 3/2006 | O'Gorman et al. |
| 2006/0055993 A1 | 3/2006 | Kobayashi et al. |
| 2006/0093012 A1 | 5/2006 | Singh et al. |
| 2006/0093793 A1 | 5/2006 | Miyakawa et al. |
| 2006/0114564 A1 | 6/2006 | Sutherland et al. |
| 2006/0119837 A1 | 6/2006 | Raguin et al. |
| 2006/0119916 A1 | 6/2006 | Sutherland et al. |
| 2006/0126179 A1 | 6/2006 | Levola |
| 2006/0132914 A1 | 6/2006 | Weiss et al. |
| 2006/0142455 A1 | 6/2006 | Agarwal et al. |
| 2006/0146422 A1 | 7/2006 | Koike |
| 2006/0159864 A1 | 7/2006 | Natarajan et al. |
| 2006/0164593 A1 | 7/2006 | Peyghambarian et al. |
| 2006/0171647 A1 | 8/2006 | Ye et al. |
| 2006/0177180 A1 | 8/2006 | Tazawa et al. |
| 2006/0181683 A1 | 8/2006 | Bhowmik et al. |
| 2006/0191293 A1 | 8/2006 | Kuczma |
| 2006/0215244 A1 | 9/2006 | Yosha et al. |
| 2006/0215976 A1 | 9/2006 | Singh et al. |
| 2006/0221063 A1 | 10/2006 | Ishihara |
| 2006/0221448 A1 | 10/2006 | Nivon et al. |
| 2006/0228073 A1 | 10/2006 | Mukawa et al. |
| 2006/0268104 A1 | 11/2006 | Cowan et al. |
| 2006/0268412 A1 | 11/2006 | Downing et al. |
| 2006/0279662 A1 | 12/2006 | Kapellner et al. |
| 2006/0284974 A1 | 12/2006 | Lipton et al. |
| 2006/0285205 A1 | 12/2006 | Lipton et al. |
| 2006/0291021 A1 | 12/2006 | Mukawa |
| 2006/0291052 A1 | 12/2006 | Lipton et al. |
| 2006/0292493 A1 | 12/2006 | Shinotsuka et al. |
| 2007/0012777 A1 | 1/2007 | Tsikos et al. |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0070476 A1 | 3/2007 | Yamada et al. |
| 2007/0070504 A1 | 3/2007 | Akutsu et al. |
| 2007/0089625 A1 | 4/2007 | Grinberg et al. |
| 2007/0097502 A1 | 5/2007 | Lipton et al. |
| 2007/0109400 A1 | 5/2007 | Woodgate et al. |
| 2007/0109401 A1 | 5/2007 | Lipton et al. |
| 2007/0116409 A1 | 5/2007 | Bryan et al. |
| 2007/0127348 A1 | 6/2007 | Ooi et al. |
| 2007/0133089 A1 | 6/2007 | Lipton et al. |
| 2007/0133920 A1 | 6/2007 | Lee et al. |
| 2007/0133983 A1 | 6/2007 | Traff |
| 2007/0146624 A1 | 6/2007 | Duston et al. |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0182915 A1 | 8/2007 | Osawa et al. |
| 2007/0183650 A1 | 8/2007 | Lipton et al. |
| 2007/0188602 A1 | 8/2007 | Cowan et al. |
| 2007/0188837 A1 | 8/2007 | Shimizu et al. |
| 2007/0195409 A1 | 8/2007 | Yun et al. |
| 2007/0206155 A1 | 9/2007 | Lipton |
| 2007/0211164 A1 | 9/2007 | Olsen et al. |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0001909 A1 | 1/2008 | Lim |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0089073 A1 | 4/2008 | Hikmet |

(56) References Cited

U.S. PATENT DOCUMENTS

| | | |
|---|---|---|
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0136916 A1 | 6/2008 | Wolff |
| 2008/0136923 A1 | 6/2008 | Inbar et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0151379 A1 | 6/2008 | Amitai |
| 2008/0186573 A1 | 8/2008 | Lipton |
| 2008/0186574 A1 | 8/2008 | Robinson et al. |
| 2008/0186604 A1 | 8/2008 | Amitai |
| 2008/0193085 A1 | 8/2008 | Singh et al. |
| 2008/0198471 A1 | 8/2008 | Amitai |
| 2008/0225187 A1 | 9/2008 | Yamanaka |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0278812 A1 | 11/2008 | Amitai |
| 2008/0285137 A1 | 11/2008 | Simmonds et al. |
| 2008/0285140 A1 | 11/2008 | Amitai |
| 2008/0297731 A1 | 12/2008 | Powell et al. |
| 2008/0297807 A1 | 12/2008 | Feldman et al. |
| 2008/0298649 A1 | 12/2008 | Ennis et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0309586 A1 | 12/2008 | Vitale |
| 2008/0316303 A1 | 12/2008 | Chiu et al. |
| 2008/0316375 A1 | 12/2008 | Lipton et al. |
| 2009/0017424 A1 | 1/2009 | Yoeli et al. |
| 2009/0019222 A1 | 1/2009 | Verma et al. |
| 2009/0052017 A1 | 2/2009 | Sasaki |
| 2009/0052046 A1 | 2/2009 | Amitai |
| 2009/0052047 A1 | 2/2009 | Amitai |
| 2009/0067774 A1 | 3/2009 | Magnusson |
| 2009/0074356 A1 | 3/2009 | Sanchez et al. |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128495 A1 | 5/2009 | Kong et al. |
| 2009/0128902 A1 | 5/2009 | Niv et al. |
| 2009/0128911 A1 | 5/2009 | Itzkovitch et al. |
| 2009/0136246 A1 | 5/2009 | Murakami |
| 2009/0141324 A1 | 6/2009 | Mukawa |
| 2009/0153437 A1 | 6/2009 | Aharoni |
| 2009/0169152 A1 | 7/2009 | Oestergard |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0242021 A1 | 10/2009 | Petkie et al. |
| 2009/0296218 A1 | 12/2009 | Ryytty |
| 2009/0303599 A1 | 12/2009 | Levola |
| 2009/0316246 A1 | 12/2009 | Asai et al. |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0060551 A1 | 3/2010 | Sugiyama et al. |
| 2010/0060990 A1 | 3/2010 | Wertheim et al. |
| 2010/0065726 A1 | 3/2010 | Zhong et al. |
| 2010/0079865 A1 | 4/2010 | Saarikko et al. |
| 2010/0086256 A1 | 4/2010 | Ben Bakir et al. |
| 2010/0092124 A1 | 4/2010 | Magnusson et al. |
| 2010/0096562 A1 | 4/2010 | Klunder et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0135615 A1 | 6/2010 | Ho et al. |
| 2010/0136319 A1 | 6/2010 | Imai et al. |
| 2010/0141555 A1 | 6/2010 | Rorberg et al. |
| 2010/0149073 A1 | 6/2010 | Chaum et al. |
| 2010/0165465 A1 | 7/2010 | Levola |
| 2010/0165660 A1 | 7/2010 | Weber et al. |
| 2010/0171680 A1 | 7/2010 | Lapidot et al. |
| 2010/0177388 A1 | 7/2010 | Cohen et al. |
| 2010/0202725 A1 | 8/2010 | Popovich et al. |
| 2010/0214659 A1 | 8/2010 | Levola |
| 2010/0220293 A1 | 9/2010 | Mizushima et al. |
| 2010/0225834 A1 | 9/2010 | Li |
| 2010/0225876 A1 | 9/2010 | Escuti et al. |
| 2010/0231532 A1 | 9/2010 | Nho et al. |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0245756 A1 | 9/2010 | Sugihara et al. |
| 2010/0245757 A1 | 9/2010 | Sugihara et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0253987 A1 | 10/2010 | Leopold et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0296163 A1 | 11/2010 | Saarikko |
| 2010/0299814 A1 | 12/2010 | Celona et al. |
| 2010/0315719 A1 | 12/2010 | Saarikko et al. |
| 2010/0321781 A1 | 12/2010 | Levola et al. |
| 2010/0322555 A1 | 12/2010 | Vermeulen et al. |
| 2011/0001895 A1 | 1/2011 | Dahl |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0038024 A1 | 2/2011 | Wang et al. |
| 2011/0050548 A1 | 3/2011 | Blumenfeld et al. |
| 2011/0063604 A1 | 3/2011 | Hamre et al. |
| 2011/0096401 A1 | 4/2011 | Levola |
| 2011/0102711 A1 | 5/2011 | Sutherland et al. |
| 2011/0109880 A1 | 5/2011 | Nummela |
| 2011/0157707 A1 | 6/2011 | Tilleman et al. |
| 2011/0164221 A1 | 7/2011 | Tilleman et al. |
| 2011/0187293 A1 | 8/2011 | Travis et al. |
| 2011/0211239 A1 | 9/2011 | Mukawa et al. |
| 2011/0221656 A1 | 9/2011 | Haddick et al. |
| 2011/0235179 A1 | 9/2011 | Simmonds |
| 2011/0235365 A1 | 9/2011 | McCollum et al. |
| 2011/0236803 A1 | 9/2011 | Weiser et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1 | 2/2012 | Mathal et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0099203 A1 | 4/2012 | Boubis et al. |
| 2012/0105634 A1 | 5/2012 | Meidan et al. |
| 2012/0105740 A1 | 5/2012 | Jannard et al. |
| 2012/0120493 A1 | 5/2012 | Simmonds et al. |
| 2012/0127577 A1 | 5/2012 | Desserouer |
| 2012/0162549 A1 | 6/2012 | Gao et al. |

(56) References Cited

U.S. PATENT DOCUMENTS

| | | |
|---|---|---|
| 2012/0162764 A1 | 6/2012 | Shimizu |
| 2012/0176665 A1 | 7/2012 | Song et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0218481 A1 | 8/2012 | Popovich et al. |
| 2012/0224062 A1 | 9/2012 | Lacoste et al. |
| 2012/0235884 A1 | 9/2012 | Miller et al. |
| 2012/0235886 A1 | 9/2012 | Border et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0281943 A1 | 11/2012 | Popovich et al. |
| 2012/0290973 A1 | 11/2012 | Robertson et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2012/0326950 A1 | 12/2012 | Park et al. |
| 2013/0016324 A1 | 1/2013 | Travis |
| 2013/0016362 A1 | 1/2013 | Gong et al. |
| 2013/0021392 A1 | 1/2013 | Travis |
| 2013/0021586 A1 | 1/2013 | Lippey |
| 2013/0027006 A1 | 1/2013 | Holloway et al. |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0088637 A1 | 4/2013 | Duparre |
| 2013/0093893 A1 | 4/2013 | Schofield et al. |
| 2013/0101253 A1 | 4/2013 | Popovich et al. |
| 2013/0107186 A1 | 5/2013 | Ando et al. |
| 2013/0107343 A1 | 5/2013 | Shekel |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0138275 A1 | 5/2013 | Nauman et al. |
| 2013/0141937 A1 | 6/2013 | Katsuta et al. |
| 2013/0143336 A1 | 6/2013 | Jain |
| 2013/0163089 A1 | 6/2013 | Bohn |
| 2013/0170031 A1 | 7/2013 | Bohn et al. |
| 2013/0176704 A1 | 7/2013 | Lanman et al. |
| 2013/0184904 A1 | 7/2013 | Gadzinski |
| 2013/0200710 A1 | 8/2013 | Robbins |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0249895 A1 | 9/2013 | Westerinen et al. |
| 2013/0250207 A1 | 9/2013 | Bohn |
| 2013/0250430 A1 | 9/2013 | Robbins et al. |
| 2013/0250431 A1 | 9/2013 | Robbins et al. |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0301014 A1 | 11/2013 | DeJong et al. |
| 2013/0305437 A1 | 11/2013 | Weller et al. |
| 2013/0308185 A1 | 11/2013 | Robinson et al. |
| 2013/0312811 A1 | 11/2013 | Aspnes et al. |
| 2013/0314789 A1 | 11/2013 | Saarikko et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2013/0342525 A1 | 12/2013 | Benko et al. |
| 2014/0003762 A1 | 1/2014 | Macnamara |
| 2014/0009809 A1 | 1/2014 | Pyun et al. |
| 2014/0024159 A1 | 1/2014 | Jain |
| 2014/0027006 A1 | 1/2014 | Foley et al. |
| 2014/0037242 A1 | 2/2014 | Popovich et al. |
| 2014/0043672 A1 | 2/2014 | Clarke et al. |
| 2014/0043689 A1 | 2/2014 | Mason |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0104685 A1 | 4/2014 | Bohn et al. |
| 2014/0118647 A1 | 5/2014 | Momonoi et al. |
| 2014/0126029 A1 | 5/2014 | Fuetterer |
| 2014/0130132 A1 | 5/2014 | Cahill et al. |
| 2014/0138581 A1 | 5/2014 | Archetti et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0154614 A1 | 6/2014 | Xie et al. |
| 2014/0160576 A1 | 6/2014 | Robbins et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0168783 A1 | 6/2014 | Luebke et al. |
| 2014/0172296 A1 | 6/2014 | Shtukater |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0253988 A1 | 9/2014 | Newswanger |
| 2014/0255662 A1 | 9/2014 | Enomoto et al. |
| 2014/0267420 A1 | 9/2014 | Schowengerdt et al. |
| 2014/0268017 A1 | 9/2014 | Sweis et al. |
| 2014/0268353 A1 | 9/2014 | Fujimura et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0086907 A1 | 3/2015 | Mizuta et al. |
| 2015/0107671 A1 | 4/2015 | Bodan et al. |
| 2015/0109763 A1 | 4/2015 | Shinkai et al. |
| 2015/0125109 A1 | 5/2015 | Robbins et al. |
| 2015/0148728 A1 | 5/2015 | Sallum et al. |
| 2015/0160529 A1 | 6/2015 | Popovich et al. |
| 2015/0167868 A1 | 6/2015 | Boncha |
| 2015/0177686 A1 | 6/2015 | Lee et al. |
| 2015/0177688 A1 | 6/2015 | Popovich et al. |
| 2015/0185475 A1 | 7/2015 | Saarikko et al. |
| 2015/0219834 A1 | 8/2015 | Nichol et al. |
| 2015/0235447 A1 | 8/2015 | Abovitz et al. |
| 2015/0235448 A1 | 8/2015 | Schowengerdt et al. |
| 2015/0243068 A1 | 8/2015 | Solomon |
| 2015/0247975 A1 | 9/2015 | Abovitz et al. |
| 2015/0260994 A1 | 9/2015 | Akutsu et al. |
| 2015/0268399 A1 | 9/2015 | Futterer |

(56) References Cited

U.S. PATENT DOCUMENTS

| | | |
|---|---|---|
| 2015/0268415 A1 | 9/2015 | Schowengerdt et al. |
| 2015/0277375 A1 | 10/2015 | Large et al. |
| 2015/0285682 A1 | 10/2015 | Popovich et al. |
| 2015/0288129 A1 | 10/2015 | Jain |
| 2015/0289762 A1 | 10/2015 | Popovich et al. |
| 2015/0309264 A1 | 10/2015 | Abovitz et al. |
| 2015/0316768 A1 | 11/2015 | Simmonds |
| 2015/0338689 A1 | 11/2015 | Min et al. |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0018673 A1 | 1/2016 | Wang |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0060529 A1 | 3/2016 | Hegmann et al. |
| 2016/0077338 A1 | 3/2016 | Robbins et al. |
| 2016/0085300 A1 | 3/2016 | Robbins et al. |
| 2016/0097959 A1 | 4/2016 | Bruizeman et al. |
| 2016/0116739 A1 | 4/2016 | TeKolste et al. |
| 2016/0124223 A1 | 5/2016 | Shinbo et al. |
| 2016/0132025 A1 | 5/2016 | Taff et al. |
| 2016/0178901 A1 | 6/2016 | Ishikawa |
| 2016/0195664 A1 | 7/2016 | Fattal et al. |
| 2016/0209648 A1 | 7/2016 | Haddick et al. |
| 2016/0209657 A1 | 7/2016 | Popovich et al. |
| 2016/0231568 A1 | 8/2016 | Saarikko et al. |
| 2016/0231570 A1 | 8/2016 | Levola et al. |
| 2016/0238772 A1 | 8/2016 | Waldern et al. |
| 2016/0266398 A1 | 9/2016 | Poon et al. |
| 2016/0274362 A1 | 9/2016 | Tinch et al. |
| 2016/0283773 A1 | 9/2016 | Popovich et al. |
| 2016/0291328 A1 | 10/2016 | Popovich et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0336033 A1 | 11/2016 | Tanaka |
| 2016/0341964 A1 | 11/2016 | Amitai |
| 2017/0003505 A1 | 1/2017 | Vallius et al. |
| 2017/0010466 A1 | 1/2017 | Klug et al. |
| 2017/0010488 A1 | 1/2017 | Klug et al. |
| 2017/0030550 A1 | 2/2017 | Popovich et al. |
| 2017/0031160 A1 | 2/2017 | Popovich et al. |
| 2017/0031171 A1 | 2/2017 | Vallius et al. |
| 2017/0032166 A1 | 2/2017 | Raguin et al. |
| 2017/0034435 A1 | 2/2017 | Vallius |
| 2017/0038579 A1 | 2/2017 | Yeoh et al. |
| 2017/0052374 A1 | 2/2017 | Waldern et al. |
| 2017/0052376 A1 | 2/2017 | Amitai et al. |
| 2017/0059759 A1 | 3/2017 | Ayres et al. |
| 2017/0059775 A1 | 3/2017 | Coles et al. |
| 2017/0102543 A1 | 4/2017 | Vallius |
| 2017/0115487 A1 | 4/2017 | Travis et al. |
| 2017/0123208 A1 | 5/2017 | Vallius |
| 2017/0131460 A1 | 5/2017 | Lin et al. |
| 2017/0131545 A1 | 5/2017 | Wall et al. |
| 2017/0131546 A1 | 5/2017 | Woltman et al. |
| 2017/0131551 A1 | 5/2017 | Robbins et al. |
| 2017/0160546 A1 | 6/2017 | Bull et al. |
| 2017/0180404 A1 | 6/2017 | Bersch et al. |
| 2017/0180408 A1 | 6/2017 | Yu et al. |
| 2017/0199333 A1 | 7/2017 | Waldern et al. |
| 2017/0212295 A1 | 7/2017 | Vasylyev |
| 2017/0219841 A1 | 8/2017 | Popovich et al. |
| 2017/0255257 A1 | 9/2017 | Tiana et al. |
| 2017/0276940 A1 | 9/2017 | Popovich et al. |
| 2017/0299860 A1 | 10/2017 | Wall et al. |
| 2017/0356801 A1 | 12/2017 | Popovich et al. |
| 2017/0357841 A1 | 12/2017 | Popovich et al. |
| 2018/0011324 A1 | 1/2018 | Popovich et al. |
| 2018/0059305 A1 | 3/2018 | Popovich et al. |
| 2018/0074265 A1 | 3/2018 | Waldern et al. |
| 2018/0074352 A1 | 3/2018 | Popovich et al. |
| 2018/0081190 A1 | 3/2018 | Lee et al. |
| 2018/0107011 A1 | 4/2018 | Lu et al. |
| 2018/0113303 A1 | 4/2018 | Popovich et al. |
| 2018/0120669 A1 | 5/2018 | Popovich et al. |
| 2018/0143449 A1 | 5/2018 | Popovich et al. |
| 2018/0188542 A1 | 7/2018 | Waldern et al. |
| 2018/0210198 A1 | 7/2018 | Brown et al. |
| 2018/0210396 A1 | 7/2018 | Popovich et al. |
| 2018/0232048 A1 | 8/2018 | Popovich et al. |
| 2018/0246354 A1 | 8/2018 | Popovich et al. |
| 2018/0252869 A1 | 9/2018 | Ayres et al. |
| 2018/0275350 A1 | 9/2018 | Oh et al. |
| 2018/0275402 A1 | 9/2018 | Popovich et al. |
| 2018/0284440 A1 | 10/2018 | Popovich et al. |
| 2018/0373115 A1 | 12/2018 | Brown et al. |
| 2019/0042827 A1 | 2/2019 | Popovich et al. |
| 2019/0064735 A1 | 2/2019 | Waldern et al. |
| 2019/0072723 A1 | 3/2019 | Waldern et al. |
| 2019/0094548 A1 | 3/2019 | Nicholson et al. |
| 2019/0113751 A9 | 4/2019 | Waldern et al. |
| 2019/0113829 A1 | 4/2019 | Waldern et al. |
| 2019/0121027 A1 | 4/2019 | Popovich et al. |
| 2019/0129085 A1 | 5/2019 | Waldern et al. |
| 2019/0187538 A1 | 6/2019 | Popovich et al. |
| 2019/0212195 A9 | 7/2019 | Popovich et al. |
| 2019/0212588 A1 | 7/2019 | Waldern et al. |
| 2019/0212589 A1 | 7/2019 | Waldern et al. |
| 2019/0212596 A1 | 7/2019 | Waldern et al. |
| 2019/0212597 A1 | 7/2019 | Waldern et al. |
| 2019/0212698 A1 | 7/2019 | Waldern et al. |
| 2019/0212699 A1 | 7/2019 | Waldern et al. |
| 2019/0219822 A1 | 7/2019 | Popovich et al. |
| 2019/0265486 A1 | 8/2019 | Hansotte et al. |
| 2019/0278224 A1 | 9/2019 | Schlottau et al. |
| 2019/0319426 A1 | 10/2019 | Lu et al. |
| 2019/0339558 A1 | 11/2019 | Waldern et al. |
| 2020/0026074 A1 | 1/2020 | Waldern et al. |
| 2020/0033190 A1 | 1/2020 | Popovich et al. |
| 2020/0033801 A1 | 1/2020 | Waldern et al. |
| 2020/0033802 A1 | 1/2020 | Popovich et al. |
| 2020/0057353 A1 | 2/2020 | Popovich et al. |
| 2020/0081317 A1 | 3/2020 | Popovich et al. |
| 2020/0103661 A1 | 4/2020 | Kamakura |
| 2020/0142131 A1 | 5/2020 | Waldern et al. |
| 2020/0159026 A1 | 5/2020 | Waldern et al. |
| 2020/0201042 A1 | 6/2020 | Wang et al. |
| 2020/0201051 A1 | 6/2020 | Popovich et al. |
| 2020/0225471 A1 | 7/2020 | Waldern et al. |
| 2020/0247016 A1 | 8/2020 | Calafiore |
| 2020/0249484 A1 | 8/2020 | Waldern et al. |
| 2020/0249491 A1 | 8/2020 | Popovich et al. |
| 2020/0249568 A1 | 8/2020 | Rao et al. |
| 2020/0264378 A1 | 8/2020 | Grant et al. |
| 2020/0271973 A1 | 8/2020 | Waldern et al. |
| 2020/0292745 A1 | 9/2020 | Waldern et al. |
| 2020/0348519 A1 | 11/2020 | Waldern et al. |
| 2020/0363771 A1 | 11/2020 | Waldern et al. |
| 2021/0026297 A1 | 1/2021 | Waldern et al. |
| 2021/0109285 A1 | 4/2021 | Jiang et al. |
| 2021/0191122 A1 | 6/2021 | Yaroshchuk et al. |
| 2021/0199873 A1 | 7/2021 | Shi et al. |
| 2021/0199971 A1 | 7/2021 | Lee et al. |
| 2021/0216040 A1 | 7/2021 | Waldern et al. |
| 2021/0238374 A1 | 8/2021 | Ye et al. |
| 2021/0364836 A1 | 11/2021 | Waldern et al. |
| 2022/0019015 A1 | 1/2022 | Calafiore et al. |
| 2022/0057749 A1 | 2/2022 | Popovich et al. |
| 2022/0082739 A1 | 3/2022 | Franke et al. |
| 2022/0091323 A1 | 3/2022 | Yaroshchuk et al. |
| 2022/0204790 A1 | 6/2022 | Zhang et al. |
| 2022/0206232 A1 | 6/2022 | Zhang et al. |

(56) References Cited

U.S. PATENT DOCUMENTS

2023/0030594 A1 2/2023 Waldern et al.
2023/0359146 A1 11/2023 Waldern et al.

FOREIGN PATENT DOCUMENTS

| | | |
|---|---|---|
| CA | 106226854 A | 12/2016 |
| CN | 1357010 A | 7/2002 |
| CN | 1424829 A | 6/2003 |
| CN | 1475547 A | 2/2004 |
| CN | 1678948 A | 10/2005 |
| CN | 200944140 Y | 9/2007 |
| CN | 101103297 A | 1/2008 |
| CN | 101151562 A | 3/2008 |
| CN | 101241348 A | 8/2008 |
| CN | 101263412 A | 9/2008 |
| CN | 100492099 C | 5/2009 |
| CN | 101589326 A | 11/2009 |
| CN | 101688977 A | 3/2010 |
| CN | 101793555 A | 8/2010 |
| CN | 101793987 A | 8/2010 |
| CN | 101881936 A | 11/2010 |
| CN | 101945612 A | 1/2011 |
| CN | 102314092 A | 1/2012 |
| CN | 102393548 A | 3/2012 |
| CN | 102498425 A | 6/2012 |
| CN | 103562802 A | 2/2014 |
| CN | 103777282 A | 5/2014 |
| CN | 103823267 A | 5/2014 |
| CN | 104076424 A | 10/2014 |
| CN | 104204901 A | 12/2014 |
| CN | 104246626 A | 12/2014 |
| CN | 303019849 | 12/2014 |
| CN | 303217936 | 5/2015 |
| CN | 104956252 A | 9/2015 |
| CN | 105074537 A | 11/2015 |
| CN | 105074539 A | 11/2015 |
| CN | 105190407 A | 12/2015 |
| CN | 105229514 A | 1/2016 |
| CN | 105393159 A | 3/2016 |
| CN | 105408801 A | 3/2016 |
| CN | 105408802 A | 3/2016 |
| CN | 105408803 A | 3/2016 |
| CN | 105531716 A | 4/2016 |
| CN | 105705981 A | 6/2016 |
| CN | 105940451 A | 9/2016 |
| CN | 106226854 A | 12/2016 |
| CN | 106950744 A | 7/2017 |
| CN | 107466372 A | 12/2017 |
| CN | 108474945 A | 8/2018 |
| CN | 108780224 A | 11/2018 |
| CN | 109154717 A | 1/2019 |
| CN | 103823267 B | 5/2019 |
| CN | 110383117 A | 10/2019 |
| CN | 111566571 A | 8/2020 |
| CN | 111615655 A | 9/2020 |
| CN | 111684362 A | 9/2020 |
| CN | 111902768 A | 11/2020 |
| CN | 113728075 A | 11/2021 |
| CN | 111684362 B | 3/2022 |
| CN | 114341686 A | 4/2022 |
| CN | 111566571 B | 5/2022 |
| CN | 114721242 A | 7/2022 |
| CN | 115356905 A | 11/2022 |
| CN | 111615655 B | 3/2023 |
| CN | 116224492 A | 6/2023 |
| DE | 19751190 A1 | 5/1999 |
| DE | 102006003785 A1 | 7/2007 |
| DE | 102012104900 A1 | 12/2012 |
| DE | 102012108424 A1 | 3/2014 |
| DE | 102013209436 A1 | 11/2014 |
| EM | 001747551-0002 | 8/2012 |
| EP | 0795775 A2 | 9/1997 |
| EP | 0822441 A2 | 2/1998 |
| EP | 1347641 A1 | 9/2003 |
| EP | 1413972 A1 | 4/2004 |
| EP | 1526709 A2 | 4/2005 |
| EP | 1748305 A1 | 1/2007 |
| EP | 1938152 A1 | 7/2008 |
| EP | 1413972 B1 | 10/2008 |
| EP | 2110701 A1 | 10/2009 |
| EP | 2225592 A1 | 9/2010 |
| EP | 2244114 A1 | 10/2010 |
| EP | 2326983 A1 | 6/2011 |
| EP | 2381290 A1 | 10/2011 |
| EP | 1828832 B1 | 5/2013 |
| EP | 2733517 A1 | 5/2014 |
| EP | 1573369 B1 | 7/2014 |
| EP | 2748670 A1 | 7/2014 |
| EP | 2929378 A1 | 10/2015 |
| EP | 2748670 B1 | 11/2015 |
| EP | 2995986 A1 | 3/2016 |
| EP | 1402298 B1 | 9/2016 |
| EP | 2995986 B1 | 4/2017 |
| EP | 3256888 A1 | 12/2017 |
| EP | 3359999 A1 | 8/2018 |
| EP | 2494388 B1 | 11/2018 |
| EP | 3433658 A1 | 1/2019 |
| EP | 3433659 A1 | 1/2019 |
| EP | 3548939 A2 | 10/2019 |
| EP | 3710876 A1 | 9/2020 |
| EP | 3710887 A1 | 9/2020 |
| EP | 3710893 A1 | 9/2020 |
| EP | 3710894 A1 | 9/2020 |
| EP | 3927793 A1 | 12/2021 |
| EP | 4004615 A1 | 6/2022 |
| FI | 20176157 A1 | 6/2019 |
| FI | 20176161 A1 | 6/2019 |
| FR | 2677463 A1 | 12/1992 |
| GB | 2115178 A | 9/1983 |
| GB | 2140935 A | 12/1984 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | S49092850 U | 8/1974 |
| JP | 57089722 A | 6/1982 |
| JP | 02186319 A | 7/1990 |
| JP | 03239384 A | 10/1991 |
| JP | H04303812 A | 10/1992 |
| JP | H04303813 A | 10/1992 |
| JP | 06294952 A | 10/1994 |
| JP | 07098439 A | 4/1995 |
| JP | 0990312 A | 4/1997 |
| JP | H09185313 A | 7/1997 |
| JP | 10096903 A | 4/1998 |
| JP | 11109320 A | 4/1999 |
| JP | 11142806 A | 5/1999 |
| JP | 2953444 B2 | 9/1999 |
| JP | H11271535 A | 10/1999 |
| JP | 2000056259 A | 2/2000 |
| JP | 2000511306 A | 8/2000 |
| JP | 2000261706 A | 9/2000 |
| JP | 2000267042 A | 9/2000 |
| JP | 2000321962 A | 11/2000 |
| JP | 2000515996 A | 11/2000 |
| JP | 2001027739 A | 1/2001 |
| JP | 2001181316 A | 7/2001 |
| JP | 2001296503 A | 10/2001 |
| JP | 2002090858 A | 3/2002 |
| JP | 2002122906 A | 4/2002 |
| JP | 2002162598 A | 6/2002 |
| JP | 2002523802 A | 7/2002 |
| JP | 2002258089 A | 9/2002 |
| JP | 2002529790 A | 9/2002 |
| JP | 2002311379 A | 10/2002 |
| JP | 2003066428 A | 3/2003 |
| JP | 2003270419 A | 9/2003 |
| JP | 2004157245 A | 6/2004 |
| JP | 2005222963 A | 8/2005 |
| JP | 2005331757 A | 12/2005 |

(56) References Cited

FOREIGN PATENT DOCUMENTS

| | | |
|---|---|---|
| JP | 2006350129 A | 12/2006 |
| JP | 2007011057 A | 1/2007 |
| JP | 2007094175 A | 4/2007 |
| JP | 2007122039 A | 5/2007 |
| JP | 2007199699 A | 8/2007 |
| JP | 2007219106 A | 8/2007 |
| JP | 2007279313 A | 10/2007 |
| JP | 2008112187 A | 5/2008 |
| JP | 2008145619 A | 6/2008 |
| JP | 2008268444 A | 11/2008 |
| JP | 2009036955 A | 2/2009 |
| JP | 2009133999 A | 6/2009 |
| JP | 2009211091 A | 9/2009 |
| JP | 4367775 B2 | 11/2009 |
| JP | 2010217928 A | 9/2010 |
| JP | 2011075681 A | 4/2011 |
| JP | 2011232510 A | 11/2011 |
| JP | 2012014804 A | 1/2012 |
| JP | 2012137616 A | 7/2012 |
| JP | 5303928 B2 | 10/2013 |
| JP | 2013235256 A | 11/2013 |
| JP | 2014132328 A | 7/2014 |
| JP | 2015053163 A | 3/2015 |
| JP | 2015523586 A | 8/2015 |
| JP | 2015172713 A | 10/2015 |
| JP | 2016030503 A | 3/2016 |
| JP | 2017194547 A | 10/2017 |
| JP | 2018508037 A | 3/2018 |
| JP | 2018521350 A | 8/2018 |
| JP | 2018533069 A | 11/2018 |
| JP | 2018197838 A | 12/2018 |
| JP | 2019512745 A | 5/2019 |
| JP | 2019520595 A | 7/2019 |
| JP | 6598269 B2 | 10/2019 |
| JP | 6680793 B2 | 3/2020 |
| JP | 2020514783 A | 5/2020 |
| JP | 6734933 B2 | 7/2020 |
| JP | 2021509488 A | 3/2021 |
| JP | 2021509736 A | 4/2021 |
| JP | 2021509737 A | 4/2021 |
| JP | 2021509739 A | 4/2021 |
| JP | 2021530747 A | 11/2021 |
| JP | 2022-523365 A | 4/2022 |
| JP | 2022542248 A | 9/2022 |
| JP | 7250799 B2 | 3/2023 |
| JP | 7404243 B2 | 12/2023 |
| KR | 20060132474 A | 12/2006 |
| KR | 20100092059 A | 8/2010 |
| KR | 20140140063 A | 12/2014 |
| KR | 20140142337 A | 12/2014 |
| KR | 20150072151 A | 6/2015 |
| KR | 20160084416 A | 7/2016 |
| KR | 10-2020-0106932 A | 9/2020 |
| KR | 10-2020-0108030 A | 9/2020 |
| KR | 2020-0106170 A | 9/2020 |
| KR | 20200104402 A | 9/2020 |
| KR | 1020210127237 A | 10/2021 |
| KR | 10-2022- 0036963 A | 3/2022 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | 9216880 A1 | 10/1992 |
| WO | 9701133 A1 | 1/1997 |
| WO | 1997001133 A1 | 1/1997 |
| WO | 1997027519 A1 | 7/1997 |
| WO | 1998004650 A1 | 2/1998 |
| WO | 1999009440 A1 | 2/1999 |
| WO | 1999052002 A1 | 10/1999 |
| WO | 2000016136 A1 | 3/2000 |
| WO | 2000023830 | 4/2000 |
| WO | 2000023832 A1 | 4/2000 |
| WO | 2000023847 | 4/2000 |
| WO | 2000028369 A2 | 5/2000 |
| WO | 2000028369 A3 | 10/2000 |
| WO | 2001050200 A2 | 7/2001 |
| WO | 2001090822 A1 | 11/2001 |
| WO | 2002082168 A1 | 10/2002 |
| WO | 02093204 A2 | 11/2002 |
| WO | 2003081320 A1 | 10/2003 |
| WO | 2004102226 A2 | 11/2004 |
| WO | 2005001753 A1 | 1/2005 |
| WO | 2005006065 A8 | 1/2005 |
| WO | 2005006065 A3 | 2/2005 |
| WO | 2005047988 A1 | 5/2005 |
| WO | 2005073798 A1 | 8/2005 |
| WO | 2006002870 A1 | 1/2006 |
| WO | 2006064301 A1 | 6/2006 |
| WO | 2006064325 A1 | 6/2006 |
| WO | 2006064334 A1 | 6/2006 |
| WO | 2006102073 A2 | 9/2006 |
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007085682 A1 | 8/2007 |
| WO | 2007130130 A2 | 11/2007 |
| WO | 2007141587 A1 | 12/2007 |
| WO | 2007141589 A1 | 12/2007 |
| WO | 2008011066 A2 | 1/2008 |
| WO | 2008011066 A9 | 5/2008 |
| WO | 2008081070 A1 | 7/2008 |
| WO | 2008100545 A2 | 8/2008 |
| WO | 2008011066 A3 | 12/2008 |
| WO | 2009013597 A2 | 1/2009 |
| WO | 2009013597 A3 | 1/2009 |
| WO | 2009077802 A1 | 6/2009 |
| WO | 2009077803 A1 | 6/2009 |
| WO | 2009101238 A1 | 8/2009 |
| WO | 2007130130 A3 | 9/2009 |
| WO | 2009155437 A1 | 12/2009 |
| WO | 2009155437 A8 | 3/2010 |
| WO | 2010023444 A1 | 3/2010 |
| WO | 2010057219 A1 | 5/2010 |
| WO | 2010067114 A1 | 6/2010 |
| WO | 2010067117 A1 | 6/2010 |
| WO | 2010078856 A1 | 7/2010 |
| WO | 2010104692 A2 | 9/2010 |
| WO | 2010122330 A1 | 10/2010 |
| WO | 2010125337 A2 | 11/2010 |
| WO | 2010125337 A3 | 11/2010 |
| WO | 2011012825 A1 | 2/2011 |
| WO | 2011032005 A2 | 3/2011 |
| WO | 2011042711 A2 | 4/2011 |
| WO | 2011051660 A1 | 5/2011 |
| WO | 2011055109 A2 | 5/2011 |
| WO | 2011042711 A3 | 6/2011 |
| WO | 2011073673 A1 | 6/2011 |
| WO | 2011107831 A1 | 9/2011 |
| WO | 2011110821 A1 | 9/2011 |
| WO | 2011131978 A1 | 10/2011 |
| WO | 2012052352 A1 | 4/2012 |
| WO | 2012062658 A1 | 5/2012 |
| WO | 2012158950 A1 | 11/2012 |
| WO | 2012172295 A1 | 12/2012 |
| WO | 2013027004 A1 | 2/2013 |
| WO | 2013027006 A1 | 2/2013 |
| WO | 2013033274 A1 | 3/2013 |
| WO | 2013034879 A1 | 3/2013 |
| WO | 2013049012 A1 | 4/2013 |
| WO | 2013054972 A1 | 4/2013 |
| WO | 2013102759 A2 | 7/2013 |
| WO | 2013163347 A1 | 10/2013 |
| WO | 2013167864 A1 | 11/2013 |
| WO | 2013190257 A1 | 12/2013 |
| WO | 2014064427 A1 | 5/2014 |
| WO | 2014080155 A1 | 5/2014 |
| WO | 2014085734 A1 | 6/2014 |
| WO | 2014090379 A1 | 6/2014 |
| WO | 2014091200 A1 | 6/2014 |
| WO | 2014093601 A1 | 6/2014 |
| WO | 2014100182 A1 | 6/2014 |
| WO | 2014113506 A1 | 7/2014 |

(56) References Cited

FOREIGN PATENT DOCUMENTS

| | | |
|---|---|---|
| WO | 2014116615 A1 | 7/2014 |
| WO | 2014130383 A1 | 8/2014 |
| WO | 2014144526 A2 | 9/2014 |
| WO | 2014159621 A1 | 10/2014 |
| WO | 2014164901 A1 | 10/2014 |
| WO | 2014176695 A1 | 11/2014 |
| WO | 2014179632 A1 | 11/2014 |
| WO | 2014188149 A1 | 11/2014 |
| WO | 2014209733 A1 | 12/2014 |
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015015138 A1 | 2/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020643 A1 | 2/2016 |
| WO | 2016025350 A1 | 2/2016 |
| WO | 2016042283 A1 | 3/2016 |
| WO | 2016044193 A1 | 3/2016 |
| WO | 2016046514 A1 | 3/2016 |
| WO | 2016069606 A1 | 5/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113534 A1 | 7/2016 |
| WO | 2016116733 A1 | 7/2016 |
| WO | 2016118107 A1 | 7/2016 |
| WO | 2016122679 A1 | 8/2016 |
| WO | 2016130509 A1 | 8/2016 |
| WO | 2016135434 A1 | 9/2016 |
| WO | 2016156776 A1 | 10/2016 |
| WO | 2016181108 A1 | 11/2016 |
| WO | 2016205256 A1 | 12/2016 |
| WO | 2016046514 A8 | 4/2017 |
| WO | 2017060665 A1 | 4/2017 |
| WO | 2017094129 A1 | 6/2017 |
| WO | 2017120320 A1 | 7/2017 |
| WO | 2017134412 A1 | 8/2017 |
| WO | 2017162999 A1 | 9/2017 |
| WO | 2017162999 A8 | 9/2017 |
| WO | 2017178781 A1 | 10/2017 |
| WO | 2017180403 A1 | 10/2017 |
| WO | 2017180923 A1 | 10/2017 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018094292 A1 | 5/2018 |
| WO | 2018102834 A2 | 6/2018 |
| WO | 2018102834 A3 | 6/2018 |
| WO | 2018096359 A3 | 7/2018 |
| WO | 2018129398 A1 | 7/2018 |
| WO | 2018150163 A1 | 8/2018 |
| WO | 2018206487 A1 | 11/2018 |
| WO | 2019046649 A1 | 3/2019 |
| WO | 2019077307 A1 | 4/2019 |
| WO | 2019079350 A2 | 4/2019 |
| WO | 2019079350 A3 | 4/2019 |
| WO | 2019046649 A8 | 5/2019 |
| WO | 2019122806 A1 | 6/2019 |
| WO | 2019135784 A1 | 7/2019 |
| WO | 2019135796 A1 | 7/2019 |
| WO | 2019135837 A1 | 7/2019 |
| WO | 2019136470 A1 | 7/2019 |
| WO | 2019136471 A1 | 7/2019 |
| WO | 2019136473 A1 | 7/2019 |
| WO | 2019171038 A1 | 9/2019 |
| WO | 2019185973 A1 | 10/2019 |
| WO | 2019185975 A1 | 10/2019 |
| WO | 2019185976 A1 | 10/2019 |
| WO | 2019185977 A1 | 10/2019 |
| WO | 2019217453 A1 | 11/2019 |
| WO | 2020023779 A1 | 1/2020 |
| WO | 2020149956 A1 | 7/2020 |
| WO | 2020168348 A1 | 8/2020 |
| WO | 2020172681 A1 | 8/2020 |
| WO | 2020186113 A1 | 9/2020 |
| WO | 2020212682 A1 | 10/2020 |
| WO | 2020227236 A1 | 11/2020 |
| WO | 2021016371 A1 | 1/2021 |
| WO | 2021032982 A1 | 2/2021 |
| WO | 2021032983 A1 | 2/2021 |
| WO | 2021044121 A1 | 3/2021 |

OTHER PUBLICATIONS

Digi Lens: Waveguides, announced unknown, [online], [site visited Nov. 6, 2020]. Available from Internet, <URL: https://www.digilens.com/technology/waveguides/> (Year: 2020).
Extended European Search Report for European Application No. 18727645.6, Search completed Oct. 14, 2020, Mailed Oct. 23, 2020, 13 pgs.
Extended Search Report for European Application No. 18898841.4, Search completed Mar. 18, 2021, Mailed Mar. 26, 2021, 10 pgs.
International Preliminary Report on Patentability for International Application PCT/US2019/043496 Report issued Jan. 26, 2021, Mailed Feb. 4, 2021, 5 pgs.
International Preliminary Report on Patentability for International Application No. PCT/GB2016/000051, Report issued Sep. 19, 2017, Mailed Sep. 28, 2017, 7 pgs.
International Preliminary Report on Patentability for International Application No. PCT/US2018/012227, Report issued Jul. 30, 2019, Mailed Aug. 8, 2019, 7 pgs.
International Preliminary Report on Patentability for International Application PCT/US2018/048960, Report issued on Mar. 3, 2020, Mailed on Mar. 12, 2020, 7 pgs.
International Preliminary Report on Patentability for International Application PCT/US2019/031163, Report issued Nov. 10, 2020, Mailed Nov. 19, 2020, 6 pgs.
International Preliminary Report on Patentability for International Application PCT/US2019/064765, Report issued Oct. 19, 2020, Mailed Oct. 28, 2020, 27 pgs.
International Search Report and Written Opinion for International Application No. PCT/US2018/012227, Search completed Feb. 28, 2018, Mailed Mar. 14, 2018, 8 pgs.
International Search Report and Written Opinion for International Application No. PCT/US2019/064765, Search completed Feb. 3, 2020, Mailed Mar. 18, 2020, 11 pgs.
International Search Report and Written Opinion for International Application No. PCT/US2020/018686, Search completed Apr. 25, 2020, Mailed May 22, 2020, 11 pgs.
International Search Report and Written Opinion for International Application No. PCT/US2020/022482, Search completed May 12, 2020, Mailed Jun. 9, 2020, 11 pgs.
International Search Report and Written Opinion for International Application No. PCT/US2020/031363, completed May 28, 2020, Mailed Jun. 10, 2020, 8 pgs.
International Search Report and Written Opinion for International Application No. PCT/US2020/043107, Search completed Sep. 28, 2020, Mailed Oct. 15, 2020, 12 pgs.
International Search Report and Written Opinion for International Application No. PCT/US2019/065478, Search completed Jan. 29, 2020, Mailed on Feb. 11, 2020, 14 pgs.
International Search Report for PCT/GB2016/000051, Completed Aug. 11, 2016, 3 pgs.
Supplementary Partial European Search Report for European Application No. 18727645.6, Search completed Jul. 2, 2020, Mailed Jul. 13, 2020, 13 pgs.
Written Opinion for International Application PCT/GB2016/000003, completed May 31, 2016, mailed Aug. 12, 2016, 10 pgs.

(56) References Cited

OTHER PUBLICATIONS

Google search: "digilens waveguide" [site visited Sep. 14, 2020], https://www.google.com/search?q=digilens+waveguide&sxsrf=ALeKk02RFwZAZ0vrlxVH0M_2fixFkhW1 FA: 1604777621684&source=Inms&tbm=isch&sa=X&ved=2ah U KEwjjyNXAlvHsAh U Rh HI EHTufCvsQ_AUoAnoECBwQBA&biw=1200&bih=1777.

Google search: "eyewear display devices" [site visited Sep. 14, 2020], https://www.google.com/search?q=eyewear+display+devices&sxsrf=ALeKk0 1WWfnOAgsQR_bhydJaYK3e37r J Lg: 1604779001617&source=Inms&tbm=isch&sa=X&ved=2ah U KEwi99txSm_HsAhVaoH IEHawtD8QQ_AUoAnoECC8QBA&biw=1200&bih=1777.

Google search: "smart glasses" [site visited Sep. 14, 2020], https://www.google.com/search?q=smart+glasses&sxsrf=ALeKk01 KN 1wj23-NqP -KCnrcsUpCgxyKA: 1604779046920&source=Inms&tbm=isch&sa=X&ved=2ah U KEwipkqPom_HsAhVKhXI EHQGFBp8Q_AUoBHoECCgQBg&biw=1200&bih=1777.

"The Next Generation of TV", SID Information Display, Nov./Dec. 2014, vol. 30, No. 6, 56 pgs.

Carothers, "Polymers and polyfunctionality", Transactions of the Faraday Society, 1936, vol. 32, pp. 39-49.

Doolittle, "Studies in Newtonian Flow II. The Dependence of the Viscosity of Liquids on Free-Space", Journal of Applied Physics, 1951, vol. 22, Issue 12, pp. 1471-1475, published online Apr. 29, 2004, https://doi.org/10.1063/1. 1699894.

Flory, "Molecular size distribution in three-dimensional polymers. I. Gelation", J. Am. Chem. Soc., Nov. 1941, vol. 63, pp. 3083-3090.

Gerritsen et al., "Application of Kogelnik's two-wave theory to deep, slanted, highly efficient, relief transmission gratings", Applied Optics, Mar. 1, 1991, vol. 30; No. 7, pp. 807-814.

Golub et al., "Bragg properties of efficient surface relief gratings in the resonance domain", Optics Communications, Feb. 24, 2004, vol. 235, pp. 261-267, doi: 10.1016/j.optcom.2004.02.069.

Guo et al., "Analysis of the effects of viscosity, volume, and temperature in photopolymer material for holographic applications", Proc. SPIE, May 2013, vol. 8776, pp. 87760J-1-87760-J15, DOI:10.1117/12.2018330.

Lougnot et al., "Polymers for holographic recording: VI. Some basic ideas for modelling the kinetics of the recording process", Pure and Applied Optics: Journal of the European Optical Society Part A, 1997, vol. 6, No. 2, pp. 225-245, https://doi.org/10.1088/0963-9659/6/2/007.

Moharam et al., "Diffraction characteristics of photoresist surface-relief gratings", Applied Optics, Sep. 15, 1984, vol. 23, pp. 3214-3220.

Sabel et al., "Simultaneous formation of holographic surface relief gratings and vol. phase gratings in photosensitive polymer", Materials Research Letters, May 30, 2019, vol. 7, No. 10, pp. 405-411, doi: 10.1080/21663831.2019.1621956.

Sakhno et al., "Deep surface relief grating in azobenzene-containing materials using a low-intensity 532 nm laser", Optical Materials: X, Jan. 23, 2019, 100006, pp. 3-7, doi: 10.1016/j.omx.2019.100006.

Sutherland et al., "Phenomenological model of anisotropic volume hologram formation in liquid-crystal-photopolymer mixtures", Journal of Applied Physics, Jun. 30, 2004, vol. 96, No. 2, https://doi.org/10.1063/1.1762713.

Tondiglia et al., "Holographic Formation of Electro-Optical Polymer-Liquid Crystal Photonic Crystals", Advanced Materials, 2002, Published Online Nov. 8, 2001, vol. 14, No. 3, pp. 187-191.

Yang et al., "Robust and Accurate Surface Measurement Using Structured Light", IEEE, Apr. 30, 2008, vol. 57, Issue 6, pp. 1275-1280, DOI:10.1109/TIM.2007.915103.

Yokomori, "Dielectric surface-relief gratings with high diffraction efficiency", Applied Optics, Jul. 15, 1984, vol. 23; No. 14, pp. 2303-2310.

Zhao et al., "Diffusion Model of Hologram Formation in Dry Photopolymer Materials", Journal of Modern Optics, 1994. vol. 41, No. 10, pp. 1929-1939, https://doi.org/10.1080/09500349414551831.

Zhao et al., "Extension of a diffusion model for holographic photopolymers", Journal of Modern Optics, 1995, vol. 42, No. 12, pp. 2571-2573, https://doi.org/10.1080/713824349.

Extended European Search Report for European Application No. 18897932.2, Search completed Dec. 22, 2021, Mailed Jan. 12, 2022, 8 pgs.

Extended European Search Report for European Application No. 20760111.3, Search completed Sep. 19, 2022, Mailed Sep. 29, 2022, 12 Pgs.

International Preliminary Report on Patentability for International Application PCT/US2020/043107, Report issued Jan. 25, 2022, Mailed on Feb. 3, 2022, 6 pgs.

Banerji et al., "A lymphocyte-specific cellular enhancer is located downstream of the joining region in immunoglobulin heavy chain genes", Cell, vol. 33, No. 3, Jul. 1983, pp. 729-740, doi: 10.1016/0092-8674(83)90015-6.

Waldern et al., "DigiLens switchable Bragg grating waveguide optics for augmented reality applications", Proc. SPIE, May 21, 2018, vol. 10676, pp. 1-16.

Extended European Search Report for European Application No. 20843609.7, Search completed Mar. 9, 2023, Mailed Mar. 17, 2023, 8 pgs.

Extended European Search Report for European Application No. 18898154.2, Search completed Aug. 13, 2021, Mailed Aug. 23, 2021, 7 Pgs.

Extended European Search Report for European Application No. 19736108.2, Search completed Sep. 15, 2021, Mailed Sep. 27, 2021, 8 Pgs.

International Preliminary Report on Patentability for International Application PCT/US2020/019549, Report issued Aug. 10, 2021, Mailed Sep. 2, 2021, 7 Pgs.

Liu et al., "Realization and Optimization of Holographic Waveguide Display System", Acta Optica Sinica, vol. 37, Issue 5, Issuing date—May 10, 2017, pp. 310-317.

Extended European Search Report for EP Application No. 13192383.1, dated Apr. 2, 2014, 7 pgs.

Extended European Search Report for European Application No. 13765610.4 dated Feb. 16, 2016, 6 pgs.

Extended European Search Report for European Application No. 15187491.4, search completed Jan. 15, 2016, mailed Jan. 28, 2016, 5 pgs.

International Preliminary Report on Patentability for International Application No. PCT/GB2010/000835, issued Nov. 1, 2011, mailed Nov. 10, 2011, 9 pgs.

International Preliminary Report on Patentability for International Application No. PCT/GB2010/001920, issued Apr. 11, 2012, mailed Apr. 19, 2012, 10 pgs.

International Preliminary Report on Patentability for International Application No. PCT/GB2010/001982, report issued May 1, 2012, mailed May 10, 2012, 7 pgs.

International Preliminary Report on Patentability for International Application No. PCT/GB2013/000273, issued Dec. 23, 2014, mailed Dec. 31, 2014, 8 pgs.

International Preliminary Report on Patentability for International Application No. PCT/GB2015/000203, issued Mar. 21, 2017, mailed Mar. 30, 2017, 8 pgs.

International Preliminary Report on Patentability for International Application No. PCT/GB2016/000036, issued Aug. 29, 2017, mailed Sep. 8, 2017, 8 pgs.

International Preliminary Report on Patentability for International Application No. PCT/GB2016/000065, issued Oct. 3, 2017, mailed Oct. 12, 2017, 8 pgs.

International Preliminary Report on Patentability for International Application No. PCT/US2018/037410, Report issued Jul. 14, 2020, Mailed Jul. 23, 2020, 7 pgs.

International Preliminary Report on Patentability for International Application No. PCT/US2018/048636, Report issued Jul. 14, 2020, Mailed Jul. 23, 2020, 9 pgs.

International Preliminary Report on Patentability for International Application No. PCT/US2018/062835, Report issued Jul. 14, 2020, Mailed Jul. 23, 2020, 7 pgs.

(56) References Cited

OTHER PUBLICATIONS

International Preliminary Report on Patentability for International Application No. PCT/US2019/012758, Report issued Jul. 14, 2020, Mailed Jul. 23, 2020, 4 pgs.
International Preliminary Report on Patentability for International Application No. PCT/US2019/012759, Report issued Jul. 14, 2020, Mailed Jul. 23, 2020, 6 pgs.
International Preliminary Report on Patentability for International Application PCT/US2018/015553, Report issued Jun. 4, 2019, Mailed Jun. 13, 2019, 6 pgs.
International Preliminary Report on Patentability for International Application PCT/GB2009/051676, issued Jun. 14, 2011, mailed Jun. 23, 2011, 6 pgs.
International Preliminary Report on Patentability for International Application PCT/GB2011/000349, issued Sep. 18, 2012, mailed Sep. 27, 2012, 10 pgs.
International Preliminary Report on Patentability for International Application PCT/GB2012/000331, issued Oct. 8, 2013, mailed Oct. 17, 2013, 8 pgs.
International Preliminary Report on Patentability for International Application PCT/GB2012/000677, issued Feb. 25, 2014, mailed Mar. 6, 2014, 5 pgs.
International Preliminary Report on Patentability for International Application PCT/GB2013/000005, issued Jul. 8, 2014, mailed Jul. 17, 2014, 12 pgs.
International Preliminary Report on Patentability for International Application PCT/GB2014/000295, issued Feb. 2, 2016, mailed Feb. 11, 2016, 4 pgs.
International Preliminary Report on Patentability for International Application PCT/GB2015/000225, issued Feb. 14, 2017, mailed Feb. 23, 2017, 8 pgs.
International Preliminary Report on Patentability for International Application PCT/GB2015/000228, issued Feb. 14, 2017, mailed Feb. 23, 2017, 11 pgs.
International Preliminary Report on Patentability for International Application PCT/GB2015/000274, Issued Mar. 28, 2017, mailed Apr. 6, 2017, 8 pgs.
International Preliminary Report on Patentability for International Application PCT/GB2016/000014, issued Jul. 25, 2017, mailed Aug. 3, 2017, 7 pgs.
International Preliminary Report on Patentability for International Application PCT/GB2017/000055, issued Oct. 16, 2018, Mailed Oct. 25, 2018, 9 pgs.
International Preliminary Report on Patentability for International Application PCT/US2014/011736, issued Jul. 21, 2015, mailed Jul. 30, 2015, 9 pgs.
International Preliminary Report on Patentability for International Application PCT/US2016/017091, issued Aug. 15, 2017, mailed Aug. 24, 2017, 5 pgs.
International Preliminary Report on Patentability for International Application PCT/US2018/012691, issued Jul. 9, 2019, Mailed Jul. 18, 2019, 10 pgs.
International Preliminary Report on Patentability for International Application PCT/US2019/012764, Report issued Jul. 14, 2020, Mailed Jul. 23, 2020, 5 pgs.
International Preliminary Report on Patentability for International Application PCT/GB2017/000040, Report issued Sep. 25, 2018, Mailed Oct. 4, 2018, 7 pgs.
International Preliminary Report on Patentability for PCT Application No. PCT/US2013/038070, dated Oct. 28, 2014, 6 pgs.
International Search Report and Written Opinion for International Application No. PCT/US2019/031163, Search completed Jul. 9, 2019, Mailed Jul. 29, 2019, 11 pgs.
International Search Report and Written Opinion for International Application No. PCT/GB2010/000835, completed Oct. 26, 2010, mailed Nov. 8, 2010, 12 pgs.
International Search Report and Written Opinion for International Application No. PCT/GB2010/001920, completed Mar. 29, 2011, mailed Apr. 6, 2011, 15 pgs.

International Search Report and Written Opinion for International Application No. PCT/GB2015/000228, Search completed May 4, 2011, Mailed Jul. 15, 2011, 15 pgs.
International Search Report and Written Opinion for International Application No. PCT/GB2016/000036, completed Jul. 4, 2016, mailed Jul. 13, 2016, 10 pgs.
International Search Report and Written Opinion for International Application No. PCT/GB2016/000065, completed Jul. 14, 2016, mailed Jul. 27, 2016, 10 pgs.
International Search Report and Written Opinion for International Application No. PCT/GB2017/000055, Search completed Jul. 19, 2017, Mailed Jul. 26, 2017, 12 pgs.
International Search Report and Written Opinion for International Application No. PCT/US2013/038070, completed Aug. 12, 2013, mailed Aug. 14, 2013, 12 pgs.
International Search Report and Written Opinion for International Application No. PCT/US2014/011736, completed Apr. 18, 2014, mailed May 8, 2014, 10 pgs.
International Search Report and Written Opinion for International Application No. PCT/US2018/012691, completed Mar. 10, 2018, mailed Mar. 28, 2018, 16 pgs.
International Search Report and Written Opinion for International Application No. PCT/US2018/015553, completed Aug. 6, 2018, Mailed Sep. 19, 2018, 12 pgs.
International Search Report and Written Opinion for International Application No. PCT/US2018/037410, Search completed Aug. 16, 2018, Mailed Aug. 30, 2018, 11 pgs.
International Search Report and Written Opinion for International Application No. PCT/US2018/048636, Search completed Nov. 1, 2018, Mailed Nov. 15, 2018, 16 pgs.
International Search Report and Written Opinion for International Application No. PCT/US2018/056150, Search completed Dec. 4, 2018, Mailed Dec. 26, 2018, 10 pgs.
International Search Report and Written Opinion for International Application No. PCT/US2018/062835, Search completed Jan. 14, 2019, Mailed Jan. 31, 2019, 14 pgs.
International Search Report and Written Opinion for International Application No. PCT/US2019/012758, completed Mar. 12, 2019, mailed Mar. 27, 2019, 9 pgs.
International Search Report and Written Opinion for International Application No. PCT/US2019/012764, completed Mar. 1, 2019, mailed Mar. 18, 2019, 9 pgs.
International Search Report and Written Opinion for International Application No. PCT/US2019/043496, Search completed Sep. 28, 2019, Mailed Nov. 14, 2019, 12 pgs.
International Search Report and Written Opinion for International Application No. PCT/US2020/019549, Search completed Apr. 14, 2020, Mailed May 22, 2020, 12 pgs.
International Search Report and Written Opinion for International Application No. PCT/US2018/048960, Search completed Dec. 14, 2018, Mailed Jan. 8, 2019, 14 pgs.
International Search Report and Written Opinion for International Application PCT/GB2009/051676, completed May 10, 2010, mailed May 18, 2010, 7 pgs.
International Search Report and Written Opinion for International Application PCT/GB2016/000181, completed Dec. 21, 2016, mailed Feb. 27, 2017, 21 pgs.
International Search Report and Written Opinion for International Application PCT/US2016/017091, completed by the European Patent Office on Apr. 20, 2016, 7 pgs.
International Search Report and Written Opinion for International Application PCT/US2019/012759, completed Mar. 14, 2019, mailed Apr. 15, 2019, 12 pgs.
International Search Report for International Application No. PCT/GB2014/000295, completed Nov. 18, 2014, mailed Jan. 5, 2015, 4 pgs.
International Search Report for International Application PCT/GB2017/000040, mailed Jul. 18, 2017, completed Jul. 10, 2017, 3 pgs.
International Search Report for PCT/GB2010/001982, completed by the European Patent Office on Feb. 24, 2011, 4 pgs.
International Search Report for PCT/GB2011/000349, completed by the European Patent Office on Aug. 17, 2011, 4 pgs.

(56) References Cited

OTHER PUBLICATIONS

International Search Report for PCT/GB2012/000331, completed by the European Patent Office on Aug. 29, 2012, 4 pgs.
International Search Report for PCT/GB2012/000677, completed by the European Patent Office on Dec. 10, 2012, 4 pgs.
International Search Report for PCT/GB2013/000005, completed by the European Patent Office on Jul. 16, 2013, 3 pgs.
International Search Report for PCT/GB2013/000273, completed by the European Patent Office on Aug. 30, 2013, 4 pgs.
International Search Report for PCT/GB2015/000203, completed by the European Patent Office on Oct. 9, 2015, 4 pgs.
International Search Report for PCT/GB2015/000225, completed by the European Patent Office on Nov. 10, 2015, mailed Dec. 2, 2016, 5 pgs.
International Search Report for PCT/GB2015/000274, completed by the European Patent Office on Jan. 7, 2016, 4 pgs.
International Search Report for PCT/GB2016/000014, completed by the European Patent Office on Jun. 27, 2016, 4 pgs.
Written Opinion for International Application No. PCT/GB2010/001982, search completed Feb. 24, 2011, mailed Mar. 8, 2011, 6 pgs.
Written Opinion for International Application No. PCT/GB2011/000349, completed Aug. 17, 2011, mailed Aug. 25, 2011, 9 pgs.
Written Opinion for International Application No. PCT/GB2012/000331, completed Aug. 29, 2012, mailed Sep. 6, 2012, 7 pgs.
Written Opinion for International Application No. PCT/GB2012/000677, completed Dec. 10, 2012, mailed Dec. 17, 2012, 4 pgs.
Written Opinion for International Application No. PCT/GB2013/000005, search completed Jul. 16, 2013, mailed Jul. 24, 2013, 11 pgs.
Written Opinion for International Application No. PCT/GB2013/000273, completed Aug. 30, 2013, mailed Sep. 9, 2013, 7 pgs.
Written Opinion for International Application No. PCT/GB2014/000295, search completed Nov. 18, 2014, mailed Jan. 5, 2015, 3 pgs.
Written Opinion for International Application No. PCT/GB2015/000203, completed Oct. 29, 2015, mailed Nov. 16, 2015, 7 pgs.
Written Opinion for International Application No. PCT/GB2015/000225, search completed Nov. 10, 2015, mailed Feb. 4, 2016, 7 pgs.
Written Opinion for International Application No. PCT/GB2015/000274, search completed Jan. 7, 2016, mailed Jan. 19, 2016, 7 pgs.
Written Opinion for International Application No. PCT/GB2016/000014, search completed Jun. 27, 2016, mailed Jul. 7, 2016, 6 pgs.
Written Opinion for International Application No. PCT/GB2016/000051, Search completed Aug. 11, 2016, Mailed Aug. 22, 2016, 6 pgs.
Written Opinion for International Application No. PCT/GB2017/000040, search completed Jul. 10, 2017, mailed Jul. 18, 2017, 6 pgs.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting Volume Bragg Grating for angular selection and magnification", 2015, www.OptiGrate.com.
"Cree XLamp XP-E LEDs", Cree, Inc., Retrieved from www.cree.com/Xlamp, CLD-DS18 Rev 17, 2013, 17 pgs.
"Desmodur N 3900", Bayer MaterialScience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261.
"FHS Lenses Series", Fraen Corporation, www.fraen.com, Jun. 16, 2003, 10 pgs.
"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display", BAE Systems, 2016, 2 pgs.
"LiteHUD Head-up display infographic", BAE Systems, 2017, 2 pgs.
"Luxeon C: Power Light Source", Philips Lumileds, www.philipslumileds.com, 2012, 18 pgs.
"Luxeon Rebel ES: Leading efficacy and light output, maximum design flexibility", LUXEON Rebel ES Datasheet DS61 Feb. 21, 2013, www.philipslumileds.com, 2013, 33 pgs.
"Mobile Display Report", Insight Media, LLC, Apr. 2012, vol. 7, No. 4, 72 pgs.
"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Navy awards SGB Labs a contract for HMDs for simulation and training", Press releases, DigiLens, Oct. 2012, pp. 1-2.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
"Plastic has replaced glass in photochromic lens", www.plastemart.com, 2003, 1 page.
"Range Finding Using Pulse Lasers", OSRAM, Opto Semiconductors, Sep. 10, 2004, 7 pgs.
"Response time in Liquid-Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniqueICs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"Thermal Management Considerations for SuperFlux LEDs", Lumileds, application brief AB20-4, Sep. 2002, 14 pgs.
"USAF Awards SBG Labs an SBIR Contract for Wide Field of View HUD", Press Release, SBG Labs DigiLens, Apr. 2014, 2 pgs.
"UVTOP240", Roithner LaserTechnik GmbH, v 2.0, Jun. 24, 2013, 6 pgs.
"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.
"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.
"Webster's Third New International Dictionary 433", (1986), 3 pages.

(56) References Cited

OTHER PUBLICATIONS

"X-Cubes—Revisited for LCOS", BASID, RAF Electronics Corp. Rawson Optics, Inc., Oct. 24, 2002, 16 pgs.

Aachen, "Design of plastic optics for LED applications", Optics Colloquium 2009, Mar. 19, 2009, 30 pgs.

Abbate et al., "Characterization of LC-polymer composites for opto-electronic application", Proceedings of OPTOEL'03, Leganes-Madrid, Spain, Jul. 14-16, 2003, 4 pgs.

Al-Kalbani et al., "Ocular Microtremor laser speckle metrology", Proc. of SPIE, 2009, vol. 7176 717606-1, 12 pgs.

Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.

Amitai et al., "Visor-display design based on planar holographic optics", Applied Optics, vol. 34, No. 8, Mar. 10, 1995, pp. 1352-1356.

Amundson et al., "Morphology and electro-optic properties of polymer-dispersed liquid-crystal films", Physical Review E, Feb. 1997, vol. 55. No. 2, pp. 1646-1654.

An et al., "Speckle suppression in laser display using several partially coherent beams", Optics Express, Jan. 5, 2009, vol. 17, No. 1, pp. 92-103.

Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.

Arnold et al., "52.3: An Improved Polarizing Beamsplitter LCOS Projection Display Based on Wire-Grid Polarizers", Society for Information Display, Jun. 2001, pp. 1282-1285.

Ayras et al., "Exit pupil expander with a large field of view based on diffractive optics", Journal of the SID, May 18, 2009, 17/8, pp. 659-664.

Baets et al., "Resonant-Cavity Light-Emitting Diodes: a review", Proceedings of SPIE, 2003, vol. 4996, pp. 74-86.

Bayer et al., "Introduction to Helmet-Mounted Displays", 2016, pp. 47-108.

Beckel et al., "Electro-optic properties of thiol-ene polymer stabilized ferroelectric liquid crystals", Liquid Crystals, vol. 30, No. 11, Nov. 2003, pp. 1343-1350.

Bergkvist, "Biospeckle-based Study of the Line Profile of Light Scattered in Strawberries", Master Thesis, Lund Reports on Atomic Physics, LRAP-220, Lund 1997, pp. 1-62.

Bernards et al., "Nanoscale porosity in polymer films: fabrication and therapeutic applications", Soft Matter, Jan. 1, 2010, vol. 6, No. 8, pp. 1621-1631.

Bleha et al., "Binocular Holographic Waveguide Visor Display", SID Symposium Digest of Technical Papers, Holoeye Systems Inc., Jun. 2014, San Diego, CA, 4 pgs.

Bleha et al., "D-ILA Technology for High Resolution Projection Displays", Sep. 10, 2003, Proceedings, vol. 5080, doi: 10.1117/12.497532, 11 pgs.

Bone, "Design Obstacles for LCOS Displays in Projection Applications "Optics architectures for LCOS are still evolving"", Aurora Systems Inc., Bay Area SID Seminar, Mar. 27, 2001, 22 pgs.

Born et al., "Optics of Crystals", Principles of Optics 5th Edition 1975, pp. 705-707.

Bourzac, "Magic Leap Needs to Engineer a Miracle", Intelligent Machines, Jun. 11, 2015, 7 pgs.

Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.

Bowley et al., "Variable-wavelength switchable Bragg gratings formed in polymer-dispersed liquid crystals", Applied Physics Letters, Jul. 2, 2001, vol. 79, No. 1, pp. 9-11.

Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738.

Brown, "Waveguide Displays", Rockwell Collins, 2015, 11 pgs.

Bruzzone et al., "Compact, high-brightness LED illumination for projection systems", Journal of the SID 17/12, Dec. 2009, pp. 1043-1049.

Buckley, "Colour holographic laser projection technology for heads-up and instrument cluster displays", Conference: Proc. SID Conference 14th Annual Symposium on Vehicle Displays, Jan. 2007, 5 pgs.

Buckley, "Pixtronix DMS technology for head-up displays", Pixtronix, Inc., Jan. 2011, 4 pgs.

Buckley et al., "Full colour holographic laser projector HUD", Light Blue Optics Ltd., Aug. 10, 2015, 5 pgs.

Buckley et al., "Rear-view virtual image displays", in Proc. SID Conference 16th Annual Symposium on Vehicle Displays, Jan. 2009, 5 pgs.

Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.

Bunning et al., "Electro-optical photonic crystals formed in H-PDLCs by thiol-ene photopolymerization", American Physical Society, Annual APS, Mar. 3-7, 2003, abstract #R1.135.

Bunning et al., "Holographic Polymer-Dispersed Liquid Crystals (H-PDLCs)1", Annu. Rev. Mater. Sci., 2000, vol. 30, pp. 83-115.

Bunning et al., "Morphology of Anisotropic Polymer Dispersed Liquid Crystals and the Effect of Monomer Functionality", Polymer Science: Part B: Polymer Physics, Jul. 30, 1997, vol. 35, pp. 2825-2833.

Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662.

Butler et al., "Diffractive Properties of Highly Birefringent vol. Gratings: Investigation", Journal of Optical Society of America, Feb. 2002, vol. 19, No. 2, pp. 183-189.

Cai et al., "Recent advances in antireflective surfaces based on nanostructure arrays", Mater. Horiz., 2015, vol. 2, pp. 37-53.

Cameron, "Optical Waveguide Technology & Its Application In Head Mounted Displays", Proc. of SPIE, May 22, 2012, vol. 8383, pp. 83830E-1-83830E-11.

Cameron, "The Application of Holographic Optical Waveguide Technology to Q-Sight™ Family of Helmet Mounted Displays", Proc. of SPIE, 2009, 11 pages, vol. 7326.

Caputo et al., "Policryps Composite Materials: Features and Applications", Advances in Composite Materials—Analysis of Natural and Man-Made Materials, www.intechopen.com, Sep. 2011, pp. 93-118.

Caputo et al., "Policryps Switchable Holographic Grating: A Promising Grating Electro-Optical Pixel for High Resolution Display Application", Journal of Display Technology, Mar. 2006, vol. 2, No. 1, pp. 38-51.

Carclo Optics, "Guide to choosing secondary optics", Carclo Optics, Dec. 15, 2014, www.carclo-optics.com, 48 pgs.

Chen et al., "Polarization rotators fabricated by thermally-switched liquid crystal alignments based on rubbed poly(N-vinyl carbazole) films", Optics Express, Apr. 11, 2011, vol. 19, No. 8, pp. 7553-7558.

Cheng et al., "Design of an ultra-thin near-eye display with geometrical waveguide and freeform optics", Optics Express, Aug. 2014, 16 pgs.

Chi et al., "Ultralow-refractive-index optical thin films through nanoscale etching of ordered mesoporous silica films", Optic Letters, May 1, 2012, vol. 37, No. 9, pp. 1406-1408.

Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.

Cho et al., "Electro-optic Properties of CO2 Fixed Polymer/Nematic LC Composite Films", Journal of Applied Polymer Science, Nov. 5, 2000, vol. 81, Issue 11, pp. 2744-2753.

Cho et al., "Optimization of Holographic Polymer Dispersed Liquid Crystals for Ternary Monomers", Polymer International, Nov. 1999, vol. 48, pp. 1085-1090.

Colegrove et al., "P-59: Technology of Stacking HPDLC for Higher Reflectance", SID 00 Digest, May 2000, pp. 770-773.

Crawford, "Electrically Switchable Bragg Gratings", Optics & Photonics News, Apr. 2003, pp. 54-59.

(56) References Cited

OTHER PUBLICATIONS

Cruz-Arreola et al., "Diffraction of beams by infinite or finite amplitude-phase gratings", Investigacio' N Revista Mexicana De Fi'Sica, Feb. 2011, vol. 57, No. 1, pp. 6-16.
Dabrowski, "High Birefringence Liquid Crystals", Crystals, Sep. 3, 2013, vol. 3, No. 3, pp. 443-482.
Dainty, "Some statistical properties of random speckle patterns in coherent and partially coherent illumination", Optica Acta, Mar. 12, 1970, vol. 17, No. 10, pp. 761-772.
Date, "Alignment Control in Holographic Polymer Dispersed Liquid Crystal", Journal of Photopolymer Science and Technology, Nov. 2, 2000, vol. 13, pp. 289-284.
Date et al., "52.3: Direct-viewing Display Using Alignment-controlled PDLC and Holographic PDLC", Society for Information Display Digest, May 2000, pp. 1184-1187, DOI: 10.1889/1.1832877.
Date et al., "Full-color reflective display device using holographically fabricated polymer-dispersed liquid crystal (HPDLC)", Journal of the SID, 1999, vol. 7, No. 1, pp. 17-22.
De Bitetto, "White light viewing of surface holograms by simple dispersion compensation", Applied Physics Letters, Dec. 15, 1966, vol. 9, No. 12, pp. 417-418.
De Sarkar et al., "Effect of Monomer Functionality on the Morphology and Performance of Holographic Transmission Gratings Recorded on Polymer Dispersed Liquid Crystals", Macromolecules, 2003, vol. 36, No. 3, pp. 630-638.
Developer World, "Create customized augmented reality solutions", printed Oct. 19, 2017, LMX-001 holographic waveguide display, Sony Developer World, 3 pgs.
Dhar et al., "Recording media that exhibit high dynamic range for digital holographic data storage", Optics Letters, Apr. 1, 1999, vol. 24, No. 7, pp. 487-489.
Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.
Drake et al., "Waveguide Hologram Fingerprint Entry Device", Optical Engineering, Sep. 1996, vol. 35, No. 9, pp. 2499-2505.
Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537].
Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212.
Ducharme, "Microlens diffusers for efficient laser speckle generation", Optics Express, Oct. 29, 2007, vol. 15, No. 22, pp. 14573-14579.
Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.
Fattal et al., "A multi directional backlight for a wide-angle glasses-free three-dimensional display", Nature, Mar. 21, 2012, vol. 495, pp. 348-351.
Fontecchio et al., "Spatially Pixelated Reflective Arrays from Holographic Polymer Dispersed Liquid Crystals", SID 00 Digest, May 2000, pp. 774-776.
Forman et al., "Materials development for PhotoINhibited Super-Resolution (PINSR) lithography", Proc. of SPIE, 2012, vol. 8249, 824904, doi: 10.1117/12.908512, pp. 824904-1-824904-9.
Forman et al., "Radical diffusion limits to photoinhibited super-resolution lithography", Phys.Chem. Chem. Phys., May 31, 2013, vol. 15, pp. 14862-14867.
Friedrich-Schiller, "Spatial Noise and Speckle", Version 1.12.2011, Dec. 2011, Abbe School of Photonics, Jena, Germany, 27 pgs.
Fuh et al., "Thermally and Electrically Switchable Gratings Based Upon the Polymer-Balls Type Polymer-Dispersed Liquid Crystal Films", Appl. Phys. Vol. 41, No. 22, Aug. 1, 2002, pp. 4585-4589.

Fujii et al., "Nanoparticle-polymer-composite vol. gratings incorporating chain-transfer agents for holography and slow-neutron optics", Optics Letters, Apr. 25, 2014, vol. 39, Issue 12, 5 pgs.
Funayama et al., "Proposal of a new type thin film light-waveguide display device using", The International Conference on Electrical Engineering, 2008, No. P-044, 5 pgs.
Gabor, "Laser Speckle and its Elimination", BM Research and Development, Eliminating Speckle Noise, Sep. 1970, vol. 14, No. 5, pp. 509-514.
Gardiner et al., "Bistable liquid-crystals reduce power consumption for high-efficiency smart glazing", SPIE, 2009, 10.1117/2.1200904.1596, 2 pgs.
Giancola, "Holographic Diffuser, Makes Light Work of Screen Tests", Photonics Spectra, 1996, vol. 30, No. 8, pp. 121-122.
Goodman, "Some fundamental properties of speckle", J. Opt. Soc. Am., Nov. 1976, vol. 66, No. 11, pp. 1145-1150.
Goodman, "Statistical Properties of Laser Speckle Patterns", Applied Physics, 1975, vol. 9, Chapter 2, Laser Speckle and Related Phenomena, pp. 9-75.
Goodman et al., "Speckle Reduction by a Moving Diffuser in Laser Projection Displays", The Optical Society of America, 2000, 15 pgs.
Guldin et al., "Self-Cleaning Antireflective Optical Coatings", Nano Letters, Oct. 14, 2013, vol. 13, pp. 5329-5335.
Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.
Han et al., "Study of Holographic Waveguide Display System", Advanced Photonics for Communications, 2014, 4 pgs.
Harbers et al., "I-15.3: LED Backlighting for LCD-HDTV", Journal of the Society for Information Display, 2002, vol. 10, No. 4, pp. 347-350.
Harbers et al., "Performance of High Power LED Illuminators in Color Sequential Projection Displays", Lumileds Lighting, 2007, 4 pgs.
Harbers et al., "Performance of High Power LED Illuminators in Color Sequential Projection Displays", Lumileds, Aug. 7, 2001, 11 pgs.
Harbers et al., "Performance of High-Power LED illuminators in Projection Displays", Proc. Int. Disp. Workshops, Japan. vol. 10, pp. 1585-1588, 2003.
Harding et al., "Reactive Liquid Crystal Materials for Optically Anisotropic Patterned Retarders", Merck, licrivue, 2008, ME-GR-RH-08-010, 20 pgs.
Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.
Hariharan, "Optical Holography: Principles, techniques and applications", Cambridge University Press, 1996, pp. 231-233.
Harris, "Photonic Devices", EE 216 Principals and Models of Semiconductor Devices, Autumn 2002, 20 pgs.
Harrold et al., "3D Display Systems Hardware Research at Sharp Laboratories of Europe: an update", Sharp Laboratories of Europe, Ltd., 7 pgs.
Harthong et al., "Speckle phase averaging in high-resolution color holography", J. Opt. Soc. Am. A, Feb. 1997, vol. 14, No. 2, pp. 405-409.
Hasan et al., "Tunable-focus lens for adaptive eyeglasses", Optics Express, Jan. 23, 2017, vol. 25, No. 2, 1221, 13 pgs.
Hasman et al., "Diffractive Optics: Design, Realization, and Applications", Fiber and Integrated Optics, vol. 16, pp. 1-25, 1997.
Hata et al., "Holographic nanoparticle-polymer composites based on step-growth thiol-ene photopolymerization", Optical Materials Express, Jun. 1, 2011, vol. 1, No. 2, pp. 207-222.
He et al., "Dynamics of peristrophic multiplexing in holographic polymer-dispersed liquid crystal", Liquid Crystals, Mar. 26, 2014, vol. 41, No. 5, pp. 673-684.
He et al., "Holographic 3D display based on polymer-dispersed liquid-crystal thin films", Proceedings of China Display/Asia Display 2011, pp. 158-160.

(56) References Cited

OTHER PUBLICATIONS

He et al., "Properties of Volume Holograms Recording in Photopolymer Films with Various Pulse Exposures Repetition Frequencies", Proceedings of SPIE vol. 5636, Bellingham, WA, 2005, doi: 10.1117/12.580978, pp. 842-848.
He et al., "Transmission Holographic Gratings Using Siloxane Containing Liquid Crystalline Compounds, Importance of Chemical Structure of Polymer Matrix Components", Polymer Journal, Jun. 9, 2006, vol. 38, No. 7, pp. 678-685.
Herman et al., "Production and Uses of Diffractionless Beams", J. Opt. Soc. Am. A., Jun. 1991, vol. 8, No. 6, pp. 932-942.
Hisano, "Alignment layer-free molecular ordering induced by masked photopolymerization with nonpolarized light", Appl. Phys. Express 9, Jun. 6, 2016, pp. 072601-1-072601-4.
Hoepfner et al., "LED Front Projection Goes Mainstream", Luminus Devices, Inc., Projection Summit, 2008, 18 pgs.
Holmes et al., "Controlling The Anisotropy of Holographic Polymer-Dispersed Liquid-Crystal Gratings", Physical Review E, Jun. 11, 2002, vol. 65, 066603-1-066603-4.
Hoyle et al., "Advances in the Polymerization of Thiol-Ene Formulations", Heraeus Noblelight Fusion UV Inc., 2003 Conference, 6 pgs.
Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.
Huang et al., "Diffraction properties of substrate guided-wave holograms", Optical Engineering, Oct. 1995, vol. 34, No. 10, pp. 2891-2899.
Huang et al., "Theory and characteristics of holographic polymer dispersed liquid crystal transmission grating with scaffolding morphology", Applied Optics, Jun. 20, 2012, vol. 51, No. 18, pp. 4013-4020.
Iannacchione et al., "Deuterium NMR and morphology study of copolymer-dispersed liquid-crystal Bragg gratings", Europhysics Letters, 1996, vol. 36, No. 6, pp. 425-430.
Irie, "Photochromic diarylethenes for photonic devices", Pure and Applied Chemistry, 1996, pp. 1367-1371, vol. 68, No. 7, IUPAC.
Jang et al., "Low Driving Voltage Holographic Polymer Dispersed Liquid Crystals with Chemically Incorporated Graphene Oxide", Journal of Materials Chemistry, 2011, vol. 21, p. 19226-19232, doi. 10.1039/1jm13827h.
Jeng et al., "Aligning liquid crystal molecules", SPIE, 2012, 10.1117/2.1201203.004148, 2 pgs.
Jeong et al., "Memory Effect of Polymer Dispersed Liquid Crystal by Hybridization with Nanoclay", express Polymer Letters, vol. 4, No. 1, 2010, pp. 39-46.
Jo et al., "Control of Liquid Crystal Pretilt Angle using Polymerization of Reactive Mesogen", IMID 2009 Digest, P1-25, 2009, pp. 604-606.
Juhl, "Interference Lithography for Optical Devices and Coatings", Dissertation, University of Illinois at Urbana-Champaign, 2010.
Juhl et al., "Holographically Directed Assembly of Polymer Nanocomposites", ACS Nano, Oct. 7, 2010, vol. 4, No. 10, pp. 5953-5961.
Jurbergs et al., "New recording materials for the holographic industry", Proc. of SPIE, 2009 vol. 7233, pp. 72330K-1-72330L-10, doi: 10.1117/12.809579.
Kahn et al., "Private Line Report on Large Area Display", Kahn International, Jan. 7, 2003, vol. 8, No. 10, 9 pgs.
Kakiuchida et al., "Multiple Bragg Diffractions with Different Wavelengths and Polarizations Composed of Liquid Crystal/Polymer Periodic Phases", ACS Omega, Sep. 22, 2017, pp. 6081-6090, doi: 10.1021/acsomega.7b01149.
Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.
Karp et al., "Planar micro-optic solar concentration using multiple imaging lenses into a common slab waveguide", Proc. of SPIE vol. 7407, 2009 SPIE, CCC code: 0277-786X/09, doi: 10.1117/12.826531, pp. 74070D-1-74070D-11.
Karp et al., "Planar micro-optic solar concentrator", Optics Express, Jan. 18, 2010, vol. 18, No. 2, pp. 1122-1133.
Kato et al., "Alignment-Controlled Holographic Polymer Dispersed Liquid Crystal (HPDLC) for Reflective Display Devices", SPIE, 1998, vol. 3297, pp. 52-57.
Kessler, "Optics of Near to Eye Displays (NEDs)", Oasis 2013, Tel Aviv, Feb. 19, 2013, 37 pgs.
Keuper et al., "26.1: RGB LED Illuminator for Pocket-Sized Projectors", SID 04 Digest, 2004, ISSN/0004-0966X/04/3502, pp. 943-945.
Keuper et al., "P-126: Ultra-Compact LED based Image Projector for Portable Applications", SID 03 Digest, 2003, ISSN/0003-0966X/03/3401-0713, pp. 713-715.
Kim et al., "Effect of Polymer Structure on the Morphology and Electro optic Properties of UV Curable PNLCs", Polymer, Feb. 2000, vol. 41, pp. 1325-1335.
Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.
Kim et al., "Fabrication of Reflective Holographic PDLC for Blue", Molecular Crystals and Liquid Crystals Science, 2001, vol. 368, pp. 3845-3853.
Kim et al., "Optimization of Holographic PDLC for Green", Mol. Cryst. Liq. Cryst., vol. 368, pp. 3855-3864, 2001.
Klein, "Optical Efficiency for Different Liquid Crystal Colour Displays", Digital Media Department, HPL-2000-83, Jun. 29, 2000, 18 pgs.
Kogelnik, "Coupled Wave Theory for Thick Hologram Gratings", The Bell System Technical Journal, vol. 48, No. 9, pp. 2909-2945, Nov. 1969.
Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.
Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.
Lauret et al., "Solving the Optics Equation for Effective LED Applications", Gaggione North America, LLFY System Design Workshop 2010, Oct. 28, 2010, 26 pgs.
Lee, "Patents Shows Widespread Augmented Reality Innovation", PatentVue, May 26, 2015, 5 pgs.
Levola, "Diffractive optics for virtual reality displays", Journal of the SID, 2006, 14/5, pp. 467-475.
Levola et al., "Near-to-eye display with diffractive exit pupil expander having chevron design", Journal of the SID, 2008, 16/8, pp. 857-862.
Levola et al., "Replicated slanted gratings with a high refractive index material for in and outcoupling of light", Optics Express, vol. 15, Issue 5, pp. 2067-2074 (2007).
Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.
Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.
Li et al., "Light Pipe Based Optical Train and its Applications", Proceedings vol. 5524, Novel Optical Systems Design and Optimization VII, Oct. 24, 2004, doi: 10.1117/12.559833, 10 pgs.
Li et al., "Novel Projection Engine with Dual Paraboloid Reflector and Polarization Recovery Systems", Wavien Inc., SPIE EI 5289-38, Jan. 21, 2004, 49 pgs.
Li et al., "Polymer crystallization/melting induced thermal switching in a series of holographically patterned Bragg reflectors", Soft Matter, Jul. 11, 2005, vol. 1, pp. 238-242.
Lin et al., "Ionic Liquids in Photopolymerizable Holographic Materials", in book: Holograms—Recording Materials and Applications, Nov. 9, 2011, 21 pgs.

(56) References Cited

OTHER PUBLICATIONS

Liu et al., "Effect of Surfactant on the Electro-Optical Properties of Holographic Polymer Dispersed Liquid Crystal Bragg Gratings", Optical Materials, 2005, vol. 27, pp. 1451-1455, available online Dec. 25, 2004, doi: 10.1016/j.optmat.2004.10.010.
Liu et al., "Holographic Polymer Dispersed Liquid Crystals" Materials, Formation and Applications, Advances in OptoElectronics, Nov. 30, 2008, vol. 2008, Article ID 684349, 52 pgs.
Lorek, "Experts Say Mass Adoption of augmented and Virtual Reality is Many Years Away", Siliconhills, Sep. 9, 2017, 4 pgs.
Lowenthal et al., "Speckle Removal by a Slowly Moving Diffuser Associated with a Motionless Diffuser", Journal of the Optical Society of America, Jul. 1971, vol. 61, No. 7, pp. 847-851.
Lu et al., "Polarization switch using thick holographic polymer-dispersed liquid crystal grating", Journal of Applied Physics, Feb. 1, 2004, vol. 95, No. 3, pp. 810-815.
Lu et al., "The Mechanism of electric-field-induced segregation of additives in a liquid-crystal host", Phys Rev E Stat Nonlin Soft Matter Phys., Nov. 27, 2012, 14 pgs.
Ma et al., "Holographic Reversed-Mode Polymer-Stabilized Liquid Crystal Grating", Chinese Phys. Lett., 2005, vol. 22, No. 1, pp. 103-106.
Mach et al., "Switchable Bragg diffraction from liquid crystal in colloid- templated structures", Europhysics Letters, Jun. 1, 2002, vol. 58, No. 5, pp. 679-685.
Magarinos et al., "Wide Angle Color Holographic infinity optics display", Air Force Systems Command, Brooks Air Force Base, Texas, AFHRL-TR-80-53, Mar. 1981, 100 pgs.
Marino et al., "Dynamical Behaviour of Policryps Gratings", Electronic-Liquid Crystal Communications, Feb. 5, 2004, 10 pgs.
Massenot et al., "Multiplexed holographic transmission gratings recorded in holographic polymer-dispersed liquid crystals: static and dynamic studies", Applied Optics, 2005, vol. 44, Issue 25, pp. 5273-5280.
Matay et al., "Planarization of Microelectronic Structures by Using Polyimides", Journal of Electrical Engineering, 2002, vol. 53, No. 3-4, pp. 86-90.
Mathews, "The LED FAQ Pages", Jan. 31, 2002, 23 pgs.
Matic, "Blazed phase liquid crystal beam steering", Proc. of the SPIE, 1994, vol. 2120, pp. 194-205.
McLeod, "Axicons and Their Uses", Journal of the Optical Society of America, Feb. 1960, vol. 50, No. 2, pp. 166-169.
McManamon et al., "A Review of Phased Array Steering for Narrow-Band Electrooptical Systems", Proceedings of the IEEE, Jun. 2009, vol. 97, No. 6, pp. 1078-1096.
McManamon et al., "Optical Phased Array Technology", Proceedings of the IEEE, Feb. 1996, vol. 84, Issue 2, pp. 268-298.
Miller, "Coupled Wave Theory and Waveguide Applications", The Bell System Technical Journal, Short Hills, NJ, Feb. 2, 1954, 166 pgs.
Moffitt, "Head-Mounted Display Image Configurations", retrieved from the internet on Dec. 19, 2014, dated May 2008, 25 pgs.
Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.
Nair et al., "Two-Stage Reactive Polymer Network Forming Systems", Advanced Functional Materials, 2012, pp. 1-9, DOI: 10.1002/adfm.201102742.
Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.
Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.
Natarajan et al., "Electro-Optical Switching Characteristics of Volume Holograms in Polymer Dispersed Liquid Crystals", J. of Nonlinear Optical Physics Materials, Jan. 1996, vol. 5, No. 1, pp. 89-98.
Natarajan et al., "Holographic polymer dispersed liquid crystal reflection gratings formed by visible light initiated thiol-ene photopolymerization", Polymer, vol. 47, May 8, 2006, pp. 4411-4420.
Naydenova et al., "Low-scattering Volume Holographic Material", DIT PhD Project, http://www.dit.ie/ieo/, Oct. 2017, 2 pgs.
Neipp et al., "Non-local polymerization driven diffusion based model: general dependence of the polymerization rate to the exposure intensity", Optics Express, Aug. 11, 2003, vol. 11, No. 16, pp. 1876-1886.
Nishikawa et al., "Mechanically and Light Induced Anchoring of Liquid Crystal on Polyimide Film", Mol. Cryst. Liq. Cryst., Aug. 1999, vol. 329, 8 pgs.
Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.
Nordin et al., "Diffraction Properties of Stratified Volume Holographic Optical Elements", Journal of the Optical Society of America A., vol. 9, No. 12, Dec. 1992, pp. 2206-2217.
Ogiwara et al., "Temperature Dependence of Anisotropic Diffraction in Holographic Polymer-Dispersed Liquid Crystal Memory", Applied Optics, Sep. 10, 2013, vol. 52, No. 26, pp. 6529-6536.
Ogiwara et al., "Thermo-Driven Light Controller by Using Thermal Modulation of Diffraction Wavelength in Holographic Polymer Dispersed Liquid Crystal Grating", Proc SPIE, Feb. 19, 2014, 9004, Article 90040Q, 8 pgs., doi: 10.1117/12.2039104.
Oh et al., "Achromatic diffraction from polarization gratings with high efficiency", Optic Letters, Oct. 15, 2008, vol. 33, No. 20, pp. 2287-2289.
Olson et al., "Templating Nanoporous Polymers with Ordered Block Copolymers", Chemistry of Materials, Web publication Nov. 27, 2007, vol. 20, pp. 869-890.
Ondax, Inc., "Volume Holographic Gratings (VHG)", 2005, 7 pgs.
Orcutt, "Coming Soon: Smart Glasses That Look Like Regular Spectacles", Intelligent Machines, Jan. 9, 2014, 4 pgs.
Osredkar, "A study of the limits of spin-on-glass planarization process", Informacije MIDEM, 2001, vol. 31, 2, ISSN0352-9045, pp. 102-105.
Osredkar et al., "Planarization methods in IC fabrication technologies", Informacije MIDEM, 2002, vol. 32, 3, ISSN0352-9045, 5 pgs.
Ou et al., "A Simple LCOS Optical System (Late News)", Industrial Technology Research Institute/OES Lab. Q100/Q200, SID 2002, Boston, USA, 2 pgs.
Paolini et al., "High-Power LED Illuminators in Projection Displays", Lumileds, Aug. 7, 2001, 19 pgs.
Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.
Park et al., "Fabrication of Reflective Holographic Gratings with Polyurethane Acrylates (PUA)", Current Applied Physics, Jun. 2002, vol. 2, pp. 249-252.
Peng et al., "Low Voltage Driven and Highly Diffractive Holographic Polymer Dispersed Liquid Crystals with Spherical Morphology", RSC Advances, 2017, vol. 7, pp. 51847-51857, doi: 10.1039/c7ra08949.
Plawsky et al., "Engineered nanoporous and nanostructured films", MaterialsToday, Jun. 2009, vol. 12, No. 6, pp. 36-45.
Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.
Presnyakov et al., "Electrically tunable polymer stabilized liquid-crystal lens", Journal of Applied Physics, Apr. 29, 2005, vol. 97, pp. 103101-1-103101-6.
Qi et al., "P-111: Reflective Display Based on Total Internal Reflection and Grating-Grating Coupling", Society for Information Display Digest, May 2003, pp. 648-651, DOI: 10.1889/1.1832359.
Ramón, "Formation of 3D micro- and nanostructures using liquid crystals as a template", Technische Universiteit Eindhoven, Apr. 17, 2008, Thesis, DOI:http://dx.doi.org/10.6100/IR634422, 117 pgs.

(56) References Cited

OTHER PUBLICATIONS

Ramsey, "Holographic Patterning of Polymer Dispersed Liquid Crystal Materials for Diffractive Optical Elements", Thesis, The University of Texas at Arlington, Dec. 2006, 166 pgs.
Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.
Reid, "Thin film silica nanocomposites for anti-reflection coatings", Oxford Advance Surfaces, www.oxfordsurfaces.com, Oct. 18, 2012, 23 pgs.
Riechert, "Speckle Reduction in Projection Systems", Dissertation, University Karlsruhe, 2009, 178 pgs.
Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.
Roussel et al., "Photopolymerization Kinetics and Phase Behavior of Acrylate Based Polymers Dispersed Liquid Crystals", Liquid Crystals, 1998, vol. 24, Issue 4, pp. 555-561.
Sagan et al., "Electrically Switchable Bragg Grating Technology for Projection Displays", Proc. SPIE. vol. 4294, Jan. 24, 2001, pp. 75-83.
Saleh et al., "Fourier Optics: 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.
Saraswat, "Deposition & Planarization", EE 311 Notes, Aug. 29, 2017, 28 pgs.
Schechter et al., "Compact beam expander with linear gratings", Applied Optics, vol. 41, No. 7, Mar. 1, 2002, pp. 1236-1240.
Schreiber et al., "Laser display with single-mirror MEMS scanner", Journal of the SID 17/7, 2009, pp. 591-595.
Seiberle et al., "Photo-aligned anisotropic optical thin films", Journal of the SID 12/1, 2004, 6 pgs.
Serebriakov et al., "Correction of the phase retardation caused by intrinsic birefringence in deep UV lithography", Proc. of SPIE, May 21, 2010, vol. 5754, pp. 1780-1791.
Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Smith et al., "RM-PLUS—Overview", Licrivue, Nov. 5, 2013, 16 pgs.
Sony Global, "Sony Releases the Transparent Lens Eyewear 'SmartEyeglass Developer Edition'", printed Oct. 19, 2017, Sony Global—News Releases, 5 pgs.
Steranka et al., "High-Power LEDs—Technology Status and Market Applications", Lumileds, Jul. 2002, 23 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—Poliphem", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat.1708, 8 pgs.
Sun et al., "Low-birefringence lens design for polarization sensitive optical systems", Proceedings of SPIE, 2006, vol. 6289, doi: 10.1117/12.679416, pp. 6289DH-1-6289DH-10.
Sun et al., "Transflective multiplexing of holographic polymer dispersed liquid crystal using Si additives", eXPRESS Polymer Letters, 2011, vol. 5, No. 1, pp. 73-81.
Sutherland et al., "Bragg Gratings in an Acrylate Polymer Consisting of Periodic Polymer-Dispersed Liquid-Crystal Planes", Chem. Mater., 1993, vol. 5, pp. 1533-1538.
Sutherland et al., "Electrically switchable volume gratings in polymer-dispersed liquid crystals", Applied Physics Letters, Feb. 28, 1994, vol. 64, No. 9, pp. 1074-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Sutherland et al., "The physics of photopolymer liquid crystal composite holographic gratings", presented at SPIE: Diffractive and Holographic Optics Technology San Jose, CA, 1996, SPIE, vol. 2689, pp. 158-169.
Sweatt, "Achromatic triplet using holographic optical elements", Applied Optics, May 1977, vol. 16, No. 5, pp. 1390-1391.
Tahata et al., "Effects of Polymer Matrix on Electro-Optic Properties of Liquid Crystal Mixed With Polymer", Proc SPIE, Mar. 11, 1996, vol. 2651, pp. 101-106, doi: 10.1117/12.235342.
Talukdar, "Technology Forecast: Augmented reality", Changing the economics of Smartglasses, Issue 2, 2016, 5 pgs.
Tao et al., "TiO2 nanocomposites with high refractive index and transparency", J. Mater. Chem., Oct. 4, 2011, vol. 21, pp. 18623-18629.
Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.
Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 10.1117/2.1200612.0475, 3 pgs.
Trisnadi, "Hadamard Speckle Contrast Reduction", Optics Letters, Jan. 1, 2004, vol. 29, No. 1, pp. 11-13.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Urey, "Diffractive exit pupil expander for display applications", Applied Optics, vol. 40, Issue 32, pp. 5840-5851 (2001).
Ushenko, "The Vector Structure of Laser Biospeckle Fields and Polarization Diagnostics of Collagen Skin Structures", Laser Physics, 2000, vol. 10, No. 5, pp. 1143-1149.
Valoriani, "Mixed Reality: Dalle demo a un prodotto", Disruptive Technologies Conference, Sep. 23, 2016, 67 pgs.
Van Gerwen et al., "Nanoscaled interdigitated electrode arrays for biochemical sensors", Sensors and Actuators, Mar. 3, 1998, vol. B 49, pp. 73-80.
Vecchi, "Studi Esr Di Sistemi Complessi Basati Su Cristalli Liquidi", Thesis, University of Bologna, Department of Physical and Inorganic Chemistry, 2004-2006, 110 pgs.
Veltri et al., "Model for the photoinduced formation of diffraction gratings in liquid-crystalline composite materials", Applied Physics Letters, May 3, 2004, vol. 84, No. 18, pp. 3492-3494.
Vita, "Switchable Bragg Gratings", Thesis, Universita degli Studi di Napoli Federico II, Nov. 2005, 103 pgs.
Vuzix, "M3000 Smart Glasses, Advanced Waveguide Optics", brochure, Jan. 1, 2017, 2 pgs.
Wang et al., "Liquid-crystal blazed-grating beam deflector", Applied Optics, Dec. 10, 2000, vol. 39, No. 35, pp. 6545-6555.

(56) References Cited

OTHER PUBLICATIONS

Wang et al., "Optical Design of Waveguide Holographic Binocular Display for Machine Vision", Applied Mechanics and Materials, Sep. 27, 2013, vols. 427-429, pp. 763-769.

Wang et al., "Speckle reduction in laser projection systems by diffractive optical elements", Applied Optics, Apr. 1, 1998, vol. 37, No. 10, pp. 1770-1775.

Weber et al., "Giant Birefringent Optics in Multilayer Polymer Mirrors", Science, Mar. 31, 2000, vol. 287, pp. 2451-2456.

Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.

Welde et al., "Investigation of methods for speckle contrast reduction", Master of Science in Electronics, Jul. 2010, Norwegian University of Science and Technology, Department of Electronics and Telecommunications, 127 pgs.

White, "Influence of thiol-ene polymer evolution on the formation and performance of holographic polymer dispersed liquid crystals", The 232nd ACS National Meeting, San Francisco, CA, Sep. 10-14, 2006, 1 pg.

Wicht et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.

Wilderbeek et al., "Photoinitiated Bulk Polymerization of Liquid Crystalline Thiolene Monomers", Macromolecules, 2002, vol. 35, pp. 8962-8969.

Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.

Wisely, "Head up and head mounted display performance improvements through advanced techniques in the manipulation of light", Proc. of SPIE, 2009, 10 pages, vol. 7327.

Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.

Yaqoob et al., "High-speed two-dimensional laser scanner based on Bragg grating stored in photothermorefractive glass", Applied Optics, Sep. 10, 2003, vol. 42, No. 26, pp. 5251-5262.

Yaroshchuk et al., "Stabilization of liquid crystal photoaligning layers by reactive mesogens", Applied Physics Letters, Jul. 14, 2009, vol. 95, pp. 021902-1-021902-3.

Ye, "Three-dimensional Gradient Index Optics Fabricated in Diffusive Photopolymers", Thesis, Department of Electrical, Computer and Energy Engineering, University of Colorado, 2012, 224 pgs.

Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.

Yeralan et al., "Switchable Bragg grating devices for telecommunications applications", Opt. Eng., Aug. 2012, vol. 41, No. 8, pp. 1774-1779.

Yoshida et al., "Nanoparticle-Dispersed Liquid Crystals Fabricated by Sputter Doping", Adv. Mater., 2010, vol. 22, pp. 622-626.

Youcef et al., "Phase Behavior Of Poly(N-Butyl Acrylate) And Poly(2-Ethylhexyl Acrylate) in Nematic Liquid Crystal E7", Macromol. Symp. 2011, vol. 303, pp. 10-16, doi: 10.1002/masy.201150502.

Zhang et al., "Dynamic Holographic Gratings Recorded by Photopolymerization of Liquid Crystalline Monomers", J. Am. Chem. Soc., 1994, vol. 116, pp. 7055-7063.

Zhang et al., "Switchable Liquid Crystalline Photopolymer Media for Holography", J. Am. Chem. Soc., 1992, vol. 114, pp. 1506-1507.

Zhao et al., "Designing Nanostructures by Glancing Angle Deposition", Proc. of SPIE, Oct. 27, 2003, vol. 5219, pp. 59-73.

Zheng et al., "Holographic Polymer-Dispersed Liquid Crystal Grating with Low Scattering Losses", Liquid Crystals, Mar. 2012, vol. 39, Issue 3, pp. 387-391.

Zlębacz, "Dynamics of nano and micro objects in complex liquids", Ph.D. dissertation, Institute of Physical Chemistry of the Polish Academy of Sciences, Warsaw 2011, 133 pgs.

Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526.

Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.

* cited by examiner

SYSTEMS AND METHODS FOR MANUFACTURING WAVEGUIDE CELLS

CROSS-REFERENCE TO RELATED APPLICATIONS

The current application is a continuation of U.S. patent application Ser. No. 16/203,071 entitled "Systems and Methods for Manufacturing Waveguide Cells," filed Nov. 28, 2018, which application claims the benefit of and priority under 35 U.S.C. § 119(e) to U.S. Provisional Patent Application No. 62/663,864 entitled "Method and Apparatus for Fabricating Holographic Gratings," filed Apr. 27, 2018, U.S. Provisional Patent Application No. 62/614,813 entitled "Low Haze Liquid Crystal Materials," filed Jan. 8, 2018, U.S. Provisional Patent Application No. 62/614,831 entitled "Liquid Crystal Materials and Formulations," filed Jan. 8, 2018, U.S. Provisional Patent Application No. 62/614,932 entitled "Methods for Fabricating Optical Waveguides," filed Jan. 8, 2018, U.S. Provisional Patent Application No. 62/667,891 entitled "Method and Apparatus for Copying a Diversity of Hologram Prescriptions from a Common Master," filed May 7, 2018, and U.S. Provisional Patent Application No. 62/703,329 entitled "Systems and Methods for Fabricating a Multilayer Optical Structure," filed Jul. 25, 2018, the disclosures of which are hereby incorporated by reference in their entireties.

FIELD OF THE INVENTION

The present invention generally relates to processes and apparatuses for manufacturing waveguide cells and, more specifically, manufacturing waveguide cells utilizing deposition and printing techniques.

BACKGROUND

Waveguides can be referred to as structures with the capability of confining and guiding waves (i.e., restricting the spatial region in which waves can propagate). One class of waveguides includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the in-coupled light can proceed to travel within the planar structure via total internal reflection ("TIR").

Fabrication of waveguides can include the use of material systems that allow for the recording of holographic optical elements within the waveguides. One class of such material includes polymer dispersed liquid crystal ("PDLC") mixtures, which are mixtures containing photopolymerizable monomers and liquid crystals. A further subclass of such mixtures includes holographic polymer dispersed liquid crystal ("HPDLC") mixtures. Holographic optical elements, such as volume phase gratings, can be recorded in such a liquid mixture by illuminating the material with two mutually coherent laser beams. During the recording process, the monomers polymerize and the mixture undergoes a photopolymerization-induced phase separation, creating regions densely populated by liquid crystal micro-droplets, interspersed with regions of clear polymer. The alternating liquid crystal-rich and liquid crystal-depleted regions form the fringe planes of the grating.

Waveguide optics, such as those described above, can be considered for a range of display and sensor applications. In many applications, waveguides containing one or more grating layers encoding multiple optical functions can be realized using various waveguide architectures and material systems, enabling new innovations in near-eye displays for Augmented Reality ("AR") and Virtual Reality ("VR"), compact Heads Up Displays ("HUDs") for aviation and road transport, and sensors for biometric and laser radar ("LIDAR") applications.

SUMMARY OF THE INVENTION

One embodiment includes a method for manufacturing waveguide cells, the method including providing a first substrate, determining a predefined grating characteristic, and depositing a layer of optical recording material onto the first substrate using at least one deposition head, wherein the optical recording material deposited over the grating region is formulated to achieve the predefined grating characteristic.

In another embodiment, the method further includes providing a second substrate, placing the second substrate onto the deposited layer of optical recording material, and laminating the first substrate, the layer of optical recording material, and the second substrate.

In a further embodiment, depositing the layer of optical recording material includes providing a first mixture of optical recording material, providing a second mixture of optical recording material, and depositing the first and second mixtures of optical recording material onto the first substrate in a predetermined pattern using the at least one deposition head.

In still another embodiment, the first mixture of optical recording material includes a first bead and the second mixture of optical recording material includes a second bead that is a different size from the first bead.

In a still further embodiment, the first mixture of optical recording material has a different percentage by weight of liquid crystals than the second mixture of optical recording material.

In yet another embodiment, the method further includes defining a grating region and a nongrating region on the first substrate, wherein the first mixture of optical recording material includes a liquid crystal and a monomer, the second mixture of optical recording material includes a monomer, and depositing the first and second mixtures of optical recording material onto the first substrate in the predetermined pattern includes depositing the first mixture of optical recording material over the grating region and depositing the second mixture of optical recording material over the nongrating region.

In a yet further embodiment, the first mixture of optical recording material is a polymer dispersed liquid crystal mixture that includes a monomer, a liquid crystal, a photoinitiator dye, and a coinitiator.

In another additional embodiment, the polymer dispersed liquid crystal mixture includes an additive selected from the group that includes a photoinitiator, nano particles, low-functionality monomers, additives for reducing switching voltage, additives for reducing switching time, additives for increasing refractive index modulation, and additives for reducing haze.

In a further additional embodiment, the at least one deposition head includes at least one inkjet print head.

In another embodiment again, depositing the layer of optical recording material includes providing a first mixture of optical recording material, providing a second mixture of optical recording material, printing a first dot of the first mixture of optical recording material using the at least one inkjet print head, and printing a second dot of the second mixture of optical recording material adjacent to the first dot using the at least one inkjet print head.

In a further embodiment again, the at least one inkjet print head includes a first inkjet print head and a second inkjet print head and depositing the layer of optical recording material includes providing a first mixture of optical recording material, providing a second mixture of optical recording material, printing the first mixture of optical recording material onto the first substrate using the first inkjet print head, and printing the second mixture of optical recording material onto the first substrate using the second inkjet print head.

In still yet another embodiment, the predefined grating characteristic includes a characteristic selected from the group that includes refractive index modulation, refractive index, birefringence, liquid crystal director alignment, and grating layer thickness.

In a still yet further embodiment, the predefined grating characteristic includes a spatial variation of a characteristic selected from the group that includes refractive index modulation, refractive index, birefringence, liquid crystal director alignment, and grating layer thickness.

In still another additional embodiment, the predefined grating characteristic results in a grating after exposure, wherein the grating has a spatially varying diffraction efficiency.

A still further additional embodiment includes a system for fabricating a grating, the system including at least one deposition head connected to at least one reservoir containing at least one mixture of optical recording material, a first substrate having at least one predefined region for supporting gratings, a positioning element capable of positioning the at least one deposition head across the first substrate, wherein the at least one deposition head is configured to deposit the at least one mixture of optical recording material onto the first substrate using the positioning element and the deposited material provides a predefined grating characteristic within the at least one predefined grating region after holographic exposure.

In still another embodiment again, the at least one deposition head is connected to a first reservoir containing a first mixture of optical recording material and a second reservoir containing a second mixture of optical recording material.

In a still further embodiment again, the first mixture of optical recording material includes a liquid crystal and a monomer and the second mixture of optical recording material includes a monomer, wherein the at least one deposition head is configured to deposit the first mixture of optical recording material onto the at least one predefined grating region.

In yet another additional embodiment, the at least one deposition head includes at least one inkjet print head.

In a yet further additional embodiment, the predefined grating characteristic includes a characteristic selected from the group that includes refractive index modulation, refractive index, birefringence, liquid crystal director alignment, and grating layer thickness.

In yet another embodiment again, the predefined grating characteristic results in a grating after exposure, wherein the grating has a spatially varying diffraction efficiency.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as exemplary embodiments of the invention and should not be construed as a complete recitation of the scope of the invention. It will apparent to those skilled in the art that the present invention may be practiced with some or all of the present invention as disclosed in the following description.

DETAILED DESCRIPTION

Figure 1A:
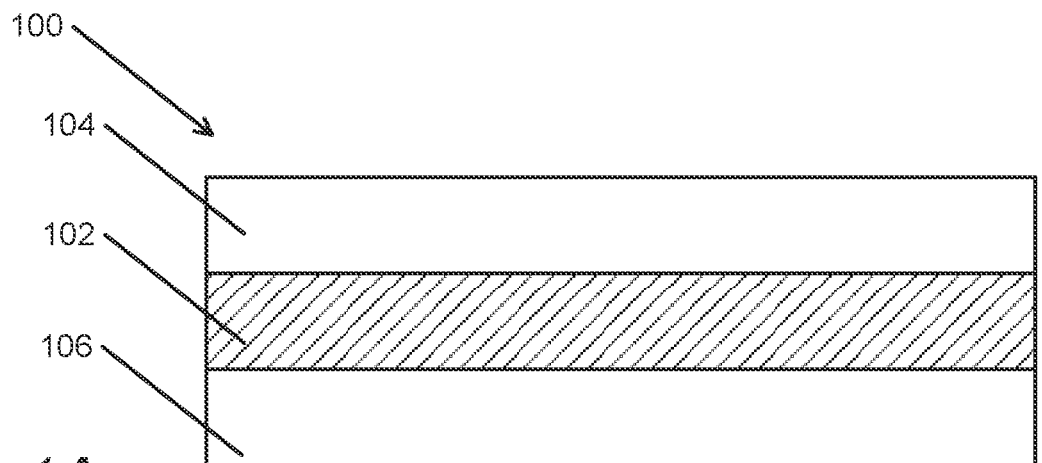
FIG. 1A conceptually illustrates a profile view of a waveguide cell in accordance with an embodiment of the invention.

For the purposes of describing embodiments, some well-known features of optical technology known to those skilled in the art of optical design and visual displays have been omitted or simplified in order to not obscure the basic principles of the invention. Unless otherwise stated, the term "on-axis" in relation to a ray or a beam direction refers to propagation parallel to an axis normal to the surfaces of the optical components described in relation to the invention. In the following description, the terms light, ray, beam and direction may be used interchangeably and in association with each other to indicate the direction of propagation of light energy along rectilinear trajectories. Parts of the following description will be presented using terminology commonly employed by those skilled in the art of optical design. For illustrative purposes, it is to be understood that the drawings are not drawn to scale unless stated otherwise.

Turning now to the drawings, systems and methods for manufacturing waveguide cells are illustrated. A waveguide cell can be defined as a device containing uncured and/or unexposed optical recording material in which optical elements, such as but not limited to gratings, can be recorded through exposure to certain wavelengths of electromagnetic radiation. Many techniques exist for the manufacturing and construction of waveguide cells. In many embodiments, a waveguide cell is constructed by placing a thin film of optical recording material between two transparent substrates. In further embodiments, a workcell cluster manufacturing system is implemented to construct such waveguide cells. A workcell can be defined as a set of machines assigned to a particular manufacturing task. A cluster can be defined as a group of machines that performs a similar function cooperatively. In some embodiments, the workcell cluster includes a preparation workcell for preparing substrates for deposition, a deposition workcell for depositing an optical recording material onto a substrate, and a lamination workcell for laminating various layers together to form a waveguide cell.

Workcells and workcell clusters in accordance with various embodiments can be configured and implemented in many different ways. For instance, preparation workcells can be configured to prepare substrates for material deposition through various processes, including but not limited to cleaning procedures and protocols. In many embodiments, the preparation of substrates includes glass cleaning procedures for ridding the surfaces of the substrates of contaminants and particles. In some embodiments, procedures for increasing the surface adhesion properties of the substrates are implemented to further prepare the substrates for material deposition.

Deposition workcells can be configured to deposit one or more layers of optical recording material onto a transparent substrate using a variety of different deposition and printing mechanisms. In many embodiments, additive manufacturing techniques, such as but not limited to inkjet printing, are used to deposit the layer(s) of optical recording material. In several embodiments, spraying techniques are utilized to deposit the layer(s) of optical recording material. Suitable optical recording material can vary widely depending on the given application. In some embodiments, the optical recording material deposited has a similar composition throughout the layer. In a number of embodiments, the optical recording material spatially varies in composition, allowing for the formation of optical elements with varying characteristics. Regardless of the composition of the optical recording material, any method of placing or depositing the optical recording material onto a substrate can be utilized.

Lamination workcells can be configured to laminate various layers to form a waveguide cell. In a number of embodiments, the lamination workcell is configured to laminate and form a three-layer composite of optical recording material and transparent substrates. As can readily be appreciated, the number of layers and types of materials used to construct the waveguide cells can vary and depend on the given application. For example, in some embodiments, waveguide cells can be constructed to include protective cover layers, polarization control layers, and/or alignment layers. In some embodiments, the system is configured for the production of curved waveguides and waveguide cells. Specific materials, systems, and methods for constructing waveguide cells are discussed below in further detail.

Waveguide Cells

Waveguide cells can be configured and constructed in many different ways in accordance with various embodiments of the invention. As discussed above, in many waveguide configurations, the waveguide cell includes a thin film of optical recording material sandwiched between two substrates. Such waveguide cells can be manufactured using various processes. In many embodiments, waveguide cells can be constructed by coating a first substrate with an optical recording material capable of acting as an optical recording medium. Various optical recording materials can be used. In some embodiments, the optical recording material is a holographic polymer dispersed liquid crystal mixture (e.g., a matrix of liquid crystal droplets). As can readily be appreciated, the choice of optical recording material and types of mixtures utilized can depend on the given application. The optical recording material can be deposited using a variety of deposition techniques. In a number of embodiments, the optical recording material can be deposited onto the first substrate through inkjetting, spin coating, and/or spraying processes. The deposition processes can be configured to deposit one or more type of optical recording material. In some embodiments, the deposition process is configured to deposit optical recording material that spatially varies in composition across a substrate. After deposition of the optical recording material, a second substrate can be placed such that the optical recording material is sandwiched between the two substrates to form a waveguide cell. In several embodiments, the second substrate can be a thin protective film coated onto the exposed layer. In such embodiments, various techniques, including but not limited to spraying processes, can be used to coat the exposed layer with the desired film of material. In a number of embodiments, the waveguide cell can include various additional layers, such as but not limited to polarization control layers and/or alignment layers. Other processes for manufacturing waveguide cells can include filling empty waveguide cells (constructed of two substrates) with an optical recording material using processes such as but not limited to gravity filling and vacuum filling methods.

Substrates used in the construction of waveguide cells are often made of transparent materials. In some embodiments, the substrate is an optical plastic. In other embodiments, the substrate may be fabricated from glass. An exemplary glass substrate is standard Corning Willow glass substrate (index 1.51) which is available in thicknesses down to 50 micrometers. The thicknesses of the substrates can vary from application to application. In many embodiments, 1 mm thick glass slides are used as the substrates. In addition to different thicknesses, substrates of different shapes, such as but not limited to rectangular and curvilinear shapes, can also be used depending on the application. Oftentimes, the shapes of the substrates can determine the overall shape of the waveguide. In a number of embodiments, the waveguide cell contains two substrates that are of the same shape. In other embodiments, the substrates are of different shapes. As can readily be appreciated, the shapes, dimensions, and materials of the substrates can vary and depend on the specific requirements of a given application.

In many embodiments, beads or other particles are dispersed throughout the optical recording material to help control the thickness of the layer of optical recording material and to help prevent the two substrates from collapsing onto one another. In some embodiments, the waveguide cell is constructed with an optical recording material layer sandwiched between two planar substrates. Depending on the type of optical recording material used, thickness control can be difficult to achieve due to the viscosity of some optical recording materials and the lack of a bounding edge for the optical recording material layer. In a number of embodiments, the beads are relatively incompressible solids, which can allow for the construction of waveguide cells with consistent thicknesses. The size of a bead can determine a localized minimum thickness for the area around the individual bead. As such, the dimensions of the beads can be selected to help attain the desired optical recording material layer thickness. The beads can be made of any of a variety of materials, including but not limited to glass and plastics. In several embodiments, the material of the beads is selected such that its refractive index does not substantially affect the propagation of light within the waveguide cell.

In some embodiments, the waveguide cell is constructed such that the two substrates are parallel or substantially parallel. In such embodiments, relatively similar sized beads can be dispersed throughout the optical recording material to help attain a uniform thickness throughout the layer. In other embodiments, the waveguide cell has a tapered profile. A tapered waveguide cell can be constructed by dispersing beads of different sizes across the optical recording material. As discussed above, the size of a bead can determine the local minimum thickness of the optical recording material layer. By dispersing the beads in a pattern of increasing size across the material layer, a tapered layer of optical recording material can be formed when the material is sandwiched between two substrates.

Once constructed, waveguide cells can be used in conjunction with a variety of processes for recording optical elements within the optical recording material. For example, the process disclosed may incorporated embodiments and teachings from the materials and processes, such as but not limited to those described in U.S. patent application Ser. No. 16/116,834 entitled "Systems and Methods for High-Throughput Recording of Holographic Gratings in Waveguide Cells," filed Aug. 29, 2018 and U.S. patent application Ser. No. 16/007,932 entitled "Holographic Material Systems and Waveguides Incorporating Low Functionality Monomers," filed Jun. 13, 2018 The disclosures of U.S. patent application Ser. Nos. 16/116,834 and 16/007,932 are hereby incorporated in their entireties for all purpose.

Figure 1B:
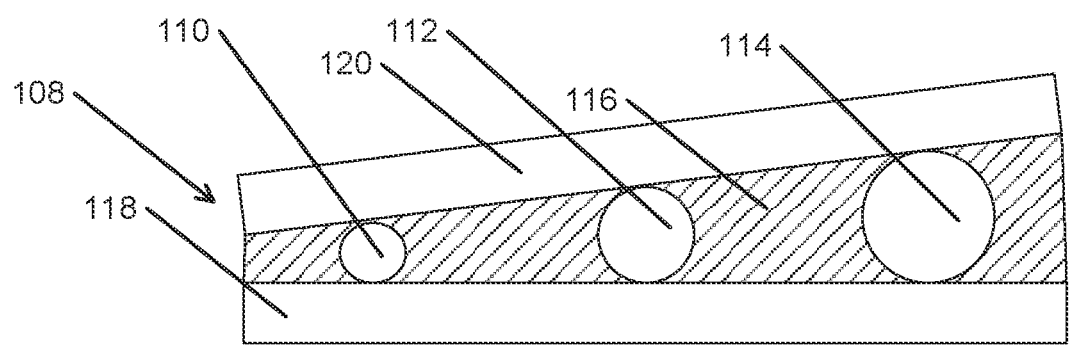
FIG. 1B conceptually illustrates a waveguide cell with a wedge-shaped profile in accordance with an embodiment of the invention.
Figure 1C:
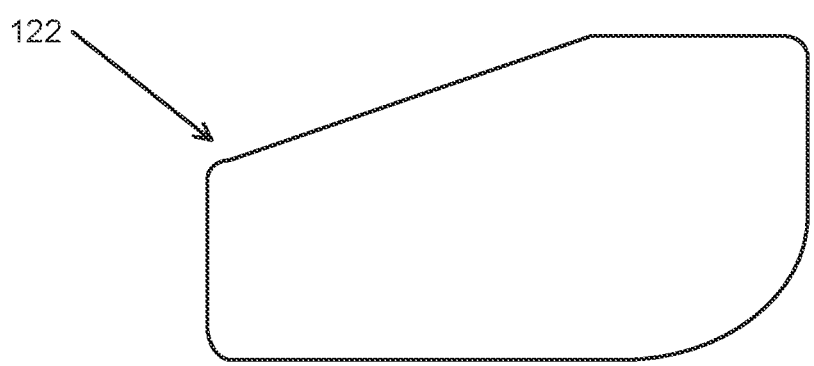
FIG. 1C conceptually illustrates a top view of a waveguide cell in accordance with an embodiment of the invention.

A profile view of a waveguide cell 100 in accordance with an embodiment of the invention is conceptually illustrated in FIG. 1A. As shown, the waveguide cell 100 includes a layer of optical recording material 102 that can be used as a recording medium for optical elements, such as but not limited to gratings. The optical recording material 102 can be any of a variety of compounds, mixtures, or solutions, such as but not limited to the HPDLC mixtures described in the sections above. In the illustrative embodiment, the optical recording material 102 is sandwich between two parallel glass plates 104, 106. The substrates can be arranged in both parallel and non-parallel configurations. FIG. 1B conceptually illustrates a profile view of a tapered waveguide cell 108 utilizing beads 110, 112, and 114 in accordance with an embodiment of the invention. As shown, beads 110, 112, and 114 vary in size and are dispersed throughout an optical recording material 116 sandwiched by two glass plates 118, 120. During construction of the waveguide cell, the local thickness of an area of the optical recording material layer is limited by the sizes of the beads in that particular area. By dispersing the beads in an increasing order of sizes across the optical recording material, a tapered waveguide cell can be constructed when the substrates are placed in contact with the beads. As discussed above, substrates utilized in waveguide cells can vary in thicknesses and shapes. In many embodiments, the substrate is rectangular in shape. In some embodiments, the shape of the waveguide cell is a combination of curvilinear components. FIG. 1C conceptually illustrates a top view of a waveguide cell 122 having a curvilinear shape in accordance with an embodiment of the invention.

Although FIGS. 1A-1C illustrate specific waveguide cell constructions and arrangements, waveguide cells can be constructed in many different configurations and can use a variety of different materials depending on the specific requirements of a given application. For example, substrates can be made of transparent plastic polymers instead of glass. Additionally, the shapes and sizes of the waveguide cells can vary greatly and can be determined by various factors, such as but not limited to the application of the waveguide, ergonomic considerations, and economical factors. In many embodiments, the substrates are curved, allowing for the production of waveguides with curved cross sections.

Grating Structures

Waveguide cells in accordance with various embodiments of the invention can incorporate a variety of light-sensitive materials. In many embodiments, the waveguide cell incorporates a holographic polymer dispersed liquid crystal mixture that functions as an optical recording medium in which optical elements can be recorded. Optical elements can include many different types of gratings capable of exhibiting different optical properties. One type of grating that can be recorded in waveguide cells is a volume Bragg grating, which can be characterized as a transparent medium with a periodic variation in its refractive index. This variation can allow for the diffraction of incident light of certain wavelengths at certain angles. Volume Bragg gratings can have high efficiency with little light being diffracted into higher orders. The relative amount of light in the diffracted and zero order can be varied by controlling the refractive index modulation of the grating.

One class of gratings used in holographic waveguide devices is the Switchable Bragg Grating ("SBG"). An SBG is a diffractive device that can be formed by recording a volume phase grating in an HPDLC mixture (although other materials can be used). SBGs can be fabricated by first placing a thin film of a mixture of photopolymerizable monomers and liquid crystal material between glass plates or substrates, which forms a waveguide cell. One or both glass plates can support electrodes, typically transparent tin oxide films, for applying an electric field across the film. SBGs can be implemented as waveguide devices in which the HPDLC forms either the waveguide core or an evanescently coupled layer in proximity to the waveguide. The glass plates used to form the HPDLC cell can provide a total internal reflection light guiding structure. Light is coupled out of the SBG when the switchable grating diffracts the light at an angle beyond the TIR condition.

The grating structure in an SBG can be recorded in the film of HPDLC material through photopolymerization-induced phase separation using interferential exposure with a spatially periodic intensity modulation. Factors such as but not limited to control of the irradiation intensity, component volume fractions of the HPDLC material, and exposure temperature can determine the resulting grating morphology and performance. During the recording process, the monomers polymerize and the mixture undergoes a phase separation. The LC molecules aggregate to form discrete or coalesced droplets that are periodically distributed in polymer networks on the scale of optical wavelengths. The alternating liquid crystal-rich and liquid crystal-depleted regions form the fringe planes of the grating, which can produce Bragg diffraction with a strong optical polarization resulting from the orientation ordering of the LC molecules in the droplets. The resulting volume phase grating can exhibit very high diffraction efficiency, which may be controlled by the magnitude of the electric field applied across the HPDLC layer. When an electric field is applied to the hologram via transparent electrodes, the natural orientation of the LC droplets is changed, causing the refractive index modulation of the fringes to reduce and the hologram diffraction efficiency to drop to very low levels. The diffraction efficiency of the device can be adjusted, by means of the applied voltage, over a continuous range from near 100% efficiency with no voltage applied to essentially zero efficiency with a sufficiently high voltage applied. In certain types of HPDLC devices, phase separation of the LC material from the polymer can be accomplished to such a degree that no discernible droplet structure results. An SBG can also be used as a passive grating. In this mode, its chief benefit is a uniquely high refractive index modulation. SBGs can be used to provide transmission or reflection gratings for free space applications. SBGs can be implemented as waveguide devices in which the HPDLC forms either the waveguide core or an evanescently coupled layer in proximity to the waveguide. The glass plates used to form the HPDLC cell provide a total internal reflection light guiding structure. Light can be coupled out of the SBG when the switchable grating diffracts the light at an angle beyond the TIR condition.

In many embodiments, SBGs are recorded in a uniform modulation material, such as POLICRYPS or POLIPHEM having a matrix of solid liquid crystals dispersed in a liquid polymer. Exemplary uniform modulation liquid crystal-polymer material systems are disclosed in United State Patent Application Publication No.: US2007/0019152 by Caputo et al and PCT Application No.: PCT/EP2005/006950 by Stumpe et al. both of which are incorporated herein by reference in their entireties. Uniform modulation gratings are characterized by high refractive index modulation (and hence high diffraction efficiency) and low scatter. In some embodiments, at least one of the gratings is recorded a reverse mode HPDLC material. Reverse mode HPDLC differs from conventional HPDLC in that the grating is passive when no electric field is applied and becomes diffractive in the presence of an electric field. The reverse mode HPDLC may be based on any of the recipes and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES. Optical recording material systems are discussed below in further detail.

Optical Recording Material Systems

HPDLC mixtures in accordance with various embodiments of the invention generally include LC, monomers, photoinitiator dyes, and coinitiators. The mixture (often referred to as syrup) frequently also includes a surfactant. For the purposes of describing the invention, a surfactant is defined as any chemical agent that lowers the surface tension of the total liquid mixture. The use of surfactants in PDLC mixtures is known and dates back to the earliest investigations of PDLCs. For example, a paper by R. L Sutherland et al., SPIE Vol. 2689, 158-169, 1996, the disclosure of which is incorporated herein by reference, describes a PDLC mixture including a monomer, photoinitiator, coinitiator, chain extender, and LCs to which a surfactant can be added. Surfactants are also mentioned in a paper by Natarajan et al, Journal of Nonlinear Optical Physics and Materials, Vol. 5 No. I 89-98, 1996, the disclosure of which is incorporated herein by reference. Furthermore, U.S. Pat. No. 7,018,563 by Sutherland; et al., discusses polymer-dispersed liquid crystal material for forming a polymer-dispersed liquid crystal optical element including: at least one acrylic acid monomer; at least one type of liquid crystal material; a photoinitiator dye; a coinitiator; and a surfactant. The disclosure of U.S. Pat. No. 7,018,563 is hereby incorporated by reference in its entirety.

The patent and scientific literature contains many examples of material systems and processes that can be used to fabricate waveguides incorporating volume gratings, including investigations into formulating such material systems for achieving high diffraction efficiency, fast response time, low drive voltage, and so forth. U.S. Pat. No. 5,942, 157 by Sutherland, and U.S. Pat. No. 5,751,452 by Tanaka et al. both describe monomer and liquid crystal material combinations suitable for fabricating waveguides incorporating volume gratings. Examples of recipes can also be found in papers dating back to the early 1990s, many of which disclose the use of acrylate monomers, including:

R. L. Sutherland et al., Chem. Mater. 5, 1533 (1993), the disclosure of which is incorporated herein by reference, describes the use of acrylate polymers and surfactants. Specifically, the recipe includes a crosslinking multifunctional acrylate monomer; a chain extender N-vinyl pyrrolidinone, LC E7, photo-initiator rose Bengal, and coinitiator N-phenyl glycine. Surfactant octanoic acid was added in certain variants.

Fontecchio et al., SID 00 Digest 774-776, 2000, the disclosure of which is incorporated herein by reference, describes a UV curable HPDLC for reflective display applications including a multi-functional acrylate monomer, LC, a photoinitiator, a coinitiators, and a chain terminator.

Y. H. Cho, et al., Polymer International, 48, 1085-1090, 1999, the disclosure of which is incorporated herein by reference, discloses HPDLC recipes including acrylates.

Karasawa et al., Japanese Journal of Applied Physics, Vol. 36, 6388-6392, 1997, the disclosure of which is incorporated herein by reference, describes acrylates of various functional orders.

T. J. Bunning et al., Polymer Science: Part B: Polymer Physics, Vol. 35, 2825-2833, 1997, the disclosure of which is incorporated herein by reference, also describes multifunctional acrylate monomers.

G. S. Iannacchione et al., Europhysics Letters Vol. 36 (6). 425-430, 1996, the disclosure of which is incorporated herein by reference, describes a PDLC mixture including a penta-acrylate monomer, LC, chain extender, coinitiators, and photoinitiator.

Acrylates offer the benefits of fast kinetics, good mixing with other materials, and compatibility with film forming processes. Since acrylates are cross-linked, they tend to be mechanically robust and flexible. For example, urethane acrylates of functionality 2 (di) and 3 (tri) have been used extensively for HPDLC technology. Higher functionality materials such as penta and hex functional stems have also been used.

Although HPDLC mixtures with specific components are discussed above in relation with their suitable uses as the optical recording material in a waveguide cell, specific formulations of optical recording materials can vary widely and can depend on the specific requirements of a given application. Such considerations can include diffraction efficiency ("DE"), haze, solar immunity, transparency, and switching requirements.

Embodiments of S & P Polarized RMLCM Materials

The S and P polarization response of a grating containing LC can depend on the average LC director orientations relative to the grating K-vector. Typically, the directors are substantially parallel to the K-vector, giving a strong P-response and a weaker S-response. If the LC directors are not aligned, the grating can have a strong S-response. Many embodiments of the invention include reactive monomer liquid crystal mixture ("RMLCM") material systems configured to incorporate a mixture of LCs and monomers (and other components including: photoinitiator dye, coinitiators, surfactant), which under holographic exposure undergo phase separation to provide a grating in which at least one of the LCs and at least one of the monomers form a first HPDLC morphology that provides a P polarization response and at least one of the LCs and at least one of the monomers form a second HPDLC morphology that provides a S polarization response. In various such embodiments, the material systems include an RMLCM, which includes photopolymerizable monomers composed of suitable functional groups (e.g., acrylates, mercapto-, and other esters, among others), a cross-linking agent, a photo-initiator, a surfactant and a liquid crystal.

Turning to the components of the material formulation, any encapsulating polymer formed from any single photo-reactive monomer material or mixture of photo-reactive monomer materials having refractive indices from about 1.5 to 1.9 that crosslink and phase separate when combined can be utilized. Exemplary monomer functional groups usable in material formulations according to embodiments include, but are not limited to, acrylates, thiol-ene, thiol-ester, fluoromonomers, mercaptos, siloxane-based materials, and other esters, etc. Polymer cross-linking can be achieved through different reaction types, including but not limited to optically-induced photo-polymerization, thermally-induced polymerization, and chemically-induced polymerization.

These photopolymerizable materials can be combined in a biphase blend with a second liquid crystal material. Any suitable liquid crystal material having ordinary and extraordinary refractive indices matched to the polymer refractive index can be used as a dopant to balance the refractive index of the final RMLCM material. The liquid crystal material can be manufactured, refined, or naturally occurring. The liquid crystal material includes all known phases of liquid crystallinity, including the nematic and smectic phases, the cholesteric phase, the lyotropic discotic phase. The liquid crystal can exhibit ferroelectric or antiferroelectric properties and/or behavior.

Any suitable photoinitiator, co-initiator, chain extender and surfactant (such as for example octanoic acid) suitable for use with the monomer and LC materials can be used in the RMLCM material formulation. It will be understood that the photo-initiator can operate in any desired spectral band including the in the UV and/or in the visible band.

In various embodiments, the LCs can interact to form an LC mixture in which molecules of two or more different LCs interact to form a non-axial structure which interacts with both S and P polarizations. The waveguide can also contain an LC alignment material for optimizing the LC alignment for optimum S and P performance. In many embodiments, the ratio of the diffraction efficiencies of the P- and S-polarized light in the PDLC morphology is maintained at a relative ratio of from 1.1:1 to 2:1, and in some embodiments at around 1.5:1. In other embodiments, the measured diffraction efficiency of P-polarized light is from greater than 20% to less than 60%, and the diffraction efficiency for S-polarized light is from greater than 10% to less than 50%, and in some embodiments the diffraction efficiency of the PDLC morphology for P-polarization is around 30% and the diffraction efficiency of the PDLC morphology for S-polarization is around 20%. This can be compared with conventional PDLC morphologies where the diffraction efficiency for P-polarization is around 60% and for S-polarization is around 1% (i.e., the conventional P-polarization materials have very low or negligible S-components).

Mixtures Incorporating Nanoparticles

In many embodiments, the reactive monomer liquid crystal mixture can further include chemically active nanoparticles disposed within the LC domains. In some such embodiments, the nanoparticles are carbon nanotube ("CNT") or nanoclay nanoparticle materials within the LC domains. Embodiments are also directed to methods for controlling the nanoclay particle size, shape, and uniformity. Methods for blending and dispersing the nanoclay particles can determine the resulting electrical and optical properties of the device. The use of nanoclays in HPDLC is discussed in PCT Application No.: PCT/GB2012/000680, entitled IMPROVEMENTS TO HOLOGRAPHIC POLYMER DISPERSED LIQUID CRYSTAL MATERIALS AND DEVICES.

The nanoclay nanoparticles can be formed from any naturally occurring or manufactured composition, as long as they can be dispersed in the liquid crystal material. The specific nanoclay material to be selected depends upon the specific application of the film and/or device. The concentration and method of dispersion also depends on the specific application of the film and/or device. In many embodiments, the liquid crystal material is selected to match the liquid crystal ordinary index of refraction with the nanoclay material. The resulting composite material can have a forced alignment of the liquid crystal molecules due to the nanoclay particle dispersion, and the optical quality of the film and/or device can be unaffected. The composite mixture, which includes the liquid crystal and nanoclay particles, can be mixed to an isotropic state by ultrasonication. The mixture can then be combined with an optically crosslinkable monomer, such as acrylated or urethane resin that has been photoinitiated, and sandwiched between substrates to form a cell (or alternatively applied to a substrate using a coating process).

In various embodiments, nanoparticles are composed of nanoclay nanoparticles, preferably spheres or platelets, with particle size on the order of 2-10 nanometers in the shortest dimension and on the order of 10 nanometers in the longest dimension. Desirably, the liquid crystal material is selected to match the liquid crystal ordinary index of refraction with the nanoclay material. Alternatively, the nanoparticles can be composed of material having ferroelectric properties, causing the particles to induce a ferroelectric alignment effect on the liquid crystal molecules, thereby enhancing the electro-optic switching properties of the device. In another embodiment of the invention, the nanoparticles are composed of material having ferromagnetic properties, causing the particles to induce a ferromagnetic alignment effect on the liquid crystal molecules, thereby enhancing the electro-optic switching properties of the device. In another embodiment of the invention, the nanoparticles have an induced electric or magnetic field, causing the particles to induce an alignment effect on the liquid crystal molecules, thereby enhancing the electro-optic switching properties of the device. Exemplary nanoparticles used in other contexts including thermoplastics, polymer binders, etc. are disclosed in U.S. Pat. Nos. 7,068,898; 7,046,439; 6,323,989; 5,847,787; and U.S. Patent Pub. Nos. 2003/0175004; 2004/0156008; 2004/0225025; 2005/0218377; and 2006/0142455, the disclosures of which are incorporated herein by reference.

The nanoclay can be used with its naturally occurring surface properties, or the surface can be chemically treated for specific binding, electrical, magnetic, or optical properties. Preferably, the nanoclay particles will be intercalated, so that they disperse uniformly in the liquid crystalline material. The generic term "nanoclay" as used in the discussion of the present invention can refer to naturally occurring montmorillonite nanoclay, intercalated montmorillonite nanoclay, surface modified montmorillonite nanoclay, and surface treated montmorillonite nanoclay. The nanoparticles can be useable as commercially purchased, or they may need to be reduced in size or altered in morphology. The processes that can be used include chemical particle size reduction, particle growth, grinding of wet or dry particles, milling of large particles or stock, vibrational milling of large particles or stock, ball milling of particles or stock, centrifugal ball milling of particles or stock, and vibrational ball milling of particles or stock. All of these techniques can be performed either dry or with a liquid suspension. The liquid suspension can be a buffer, a solvent, an inert liquid, or a liquid crystal material. One exemplary ball milling process provided by Spex LLC (Metuchen, NJ) is known as the Spex 8000 High Energy Ball Mill. Another exemplary process, provided by Retsch (France), uses a planetary ball mill to reduce micrometer size particles to nanoscale particles.

The nanoparticles can be dispersed in the liquid crystal material prior to polymer dispersion. Dry or solvent suspended nanoparticles can be ultrasonically mixed with the liquid crystal material or monomers prior to polymer dispersion to achieve an isotropic dispersion. Wet particles may need to be prepared for dispersion in liquid crystal, depending on the specific materials used. If the particles are in a solvent or liquid buffer, the solution can be dried, and the dry particles dispersed in the liquid crystal as described above. Drying methods include evaporation in air, vacuum evaporation, purging with inert gas like nitrogen and heating the solution. If the particles are dispersed in a solvent or liquid buffer with a vapor pressure lower than the liquid crystal material, the solution can be mixed directly with the liquid crystal, and the solvent can be evaporated using one of the above methods leaving behind the liquid crystal/nanoparticle dispersion. In one embodiment of the invention, the optical film includes a liquid crystal material and a nanoclay nanoparticle, where a nanoparticle is a particle of material with size less than one micrometer in at least one dimension. The film can be isotropically distributed.

Although nanoclay materials are discussed, in many embodiments CNT is used as an alternative to nanoclay as a means for reducing voltage. The properties of CNT in relation to PDLC devices are reviewed by E. H. Kim et. al. in Polym. Int. 2010; 59: 1289-1295, the disclosure of which is incorporated herein by reference in its entirety. PDLC films have been fabricated with varying amounts of multi-walled carbon nanotubes ("MWCNTs") to optimize the electro-optical performance of the PDLC films. The MWCNTs were well dispersed in the prepolymer mixture up to 0.5 wt %, implying that polyurethane acrylate ("PUA") oligomer chains wrap the MWCNTs along their length, resulting in high diffraction efficiency and good phase separation. The hardness and elastic modulus of the polymer matrix were enhanced with increasing amounts of MWCNTs because of the reinforcement effect of the MWCNTs with intrinsically good mechanical properties. The increased elasticity of the PUA matrix and the immiscibility between the matrix and the liquid crystals gradually increased the diffraction efficiency of the PDLC films. However, the diffraction efficiency of PDLC films with more than 0.05 wt % MWCNTs was reduced, caused by poor phase separation between the matrix and LCs because of the high viscosity of the reactive mixture. PDLC films showing a low driving voltage (75%) could be obtained with 0.05 wt % MWCNTs at 40 wt % LCs.

In embodiments where the PDLC materials incorporate such nanoparticles, reductions of switching voltage and improvements to the electro-optic properties of a polymer dispersed liquid crystal film and/or polymer dispersed liquid crystal device can be obtained by including nanoparticles in the liquid crystal domains. The inclusion of nanoparticles serves to align the liquid crystal molecules and to alter the birefringent properties of the film through index of refraction averaging. In addition, the inclusion of the nanoparticles improves the switching response of the liquid crystal domains.

Monomer Functionality

RMLCM material systems in accordance with various embodiments can be formulated in a variety of ways. In many embodiments, the material system is an RMLCM that includes at least one LC, at least one multi-functional monomer, a photo-initiator, a dye, and at least one mono-functional monomer. Along with several factors, such as but not limited to recording beam power/wavelength, grating periodicity, and grating thickness, the specific mixture of components and their percent composition can determine the diffraction efficiency of the resulting HPDLC gratings. Inhomogeneous polymerization due to the spatially periodic irradiation intensity of the exposure can be the driving force to segregate monomers and LCs and to order the orientation of LC molecules, which can influence the diffraction efficiencies of the HPDLC gratings. Oftentimes, the diffusion coefficient of monomers depends on their molecular weight and reactivity. It has been shown that a variety of monomer molecular weights or functional numbers can yield a complex distribution of polymer and LC phases. In many cases, molecular functionality can be critical in achieving efficient phase separation and the formation of gratings with high diffraction efficiency. As such, many embodiments of the invention include material systems formulated with specific mixes of monomers that are chosen, at least in part, for their functionality so as to influence the diffraction efficiency and index modulation of the resulting grating structure. Other considerations in formulating such a mixture can include but are not limited to the properties of the recording beam and the thickness of the gratings. For the purposes of describing this invention, the functionality of a monomer refers to the number of reactive sites on each monomer unit.

The effects of varying monomer functionality in HPDLC material systems have been studied to some degree in the scientific literature. Such studies have generally examined the effects of the effective, or average, functionality of a mixture with regards to grating formation and performance. For example, in a paper by Pogue et al., Polymer 41 (2000) 733-741, the disclosure of which is incorporated herein by reference, investigations were conducted in floodlit PDLCs and holographic PDLC gratings to show that a decrease in effective monomer functionality general leads to decreased LC phase separation.

Many embodiments in accordance with the invention include investigations into mixtures with specific blends of monomers of low functionality that can result in the formation of gratings having high diffraction efficiency and efficient phase separation. While the scientific literature typically emphasizes the use of high functionality monomers, various embodiments in accordance with the invention are focused on the use of monomers of low functionality in certain applications. In some embodiments, the monomers within the mixture are either mono-functional monomers or bi-functional monomers. In a number of embodiments, tri-functional monomers are also included. In such mixtures, the tri-functional monomers are typically included at a low concentration, such as lower than 5 wt %.

Mixtures including low functional monomers can behave differently depending on a variety of factors, such as but not limited to the wavelength sensitivity of the material system, thickness of the HPDLC to be formed, and exposure temperature. In the scientific literature, investigations into PDLC material systems typically include UV sensitive material systems since material reaction efficiency in general is typically poor with visible light systems. However, formulations in accordance with various embodiments of the invention have been able to reach high diffraction efficiency (>80%) with low haze using low functionality monomers that are sensitive (polymerizes) to visible light. In further embodiments, the material systems include monomers that are sensitive to green light, such as light with wavelengths ranging from 495-570 nm. In addition to different light systems, performance of the HPDLC mixtures can depend on the thickness of the waveguide cell in which gratings are formed. For example, for a given material system, different thicknesses of deposited films can form waveguides with different amounts of haze. Although grating thicknesses have been explored in the patent and scientific literature, such investigations are focused on relatively thick gratings. In a number of embodiments, the material system is formulated for use in waveguides with thin form factors. In further embodiments, the material system is formulated for use in manufacturing waveguides having HPDLC layers with thicknesses of less than 10 μm. and gratings with more than 80% diffraction efficiency. In further embodiments, the material system is formulated for use in a waveguide having a 2-3 μm thick HPDLC layer and gratings with 80-90% diffraction efficiency. The material system can also be formulated for manufacturing such waveguides with low haze. In several embodiments, the material system can form HPDLC layers having less than 1% haze. Waveguide haze is the integrated effect of light interacting with material and surface inhomogeneities over many beam bounces. The impact on the ANSI contrast, the ratio of averaged white to black measurements taken from a checkerboard pattern, can be dramatic owing to the scatter contribution to the black level. Haze is mostly due to wide-angle scatter by LC droplets and other small particles or scattering centers resulting from incomplete phase separation of the LC/monomer mixture during grating recording. Haze can also arise, at least partly, from narrow angle scatter generated by large-scale nonuniformities, leading to a loss of see-through quality and reduced image sharpness. Some waveguide applications such as aircraft HUDs, which use 1-D beam expansion in thick waveguides, produce as few as 7 bounces, allowing up to 80:1 contrast. However, in thin waveguides of the type use in near eye displays the number of bounces may increase by a factor of 10 making the need for haze control more acute.

RMLCM recipes can be optimized for specific thicknesses of HPDLC layers. In many embodiments, the RMLCM recipe is optimized for a ~3 μm thick uniform modulation gratings designed to have a refractive index modulation of ~0.16. As can readily be appreciated, the specific thickness of the waveguide parts to be fabricated can vary and can depend on the specific requirements of a given application. In a number of embodiments, the waveguide parts can be fabricated with 90% transmission and 0.3% haze. In other embodiments, the waveguide parts can be fabricated with ~0.1% haze (with ~0.01% haze recorded in unexposed samples of the same material). In some embodiments, the RMLCM can be formulated for fabricating waveguide parts containing haze of less than 0.05%.

Transmission haze can be defined as the percentage of light that deviates from desired beam direction by more than 2.5 degrees on average (according to the ASTM D1003 standard). The clarity of a waveguide can be characterized by the amount of narrow angle scattered light (at an angle less than 2.5° from the normal to the waveguide surface). Transmission can be defined as the amount of light transmitted through the waveguide without being scattered. To assess general material haze, the scatter can be measured around a vector normal to a waveguide TIR surface. To assess holographic haze, the scatter can be measured around principal diffraction directions (passing through the center of the eye box). The procedures for measurement of haze, clarity and transmission are defined in the ASTM D1003 International test standards, in which "Procedure A" uses a haze meter and "Procedure B" uses a spectrophotometer. An exemplary instrument for measuring haze is the BYK-Gardner HAZE Guard II equipment.

In many embodiments, the RMLCM mixture includes a liquid crystal mixture, a complex mixture of acrylates and acrylate esters, Dynasylan® MEMO, and photoinitiators. In further embodiments, the RMLCM includes EHA and DFHA. Depending on the specific mix of components and their percent composition, the resulting grating can have vastly different characteristics. In some embodiments, the proportion of LC by weight is greater than 30%. In further embodiments, the proportion of LC is greater than 35 wt %. In some embodiments, the mixture includes liquid crystal with high birefringence. In further embodiments, the high birefringence liquid crystal accounts for more than 20 wt % of the mixture. In a number of embodiments, dye and photo-initiators account for less than 5 wt % of the mixture.

Nematic LC materials can provide a range of birefringence (which can translate to refractive index modulation). Low to medium birefringence typically covers the range of 0.09-0.12. However, gratings can be designed using much lower birefringence values, including gratings in which the birefringence varies along the grating. Such gratings can be used to extract light from waveguides with low efficiency at one end of the grating and high efficiency at the other end of the grating to provide spatially uniform output illumination. High birefringence (nematic LC) is typically the range of 0.2-0.5. Even higher values are possible. Nematic liquid crystals, compounds, and mixtures with positive dielectric anisotropies (i.e., LCs for which the dielectric constant is greater in the long molecular axis than that in the other directions) are review in a paper by R. Dabrowski et al., "High Birefringence Liquid Crystals"; Crystals; 2013; 3; 443-482, the disclosure of which is incorporated herein by reference.

The functionality of the monomers in the mixtures can greatly influence the diffraction efficiency of the resulting grating. In many embodiments, the mixture includes at least one mono-functional monomer and at least one multifunctional monomer in varying concentrations. In several embodiments, the concentration of mono-functional monomer within the mixture ranges from 1-50 wt %. The mono-functional monomer can include aliphatic/aromatic groups and an adhesion promoter. In some embodiments, the proportion of multi-functional monomers present in the mixture is in the range of 2-30 wt %. Multi-functional monomers in accordance with various embodiments of the invention typically include monomers of low functionality. In a number of embodiments, the mixture includes a bi-functional monomer at a low concentration. In further embodiments, the mixture includes bi-functional monomers at less than 15 wt %. Depending on the type and concentration of bi-functional monomer in the mixture, adequate phase separation and grating formation can occur. In the illustrative embodiment, the mono-functional monomer, bi-functional monomer and LC have relative weight ratios of 30%, 14%, and 40%, which resulted in a formulation that allowed for the recording of gratings with a diffraction efficiency higher than 90% and an index modulation of around 0.12.

As can readily be appreciated, percent composition of each component within an RMLCM can vary widely. Formulations of such material systems can be designed to achieve certain characteristics in the resulting gratings. In many cases, the RMLCM is formulated to have as high a diffraction efficiency as possible.

Workcell Cluster for Manufacturing Waveguide Cells

Figure 2A:
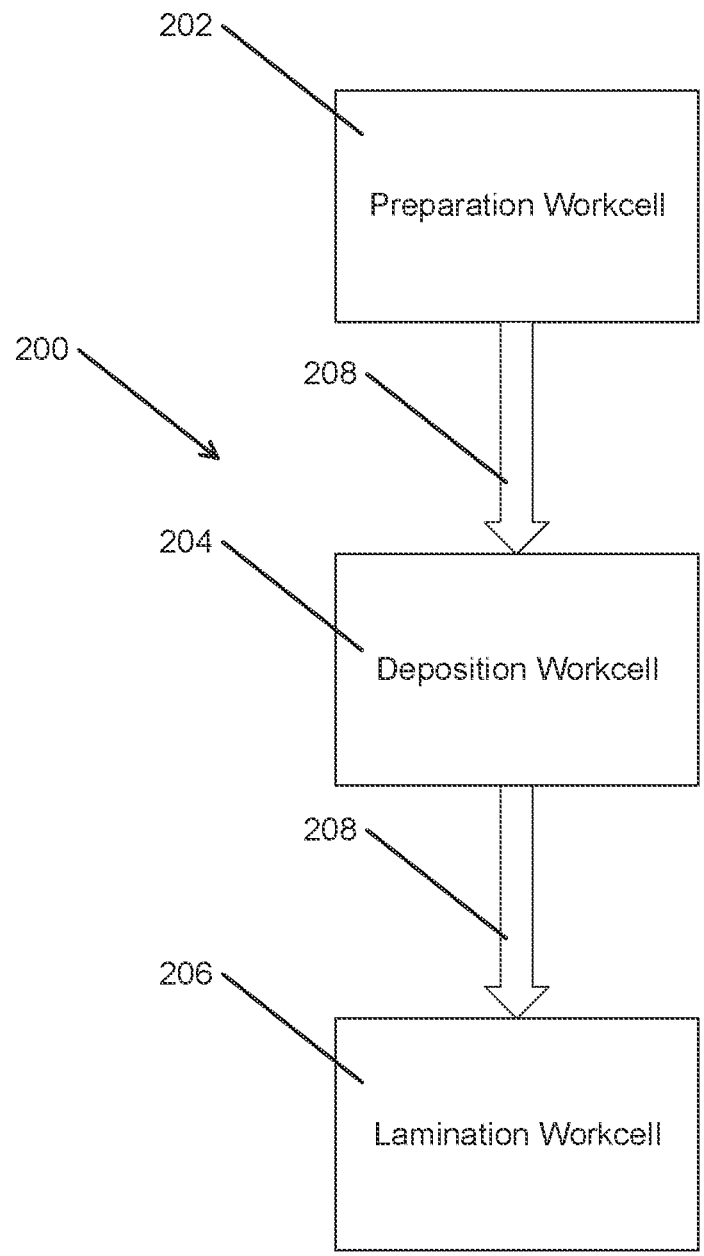
FIG. 2A conceptually illustrates a workcell cluster system in accordance with an embodiment of the invention.

Waveguide cell manufacturing systems in accordance with various embodiments of the invention can be implemented as workcell clusters. By compartmentalizing different manufacturing steps into workcells, modular systems can be implemented. In many embodiments, a workcell cluster includes a preparation workcell for preparing substrates for material deposition, a deposition workcell for depositing an optical recording material onto a substrate, and a lamination workcell for laminating various layers together to construct a waveguide cell. Workcells can be configured in various ways to implement different manufacturing processes for waveguide cells. In some embodiments, the workcells are linked and configured such that the output of one workcell is transferred to another workcell, forming a manufacturing assembly line. The transferring mechanism can be implemented in a variety of ways, such as but not limited to the use of mechanical arms, suction, and/or a conveyor system. In several embodiments, the products are manually transferred. FIG. 2A conceptually illustrates a workcell cluster system 200 in accordance with an embodiment of the invention. In the illustrative embodiment, the system 200 includes a preparation workcell 202, a deposition workcell 204, and a lamination workcell 206. As shown, arrows 208 indicate a sequential workflow relationship among the workcells.

Figure 2B:
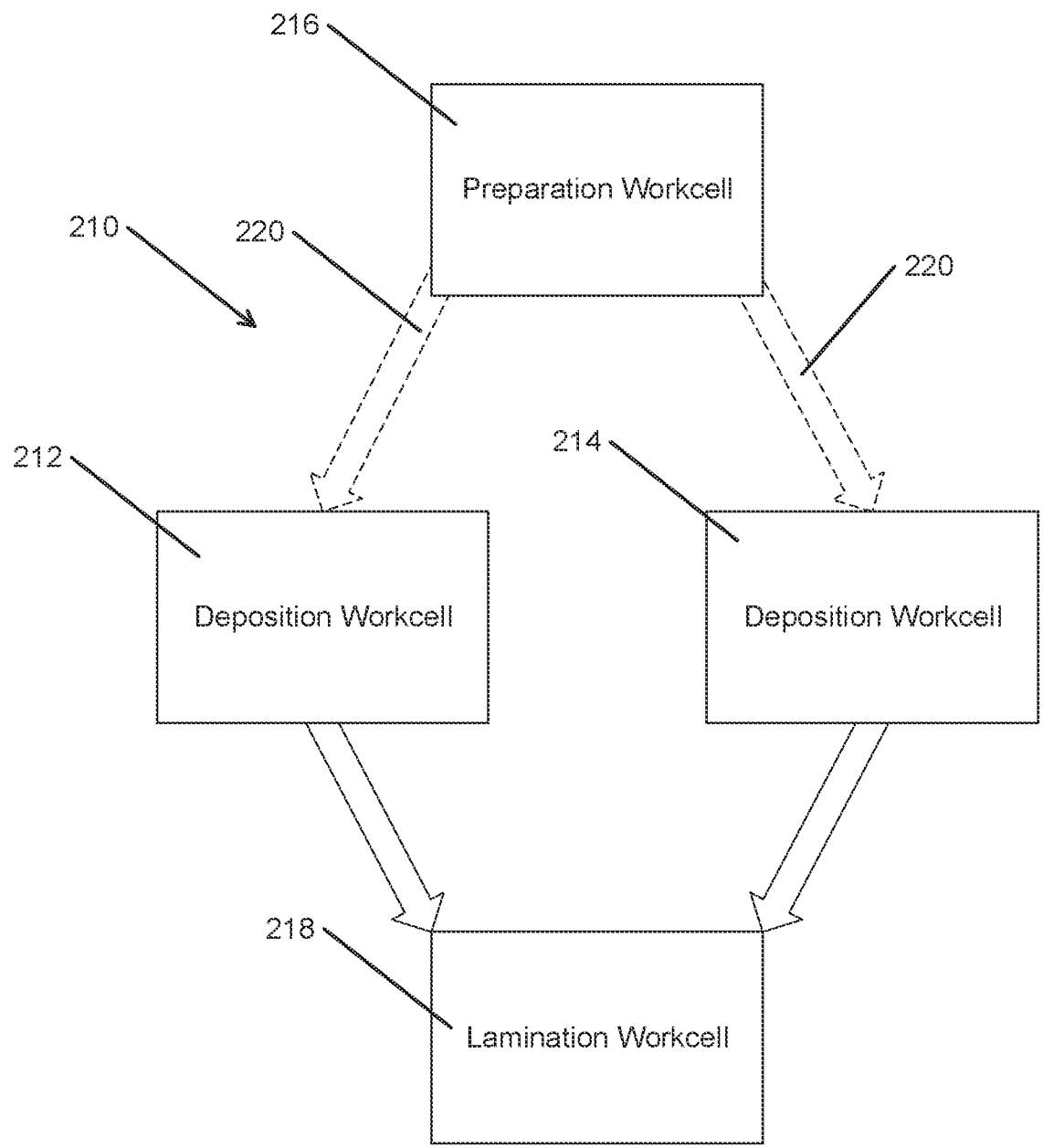
FIG. 2B conceptually illustrates a workcell cluster system with two deposition workcells in accordance with an embodiment of the invention.

One advantage in a modular system is the ability to vary the number of workcells dedicated to a particular task to improve throughput by optimizing workcell use and reducing workcell downtime. For example, a waveguide cell manufactured with different optical recording materials may result in different deposition times. In such embodiments, the number of deposition workcells can vary accordingly to balance out the task completion time of each workcell such as to minimize the overall downtime of the workcells. FIG. 2B conceptually illustrates a workcell cluster system 210 with two deposition workcells 212, 214 in accordance with an embodiment of the invention. In the illustrative embodiment, the system 210 includes a preparation workcell 216, two deposition workcells 212, 214, and a lamination workcell 218. Dotted arrows 220 indicate that output from the preparation workcell 216 can be received by either deposition workcell 212, 214. Such a system can be ideally implemented when the completion time for a single deposition process is approximately twice as long as the completion time for other processes.

Although FIGS. 2A and 2B conceptually illustrate specific workcell cluster system configurations, workcell clusters in accordance with various embodiments of the invention can be configured in numerous ways depending on the specific requirements of the given application. For example, workcell clusters can be configured to have different workflow paths, types of workcells, and/or numbers of workcells.

Due to the sensitive nature of some materials and processes associated with waveguide cell fabrication, workcells can be configured to provide protection from environmental light and contaminants. In many embodiments, optical filters cover the workcell in order to reduce and/or prevent unwanted light from interacting with the optical recording material, which is typically a photosensitive material. Depending on the specific type of optical recording material, the deposition workcell can be lined with an appropriate optical filter that prevent light of certain wavelengths from entering the workcell and exposing the optical recording material. In addition to the reduction/prevention of light contamination, workcells can also be configured to reduce particulate contamination. In several embodiments, the workcell is configured to operate in an environment with minimal air contamination. A low-particulate environment can be achieved in many different ways, including but not limited to the use of air filters. In a number of embodiments, air filters employing laminar airflow principles are implemented. Contamination reduction/prevention systems such as those described above can be implemented separately or in combination. Although specific systems are described, workcells in accordance with various embodiments of the invention can be constructed in various ways as to alter the working environment in a desired manner. For example, in several embodiments, the workcell is configured to operate in a vacuum. Specific workcells and their implementations and constructions are described in the sections below in further detail.

Preparation Workcell

Waveguide cells in accordance with various embodiments of the invention are typically composed of a layer of optical recording material sandwiched between two substrates. Manufacturing techniques for constructing such waveguide cells in accordance with various embodiments of the invention can include a deposition step where a layer of optical recording material is deposited onto one of the substrate. In many embodiments, a preparation workcell can be implemented to perform a cleaning/preparation procedure on the substrates to prepare them for the deposition step. Preparing substrates, such as but not limited to glass plates, can include ridding the surfaces of contaminants and increasing the surface adhesion properties for better material deposition.

Preparation workcells can be configured to implement various cleaning and preparation protocols. Mechanical arms and/or suction apparatuses can be used to maneuver the substrates throughout the workcell. In many embodiments, the preparation workcells are configured to clean glass substrates using various solvents and solutions, including but not limited to soap solutions, acid washes, acetone, and various types of alcohols. In some embodiments, several types of solvents and/or solutions are used in conjunction. For example, in several embodiments, methanol or isopropanol can be administered after acetone to rinse off excess acetone. In a number of embodiments, deionized water is used to rinse off excess solvents or solutions. The solvents can be administered in several ways, including but not limited to the use of nozzles and baths. After cleaning, the workcell can be configured to dry the substrates using an inert gas, such as nitrogen, and/or a heating element.

In many embodiments, the cleaning process includes a sonication step. In several embodiments, the substrate is placed in a chamber containing a solution and a transducer is used to produce ultrasonic waves. The ultrasonic waves can agitate the solution and remove contaminants adhered to the substrates. The treatment can vary in duration depending on several factors and can be performed with different types of substrates. Deionized water or cleaning solutions/solvents can be used depending on the type of contamination and the type of substrate.

In many embodiments, the preparation workcell is configured to implement a plasma chamber to plasma treat the surfaces of the substrates. In some embodiments, the substrates are made of glass. Existing in the form of ions and electrons, plasma is essentially an ionized gas that has been electrified with extra electrons in both negative and positive states. Plasma can be used to treat the surface of the substrate to remove contaminants and/or prepare the surface for material deposition by increasing the surface energy to improve adhesion properties. In a number of embodiments, the workcell includes a vacuum pump, which can be used to create a vacuum under which the plasma treatment can be performed.

As can readily be appreciated, preparation workcells in accordance with various embodiments of the invention can be configured to perform combinations of various steps to implement a specific cleaning protocol according to the requirements of a given application. Although specific preparation workcells for preparing glass plates are discussed above, preparation workcells can be implemented to preform various preparatory steps for a variety of different substrates, including but not limited to plastics.

Deposition Workcell

Waveguide cell manufacturing systems can utilize various techniques for placing optical recording materials in between two substrates. Manufacturing systems in accordance with various embodiments of the invention can utilize a deposition process where a film of optical recording material is deposited onto a substrate, and the composite is laminated along with a second substrate to form a three-layer laminate. In many embodiments, the manufacturing system is a workcell cluster that includes a deposition workcell for depositing a film of optical recording material onto a substrate. Such deposition workcells can be configured to receive substrates from preparation workcells. In some embodiments, the deposition workcell includes a stage for supporting the substrate and at least one deposition mechanism for depositing material onto the substrate. Any of a variety of deposition heads can be implemented to perform as the deposition mechanism. In several embodiments, spraying mechanisms such as but not limited to spraying nozzles are implemented to deposit optical recording material onto a substrate. In some embodiments, the optical recording material is deposited using a printing mechanism. Depending on the type of deposition mechanism/head implemented, several different deposition capabilities can be achieved. In a number of embodiments, the deposition head can allow for the deposition of different materials and/or mixtures that vary in component concentrations. As can readily be appreciated, the specific deposition mechanism utilized can depend on the specific requirements of a given application.

The components within the deposition workcell can be configured to move in various ways in order to deposit the optical recording material onto the substrate. In many embodiments, the deposition head and/or the stage are configured to move across certain axes in order to deposit one or multiple layers of optical recording material. In some embodiments, the deposition head is configured to move and deposit material across three dimensions, such as in a three-dimensional Euclidean space, which allows for the deposition of multiple layers onto the substrate. In a number of embodiments, the deposition head is only configured to move in two axes to deposit a single layer. In other embodiments, the stage and, consequently, the substrate are configured to move in three dimensions while the deposition head is stationary. As can readily be appreciated, deposition applications can be implemented to deposit material in various dimensions by configuring the degrees of motion freedom of the print head(s) and/or stage. The stage and deposition head can be configured such that their combination of degrees of motion freedom allows for depositing material in n-dimensional Euclidean space, where n is the desired dimension. For example, in several embodiments, the deposition head is configured to move back and forth to deposit material in one axis while the stage moves in a different axis, allowing for the deposition of material in a two-dimensional Euclidean plane. In a number of embodiments, the stage is implemented using a conveyor belt. The system can be designed such that the conveyor belt receives the substrate from a different workcell, such as the preparation workcell. Once received, the conveyor system can move the substrate along as a deposition head deposits a layer of material onto the substrate. At the end of the conveyor path, the substrate can be delivered into another workcell.

Figure 3A:
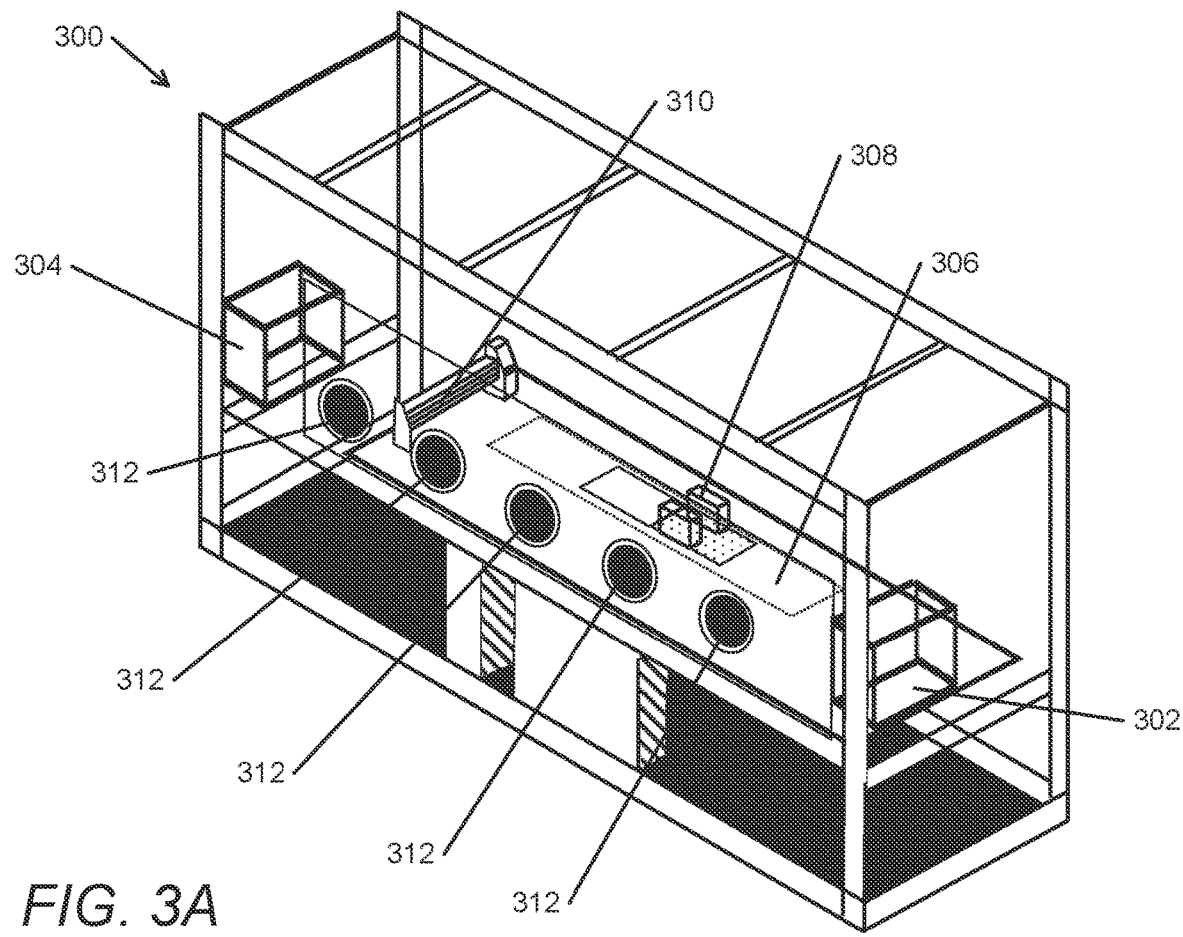
FIG. 3A conceptually illustrates an isometric view of a deposition workcell in accordance with an embodiment of the invention.
Figure 3B:
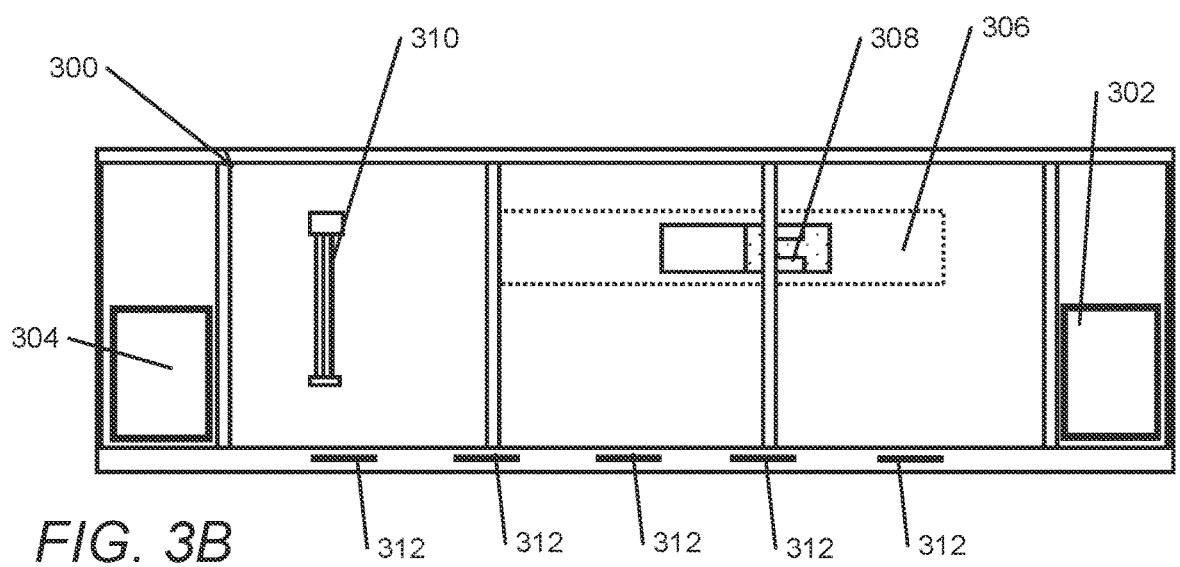
FIG. 3B conceptually illustrates a top view of a deposition workcell in accordance with an embodiment of the invention.

In a number of embodiments, the deposition workcell includes an inkjet print head configured to deposit optical recording material onto the substrate. Conventionally, inkjet printing refers to a printing method that deposits a matrix of ink dots to form a desired image. In typical operation, an inkjet print head contains a large amount of small individual nozzles that can each deposit a dot of material. In additive manufacturing applications, inkjet printing can be used to create complex patterns and structures with high precision due to the size and number of nozzles in a typical inkjet print head. Applying these principles to waveguide cell manufacturing applications, inkjet printing can be used to print a uniform or near-uniform, in terms of thickness and composition, layer of optical recording material. Depending on the application and inkjet print head, one or multiple layers of the optical recording material can be printed onto the substrate. Various optical recording materials, such as those described in the sections above, can be used in conjunction with an inkjet print head. In addition to the capability of printing in different materials, the printing system can be configured for use with various types of substrates. As can readily be appreciated, the choice of material to be printed and the substrates used can depend on the specific requirements of a given application. For instance, choices in material systems can be selected based on printing stability and accuracy. Other considerations can include but are not limited to viscosity, surface tension, and density, which can influence several factors such as but not limited to droplet formability and the ability to form layers of uniform thickness, A deposition workcell 300 in accordance with an embodiment of the invention is conceptually illustrate in FIGS. 3A and 3B. FIG. 3A shows an isometric view of the deposition workcell 300 while FIG. 3B shows a top view of the same deposition workcell 300. As shown, the deposition workcell 300 is constructed with a frame that can hold optical glass filters to prevent particulate contamination and environmental light from exposing optical recording materials within the workcell 300. The workcell includes chambers 302, 304 for receiving substrates and outputting waveguide cells. In the illustrative embodiment, the stage is implemented as a conveyor belt 306 that moves received substrates along one direction. The deposition workcell 300 further includes an inkjet printer 308 implemented as a deposition mechanism. The inkjet printer 308 is configured to print across a direction different from the movement of the conveyor belt 306, allowing for the deposition of a layer of optical recording material across the planar surface of the substrates. Additionally, the deposition workcell 300 implements a roller laminator 310 for laminating the printed layer and two substrates to construct a waveguide cell. The workcell 300 is also implemented as a glovebox with gloves 312 that allow for the manual manipulation of the devices within the workcell 300 while maintaining a clean environment.

Although FIGS. 3A and 3B depict a specific deposition workcell configuration, deposition workcells can be configured in many ways in accordance with various embodiments of the invention. For example, the laminator can be implemented in a separate lamination workcell. In several embodiments, automatic system configurations can be implemented. In many embodiments, multiple inkjet print heads are used. In other embodiments, spraying nozzles are used as the deposition mechanism.

Modulation of Material Composition

High luminance and excellent color fidelity are important factors in AR waveguide displays. In each case, high uniformity across the FOV can be essential. However, the fundamental optics of waveguides can lead to non-uniformities due to gaps or overlaps of beams bouncing down the waveguide. Further non-uniformities may arise from imperfections in the gratings and non-planarity of the waveguide substrates. In SBGs, there can exist a further issue of polarization rotation by birefringent gratings. The biggest challenge is the fold grating where there are millions of light paths resulting from multiple intersections of the beam with the grating fringes. Careful management of grating properties, particularly the refractive index modulation, can be utilized to overcome non-uniformity in accordance with various embodiments of the invention.

Out of the multitude of possible beam interactions (diffraction or zero order transmission), only a subset contributes to the signal presented at the eye box. By reverse tracing from the eyebox, fold regions contributing to a given field point can be pinpointed. The precise correction to the modulation that is needed to send more into the dark regions of the output illumination can then be calculated. Having brought the output illumination uniformity for one color back on target, the procedure can be repeated for other colors. Once the index modulation pattern has been established, the design can be exported to the deposition mechanism, with each target index modulation translating to a unique deposition setting for each spatial resolution cell on the substrate to be coated. In many embodiments, the spatial pattern can be implemented to 30 micrometers resolution with full repeatability.

Figure 4A:
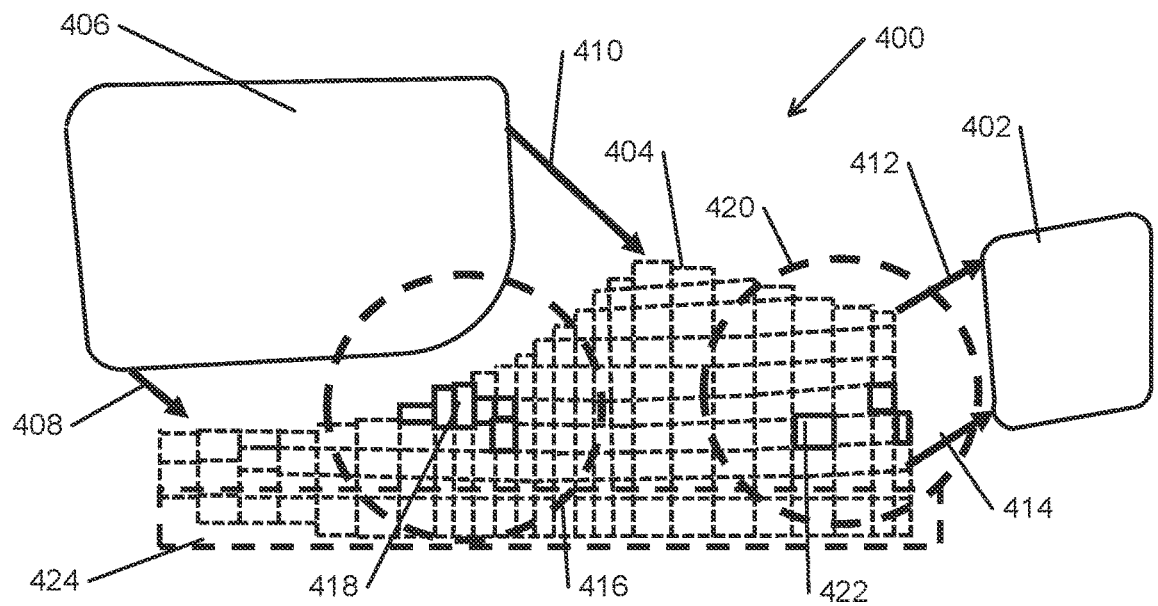
FIGS. 4A and 4B conceptually illustrate schematically the use of reverse ray tracing to compute a compensated index modulation pattern for coating in accordance with various embodiments of the invention.
Figure 4B:
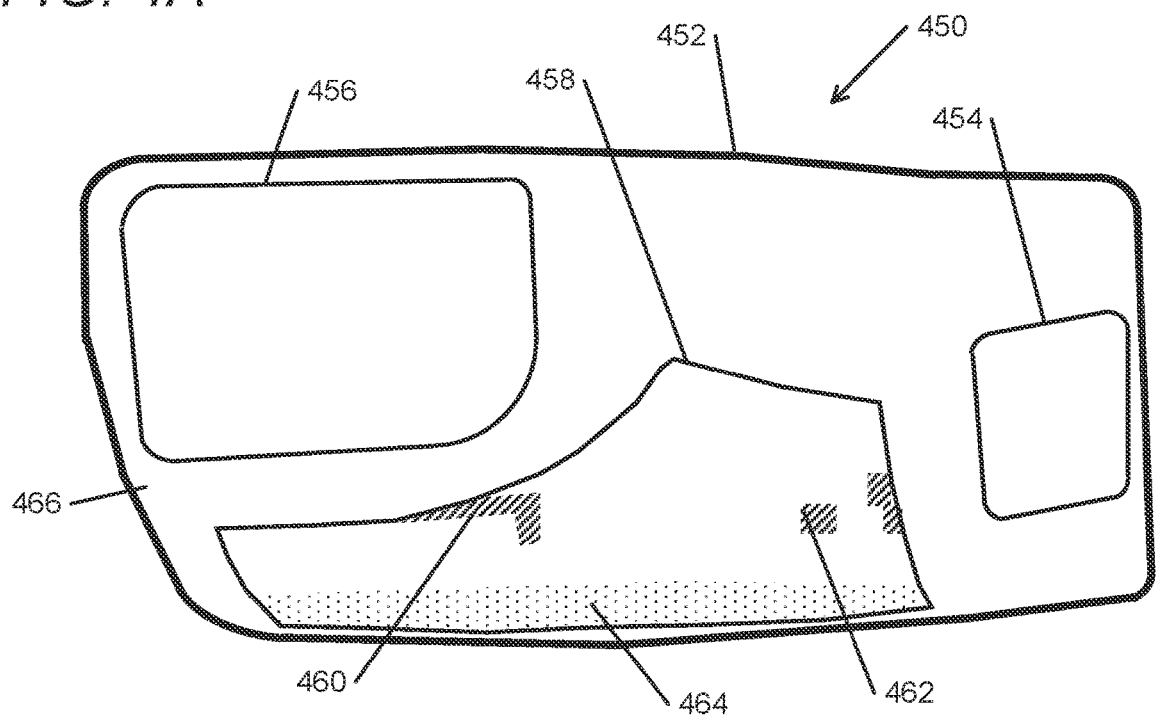

FIGS. 4A and 4B conceptually illustrate schematically the use of reverse ray tracing to compute a compensated index modulation pattern for coating in accordance with various embodiments of the invention. The procedure can determine the optimum usable area of the fold grating and the refractive index modulation variation across the fold grating needed to provide uniform illumination at the eye box. FIG. 4A shows a mathematical model of a basic waveguide architecture that includes an input grating 402, a fold grating that is divided up into a calculation mesh 404, and an output grating 406. By tracing rays from points across the eye box through the output grating and through the fold grating, the fold grating cells which contribute to the eyebox illumination for a given FOV direction can be identified. Reverse beam paths from the output grating are indicated by the rays 408-414. By repeating the ray trace for different FOV angles the maximum extent of the fold grating needed to fill the eye box can be determined. This ensures that the area of HPDLC material to be deposited/printed can be kept to a minimum, thereby reducing haze in the finished waveguide part. The procedure can also identify which cells need to have their index modulation increased (or decreased) in order to maintain illumination uniformity across the eyebox. For example, in the embodiment of FIG. 4A, most of the fold grating region has a refractive index modulation of 0.03. However, certain calculation cells encircled by 416 (such as cell 418, for example) and encircled by 420 (such as cell 422, for example) should have index modulations of 0.07, while the calculation cells lying within the rectangular zone 424 should have index modulation 0.05. Typically, the map of index modulation values is exported as an AutoCAD DXF (Drawing Interchange Format) file into the processor controlling the deposition mechanism. FIG. 4B is a plan view 450 of the final waveguide part 452 onto which is superimposed the index modulation map of the printed grating layer (corresponding to the model of FIG. 4A) as would be revealed by examining the printed grating under cross polarizers. The grating regions include the input 454, output 456, and fold 458 gratings. In the illustrative embodiment, the fold grating contains the high index modulation regions 460, 462, and 464 corresponding to the cells identified in regions 416, 420, and 424 of FIG. 4A. The grating regions of FIG. 4B are surrounded by a clear polymer region 466.

Although FIGS. 4A and 4B illustrate a specific way of computing a compensated index modulation pattern, any of a variety of techniques can be utilized to compute such a pattern.

Figure 5A:
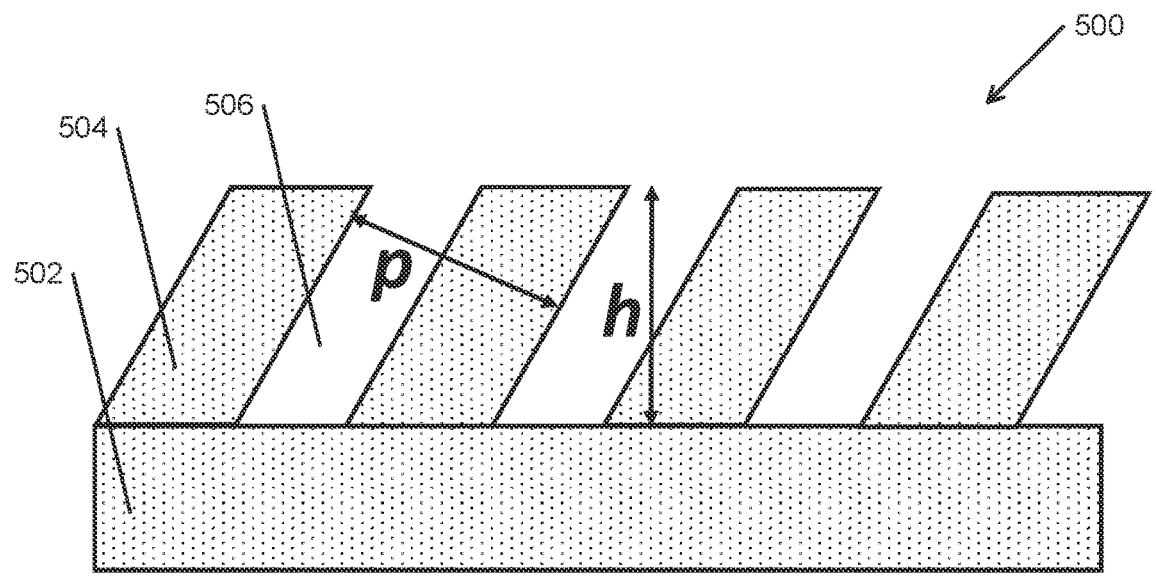
FIGS. 5A and 5B conceptually illustrate the fundamental structural differences between SBGs and SRGs.
Figure 5B:
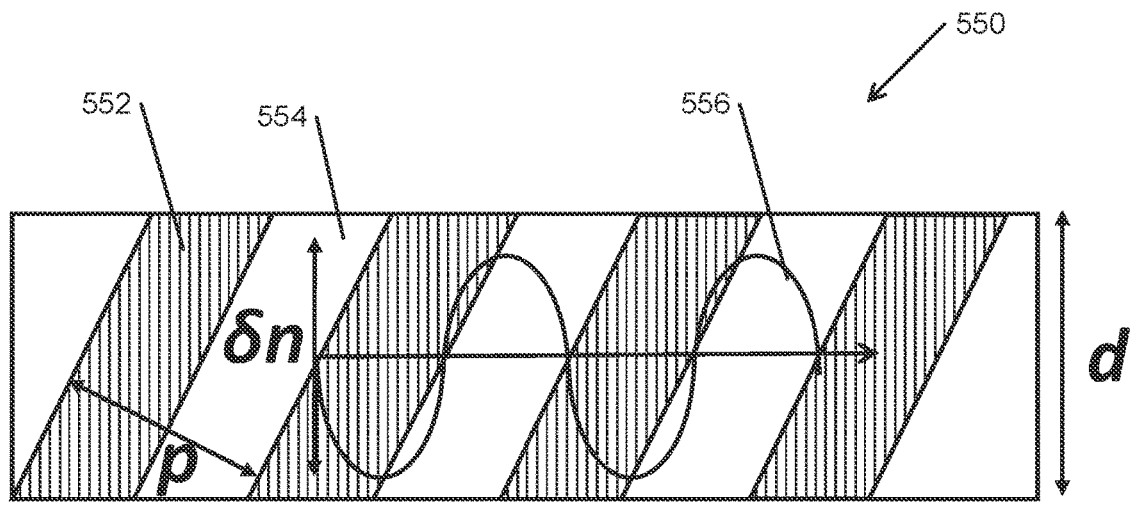

Compared with waveguides utilizing surface relief gratings ("SRGs"), SBG waveguides implementing manufacturing techniques in accordance with various embodiments of the invention can allow for the grating design parameters that impact efficiency and uniformity, such as refractive index modulation and grating thickness, to be adjusted dynamically during the deposition process. As such, there is no need for a new master for the grating recording process. With SRGs where modulation is controlled by etch depth, such schemes would not be practical as each variation of the grating would entail repeating the complex and expensive tooling process. Additionally, achieving the required etch depth precision and resist imaging complexity can be very difficult. FIGS. 5A and 5B conceptually illustrate the fundamental structural differences between SBGs and SRGs. FIG. 5A shows a cross-sectional view 500 of a portion of an SRG. In the illustrative embodiment, the grating includes a substrate 502 supporting slanted surface relief elements 504 separated by air gaps 506. Typically, the surface relief elements and substrate are formed from a common material. The grating pitch is indicated by the symbol p and the grating depth by symbol h. FIG. 5B shows a cross-sectional view 550 of an SBG. In contrast to an SRG, the SBG includes alternating slanted Bragg fringes formed from low index monomer-rich fringes such as 552 and higher index LC-rich fringes such as 554. The index difference is characterized by the refractive index modulation $\delta n$, which plays an equivalent role in determining grating diffraction efficiency to the grating depth in a SRG. The variation of index modulation is represented by the superimposed plot 556 of index modulation versus distance z along the grating. In some embodiments, the index modulation has a sinusoidal profile as shown in FIG. 5B. In embodiments in which the SBG is formed in a uniform modulation HPLDC, the index modulation profile can include near-rectangular LC-rich and polymer-rich regions.

Deposition processes in accordance with various embodiments of the invention can provide for the adjustment of grating design parameters by controlling the type of material that is to be deposited. Similar to multi-material additive manufacturing techniques, various embodiments of the invention can be configured to deposit different materials, or different material compositions, in different areas on the substrate. In many embodiments, a layer of optical recording material can be deposited with different materials in different areas. For example, deposition processes can be configured to deposit HPDLC material onto an area of a substrate that is meant to be a grating region and to deposit monomer onto an area of the substrate that is meant to be a nongrating region. In several embodiments, the deposition process is configured to deposit a layer of optical recording material that varies spatially in component composition, allowing for the modulation of various aspects of the deposited material. Modulation schemes and deposition processes for different types of materials and mixtures are discussed below in further detail.

Figure 6:
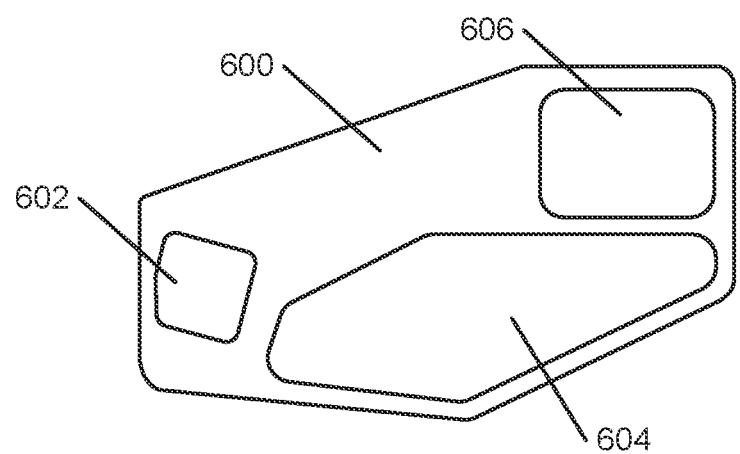
FIG. 6 conceptually illustrates a waveguide cell with marked areas for gratings in accordance with an embodiment of the invention.

The choice in material printed in a specific area can depend on the optical element that will later be recorded in that area. For example, in some embodiments, the deposition head is configured to deposit a layer of optical recording material for a waveguide cell intended to be recorded with three different gratings. The layer can be deposited such that the materials printed in each of the areas designated for the three gratings are all different from one another. FIG. 6 conceptually illustrates a waveguide cell 600 with marked areas intended to be recorded with various gratings in accordance with an embodiment of the invention. As shown, areas for an input grating 602, a fold grating 604, and an output grating 606 are outlined. Such areas can each be composed of a different material or different mixture composition depending on the given application. In a number of embodiments, different materials can be deposited to produce different diffraction efficiencies among the recorded gratings. In the illustrative embodiment, the waveguide cell is in a curvilinear shape, which, along with the positions, sizes, and shapes of the gratings, is designed to be a waveguide for near-eye applications.

Deposition of material with different compositions can be implemented in several different ways. In many embodiments, more than one deposition head can be utilized to deposit different materials and mixtures. Each deposition head can be coupled to a different material/mixture reservoir. Such implementations can be used for a variety of applications. For example, different materials can be deposited for grating and nongrating areas of a waveguide cell. In some embodiments, HPDLC material is deposited onto the grating regions while only monomer is deposited onto the nongrating regions. In several embodiments, the deposition mechanism can be configured to deposit mixtures with different component compositions.

Figure 7A:
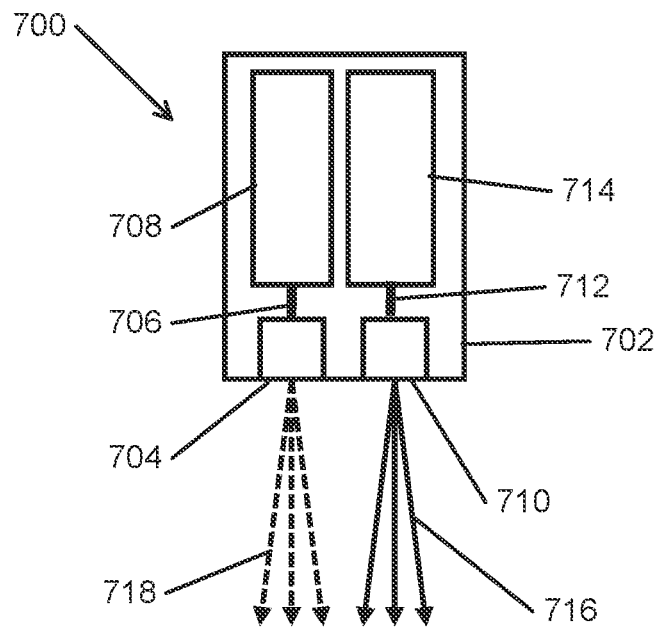
FIGS. 7A and 7B conceptually illustrate operation of a deposition mechanism utilizing a spray module in accordance with an embodiment of the invention.
Figure 7B:
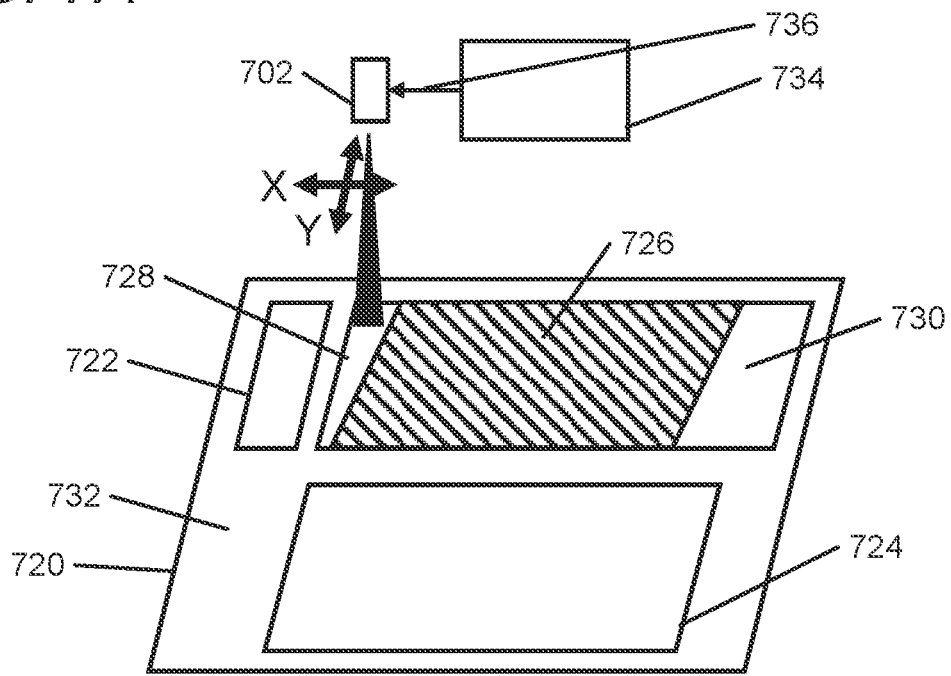

In some embodiments, spraying nozzles can be implemented to deposit multiple types of materials onto a single substrate. In waveguide applications, the spraying nozzles can be used to deposit different materials for grating and non-grating areas of the waveguide. FIGS. 7A and 7B conceptually illustrate operation of a deposition mechanism utilizing a spray module in accordance with an embodiment of the invention. As shown, the apparatus 700 includes a coating module 702 that includes a first spray module 704 connected via a pipe 706 to a first reservoir 708 containing a first mixture of a first material and a second spray module 710 connected via a pipe 712 to a second reservoir 714 containing a second mixture of a second material. In the illustrative embodiment, the first material includes at least a liquid crystal and a monomer while the second material includes only a monomer. Such a configuration allows for the deposition of a layer of optical recording material with defined grating and non-grating areas. As can readily be appreciated, any configurations of different mixtures can be utilized as appropriate depending on the specific application.

In FIGS. 7A and 7B, the first and second spray modules provide jets of liquid droplets over a controllable divergence angle as represented by 716, 718. The apparatus further includes a support for a transparent substrate 720 having predefined regions for supporting gratings as illustrated by the shaded regions 722-726, regions of gratings that do not transmit light into the eyebox as indicated by 728, 730, and regions surrounding the gratings indicated by 732. In some embodiments, the regions 728, 730 are identified by a reverse ray trace of the waveguide from the eyebox. During operation, the regions for supporting gratings providing diffracted light that enters the eye box are coated with the first mixture. The regions 728, 730 are coated with the second mixture. The apparatus further includes a positioning apparatus 734 connected to the coating apparatus by a control link 736 for traversing the coating apparatus across the substrate. The apparatus further includes a switching mechanism for activating the first spray module and deactivating the second spray module when the coating apparatus is positioned over a substrate region for supporting a grating and for deactivating the first spray module and activating the second spray module when the coating apparatus is positioned over a substrate region that does not support a grating.

Figure 8A:
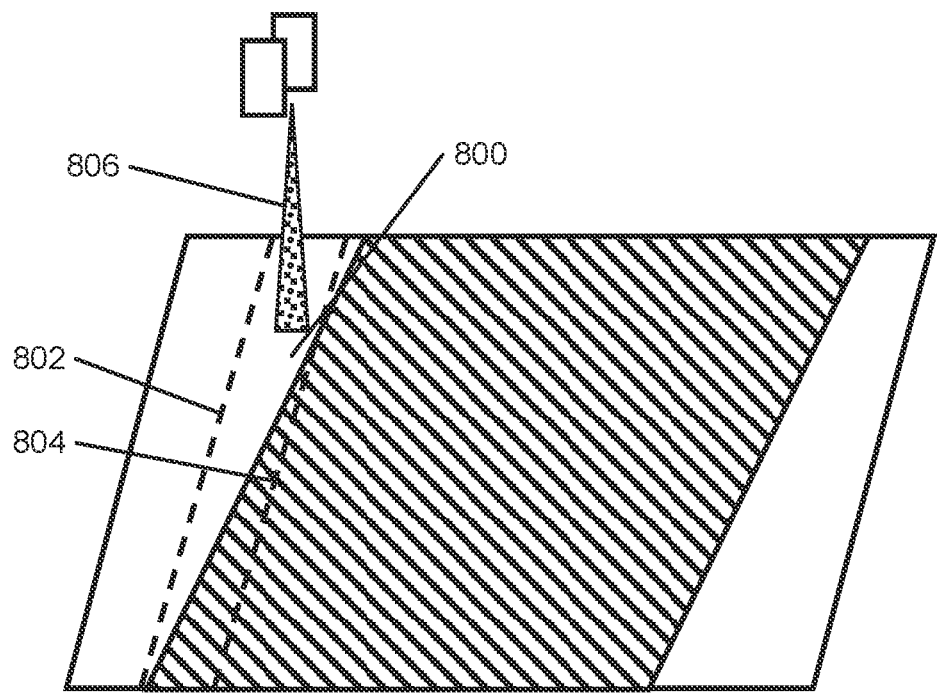
FIGS. 8A and 8B conceptually illustrate two operational states of a spray module in accordance with an embodiment of the invention.
Figure 8B:
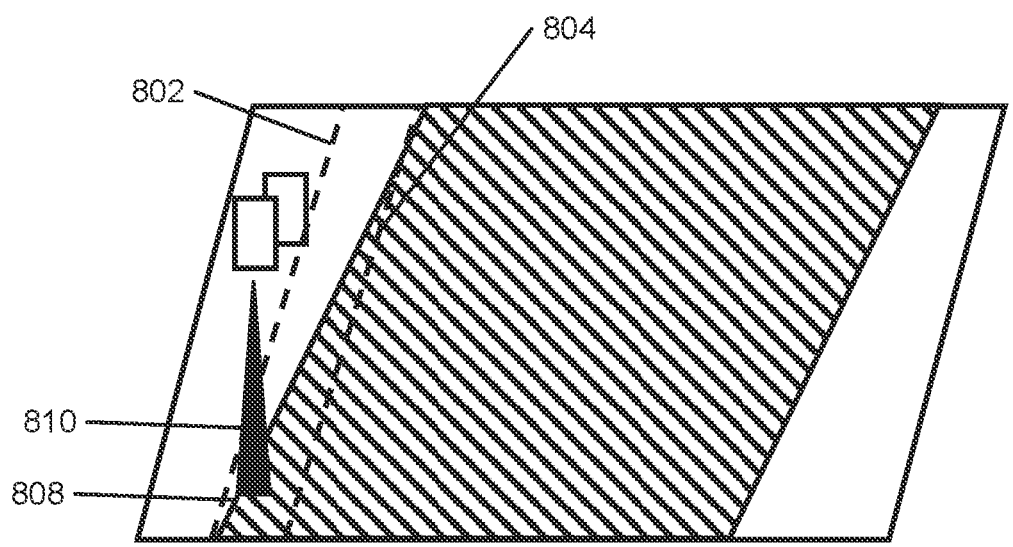

Two operational states of the apparatus are conceptually illustrated in FIGS. 8A and 8B, which show a detail of the substrate. As shown in FIG. 8A, when the coating apparatus is over a nongrating-supporting region 800 (located in the upper region of the strip bounded by the edges 802, 804), the second spray module is activated, and the first spray module is deactivated so that a layer of monomer 806 is sprayed onto the substrate. As shown in FIG. 8B, when the coating apparatus is over a substantially grating-supporting region 808 (located in the lower region of the strip bounded by the edges 802, 804), the second spray module is deactivated, and the first spray module is activated so that a layer of liquid crystal and monomer mixture 810 is sprayed onto the substrate.

Although FIGS. 7A-8B illustrate specific applications and configurations of spraying mechanisms, spraying mechanisms and deposition mechanisms in general can be configured and utilized for a variety of applications. In many embodiments, the spraying mechanism is configured for printing gratings in which at least one of the material composition, birefringence, and thickness can be controlled using a coating apparatus having at least two selectable spray heads. In some embodiments, the deposition workcell provides an apparatus for depositing grating recording material optimized for the control of laser banding. In several embodiments, the deposition workcell provides an apparatus for depositing grating recording material optimized for the control of polarization non-uniformity. In some embodiments, the deposition workcell provides an apparatus for depositing grating recording material optimized for the control of polarization non-uniformity in association with an alignment control layer. In a number of embodiments, the deposition workcell can be configured for the deposition of additional layers such as beam splitting coatings and environmental protection layers. Additionally, although FIGS. 7A-8B discuss the capabilities of spraying nozzles, these capabilities can be implemented in other deposition mechanisms. For example, inkjet print heads can also be implemented to print different materials in grating and nongrating regions of the substrate.

Figure 9:
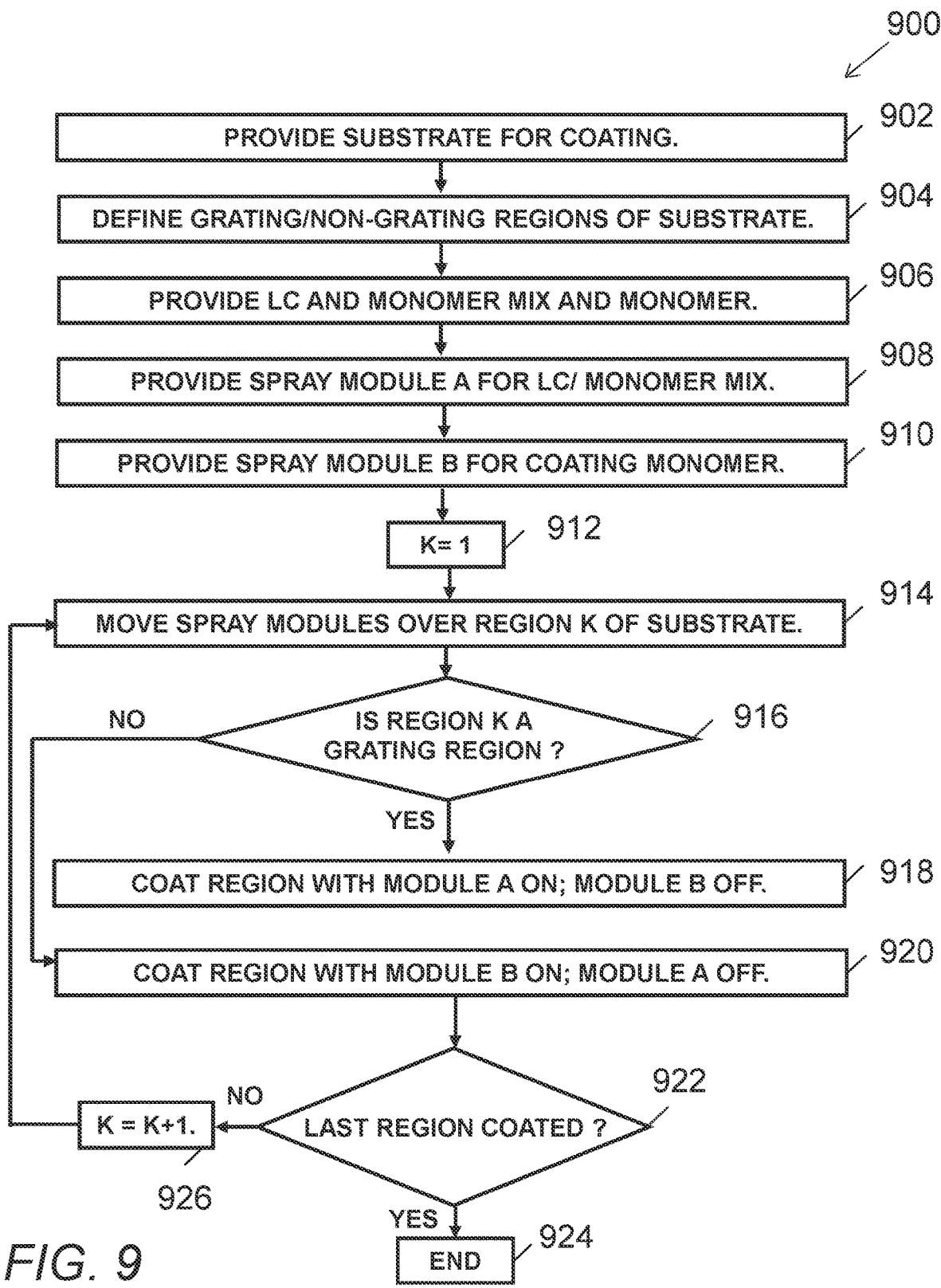
FIG. 9 is a flow chart conceptually illustrating a method of fabricating a holographic grating using a selective coating process in accordance with an embodiment of the invention.

FIG. 9 is a flow chart conceptually illustrating a method of fabricating a holographic grating using a selective coating process in accordance with an embodiment of the invention. Referring to FIG. 9, the method 900 includes providing (902) a transparent substrate for coating. A grating supporting and non-grating-supporting regions of the substrate can be defined (904). Depending on the specific application, gratings of various sizes and shapes can be defined. In some embodiments, a grating region supports an input, a fold, or an output grating. In many embodiments, the substrate has regions defined for gratings made of a combination of the aforementioned types of gratings. A first mixture for coating containing a liquid crystal and monomer and a second mixture for coating containing a monomer can be provided (906). A first spray head can be provided (908) for coating the first mixture onto the substrate. A second spray head can be provided (910) for coating the second mixture. The first and second spray heads integrated together can be considered a coating apparatus. The coating apparatus can be set (912) to its starting position (k=1). The coating apparatus can be moved (914) to the current position over the substrate. A decision can be made (916) on whether the current coating apparatus is positioned over a grating supporting region or a non-grating-supporting region. If the coating apparatus is over a grating region, the first spray head can be activated and the second spray head can be deactivated (918). If the coating module is over a grating-supporting region, the first spray head can be deactivated and the second spray head can be activated (920). A decision can be made (922) regarding the coating status. If all specified regions have been coated, the process can be terminated (924). If the specified regions have not all been coated, the next region (increment k) to be coated can be selected (926) and the deposition steps can be repeated.

Figure 10:
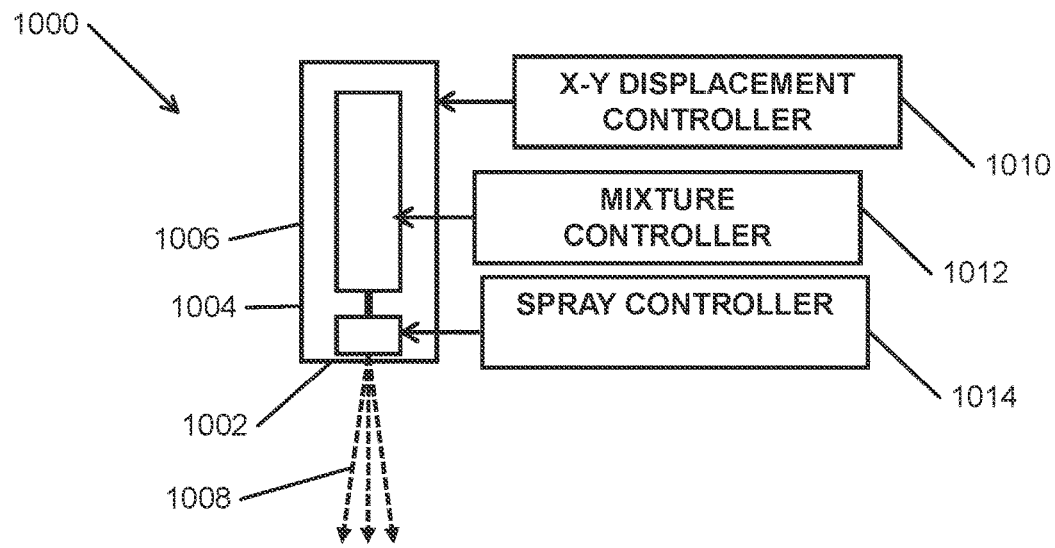
FIG. 10 conceptually illustrates a deposition head for providing predefined grating characteristics within grating regions in accordance with an embodiment of the invention.

Although FIG. 9 illustrates a specific method for depositing different materials over a substrate, the deposition mechanism can be configured to produce a film of material having characteristics that can vary spatially and across regions. FIG. 10 conceptually illustrates a deposition head for providing predefined grating characteristics within grating regions in accordance with an embodiment of the invention. Referring to FIG. 10, the deposition head 1000 includes a first spray module 1002 fed via pipe 1004 from a reservoir 1006 containing a mixture of at least one of a liquid crystal and a monomer, which is dispersed into the spray jet 1008 by the spray module 1002 for coating a transparent substrate. The substrate has predefined regions for supporting gratings. There is also provided an X-Y displacement controller 1010 for traversing the spray module across the substrate and a means for controlling the spray characteristics from the module over each grating region to deposit a film that provides a predefined grating characteristic within the grating region following holographic exposure. The holographic exposure may be carried out using any current holographic process, include any of the processes disclosed in the reference documents. In the illustrative embodiment, the deposition head 1000 further includes a mixture controller 1012 for controlling one or more of the temperature, dilution and relative concentrations of chemical components of the mixture. The deposition head 1000 can also include a spray controller 1014 for controlling one or more of the spray angle relative to the substrate, the spray divergence angle, and the durations of the spray on and off states. In several embodiments, the predefined grating characteristic includes one or more of refractive index modulation, refractive index, birefringence, liquid crystal director alignment, and grating layer thickness. As can readily be appreciated, deposition heads can be implemented and configured in many different ways. In many embodiments, any combination and subset of the X-Y displacement controller, mixture controller, and spray controller can be utilized. In some embodiments, additional controllers are utilized to configure the spraying mechanism and the material deposited.

Figure 11:
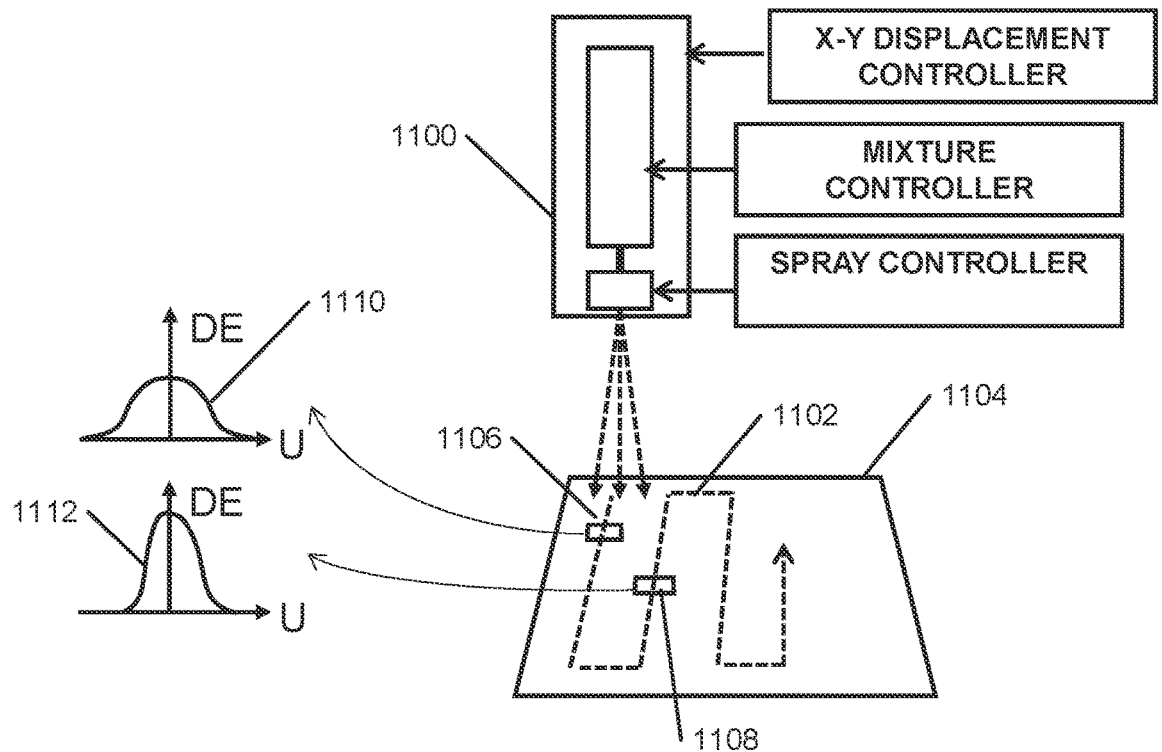
FIG. 11 conceptually illustrates operation of a deposition head for depositing material having regions with predefined grating characteristics in accordance with an embodiment of the invention.

FIG. 11 conceptually illustrates operation of a deposition head for depositing material having regions with predefined grating characteristics in accordance with an embodiment of the invention. As discussed above, the deposition head can be configured to deposit material having a spatial variation across the grating region of one or more of refractive index modulation, refractive index, birefringence, liquid crystal director alignment and grating layer thickness. As shown in FIG. 11, the spray module 1100 follows a spraying path 1102 across the substrate 1104. The spray can be dynamically controlled during transit along the path 1102 to vary the predefined grating characteristics in areas of the predefined grating regions such as 1106, 1108, for example. In some embodiments, the deposition mechanism provides, after exposure, a grating with a spatially varying diffraction efficiency. For example, referring again to FIG. 11, the coating areas 1106, 1108 (after holographic exposure)

exhibit diffraction efficiency (DE) versus angle (U) characteristics represented by the curves 1110, 1112 respectively.

Figure 12:
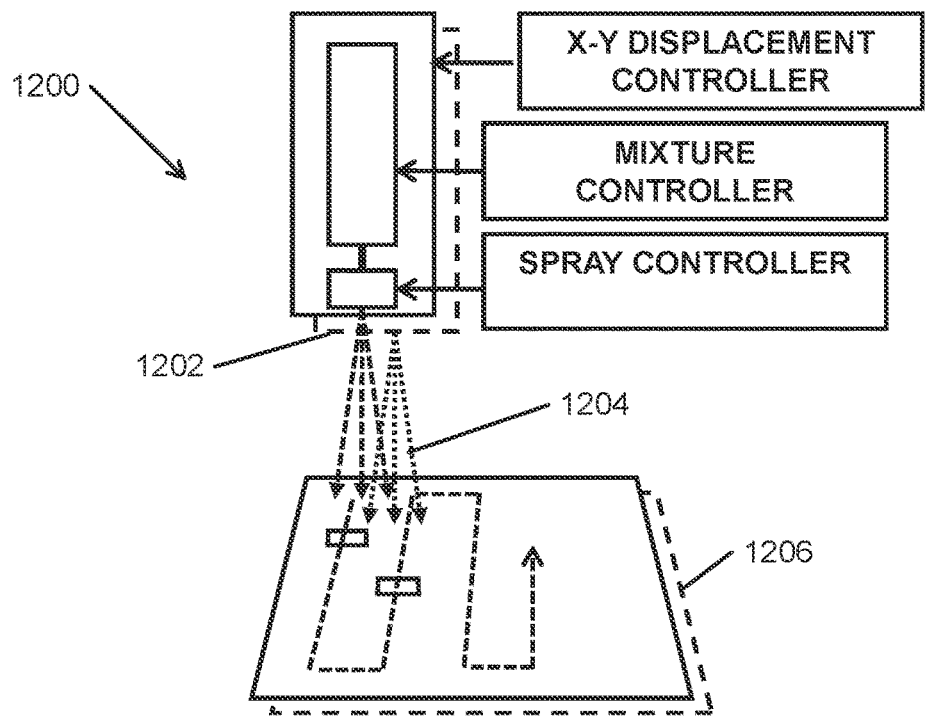
FIG. 12 conceptually illustrates a deposition mechanism for depositing two grating layers in accordance with an embodiment of the invention.

FIG. 12 conceptually illustrates a deposition mechanism for depositing two grating layers in accordance with an embodiment of the invention. As shown, the system 1200 is similar to that of FIG. 11 but further includes a second spray module 1202 providing a jet 1204 for coating the second grating layer 1206. In many embodiments, the grating layers are coated using different mixture compositions. In some embodiments, similar to the one of FIG. 7A, the system includes a first spray module connected to a first reservoir containing a first mixture that includes at least one of a first liquid crystal and a first monomer and a second spray module connected to a second reservoir containing a second mixture that includes at least one of a second liquid crystal and a second monomer.

Figure 13:
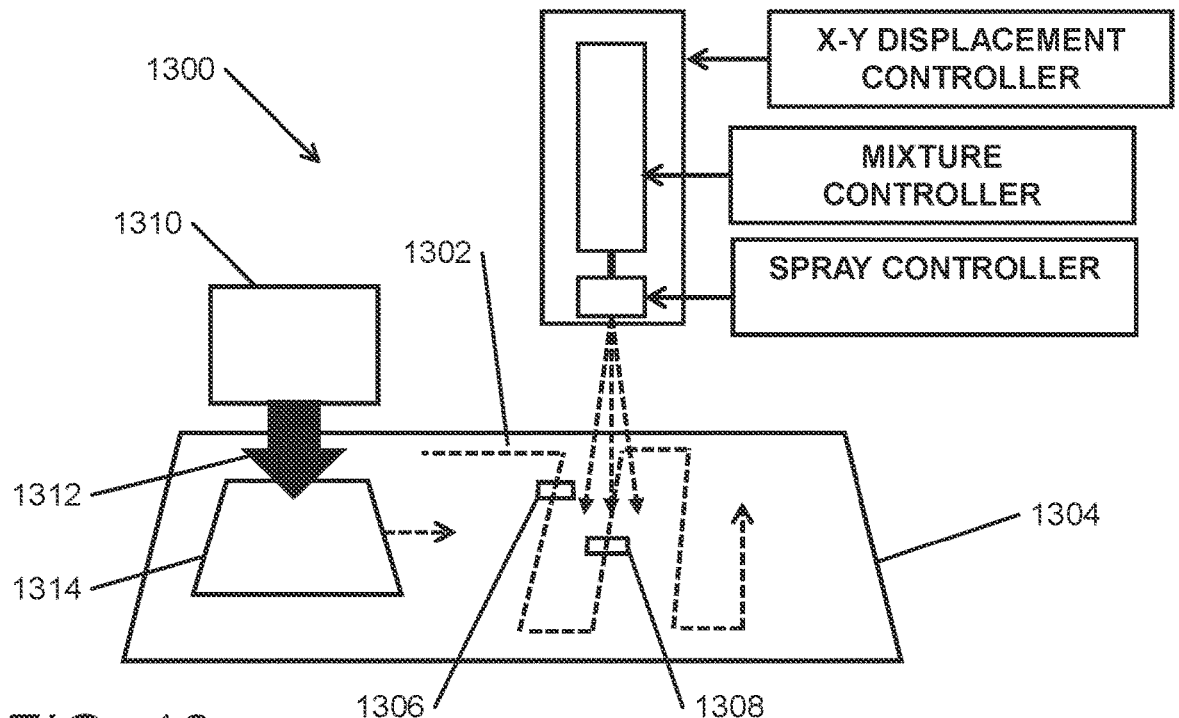
FIG. 13 conceptually illustrates a system for depositing a grating layer of material and for holographically exposing the layer in accordance with an embodiment of the invention.

FIG. 13 conceptually illustrates a system for depositing a grating layer of material and for holographically exposing the layer using recording beams with on and off states synchronized with the coating module. As shown, the system 1300 includes a coating apparatus similar to that of FIG. 12 following a spraying path 1302 across the substrate 1304 providing predefined grating regions 1306, 1308. While the coating process is taking place, a holographic exposure apparatus 1310, which provides a recording beam 1312, can expose coated predefined grating regions 1314. In many embodiments, the holographic exposure apparatus is based on a master grating which contact copies the required grating into the predefined grating region.

Figure 14:
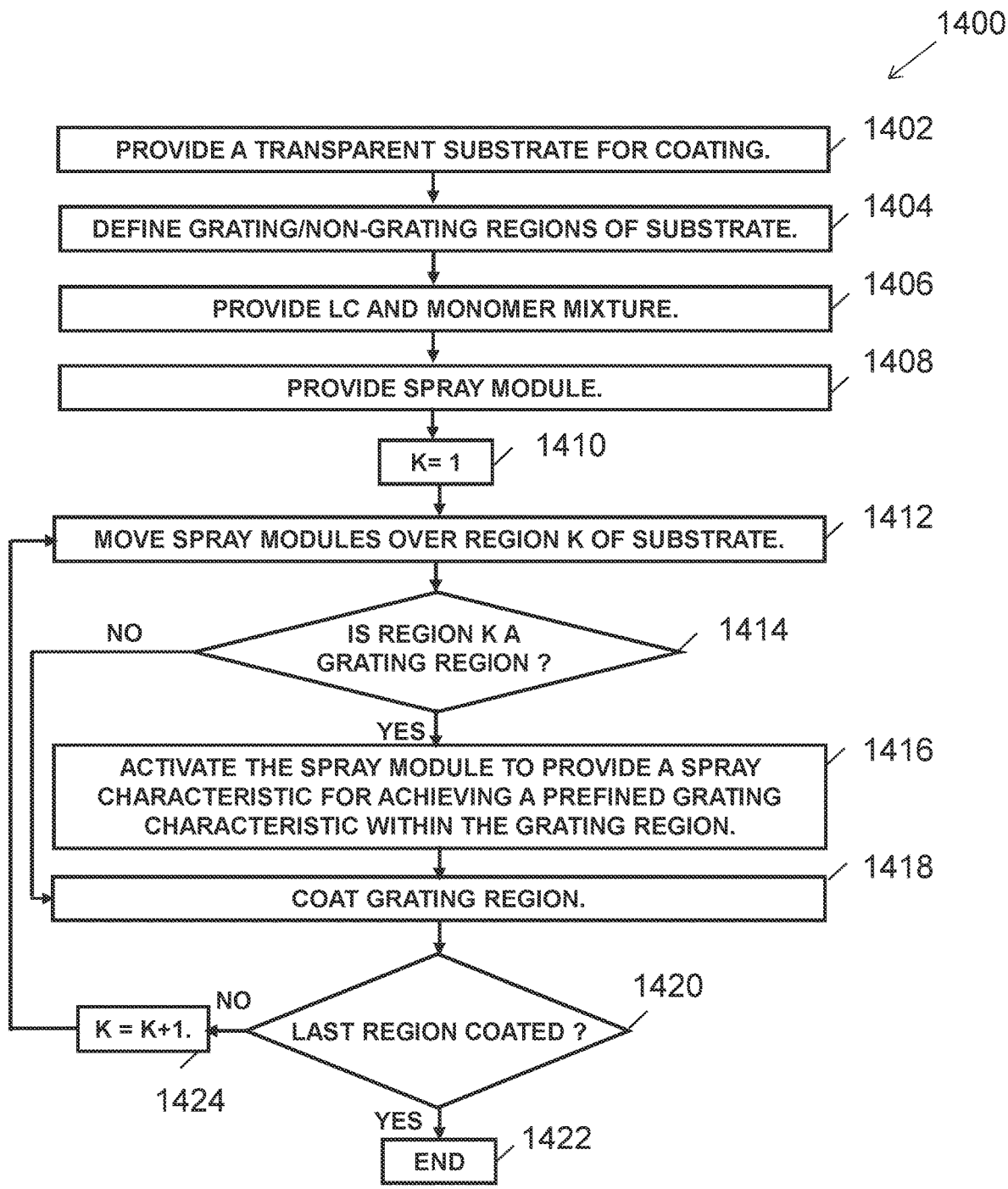
FIG. 14 is a flow chart conceptually illustrating a method of depositing a film of material with regions having pre-defined grating characteristics in accordance with an embodiment of the invention.

FIG. 14 is a flow chart conceptually illustrating a method of depositing a film of material with regions having predefined grating characteristics in accordance with an embodiment of the invention. As shown, the method 1400 includes providing (1402) a transparent substrate for coating. A grating supporting and non-grating-supporting regions of the substrate can be defined (1404). A mixture containing a liquid crystal and monomer can be provided (1406). In several embodiments, the material utilized includes one or more of a photoinitiator, nano-particles, low-functionality monomers, additives for reducing switching voltage, additives for reducing switching time, additives for increasing refractive index modulation and additives for reducing haze. A spray module for coating the mixture onto the substrate can be provided (1408). The spray module can be set (1410) to its starting position (k=1). The spray module can be moved (1412) to the current position over the substrate. A decision can be made (1414) on whether the current coating apparatus is positioned over a grating supporting region or a non-grating-supporting region. If the coating apparatus is over a grating region, the spray module can be activated (1416) to provide a spray characteristic for achieving a predefined grating characteristic within the grating region. The grating region can be coated (1418). A decision can be made (1420) regarding the coating status. If all specified regions have been coated, the process can be terminated (1422). If all specified regions have not been coated, the next region to be coated can be selected (1424) and the deposition steps can be repeated with k incremented.

Although FIGS. 10-14 illustrate specific implementations and methods of depositing material with regions having predefined grating characteristics, any of a variety of configurations can be implemented. For example, in many embodiments, multiple spray modules or deposition heads are utilized. Various predefined grating characteristics can be controlled and/or modulated depending on the specific application. Modulation of material composition utilizing more than one deposition head is discussed below in further detail.

As discussed above, deposition processes can be configured to deposit optical recording material that varies spatially in component composition. Modulation of material composition can be implemented in many different ways. In a number of embodiments, an inkjet print head can be configured to modulate material composition by utilizing the various inkjet nozzles within the print head. By altering the composition on a "dot-by-dot" basis, the layer of optical recording material can be deposited such that it has a varying composition across the planar surface of the layer. Such a system can be implemented using a variety of apparatuses including but not limited to inkjet print heads. Similar to how color systems use a palette of only a few colors to produce a spectrum of millions of discrete color values, such as the CMYK system in printers or the additive RGB system in display applications, inkjet print heads in accordance with various embodiments of the invention can be configured to print optical recording materials with varying compositions using only a few reservoirs of different materials. Different types of inkjet print heads can have different precision levels and can print with different resolutions. In many embodiments, a 300 DPI ("dots per inch") inkjet print head is utilized. Depending on the precision level, discretization of varying compositions of a given number of materials can be determined across a given area. For example, given two types of materials to be printed and an inkjet print head with a precision level of 300 DPI, there are 90,001 possible discrete values of composition ratios of the two types of materials across a square inch for a given volume of printed material if each dot location can contain either one of the two types of materials. In some embodiments, each dot location can contain either one of the two types of materials or both materials. In several embodiments, more than one inkjet print head is configured to print a layer of optical recording material with a spatially varying composition. Although the printed dots for a two-material application are essentially a binary system, in practical applications, averaging the printed dots across an area can allow for discretization of a sliding scale of ratios of the two materials to be printed.

Figure 15:
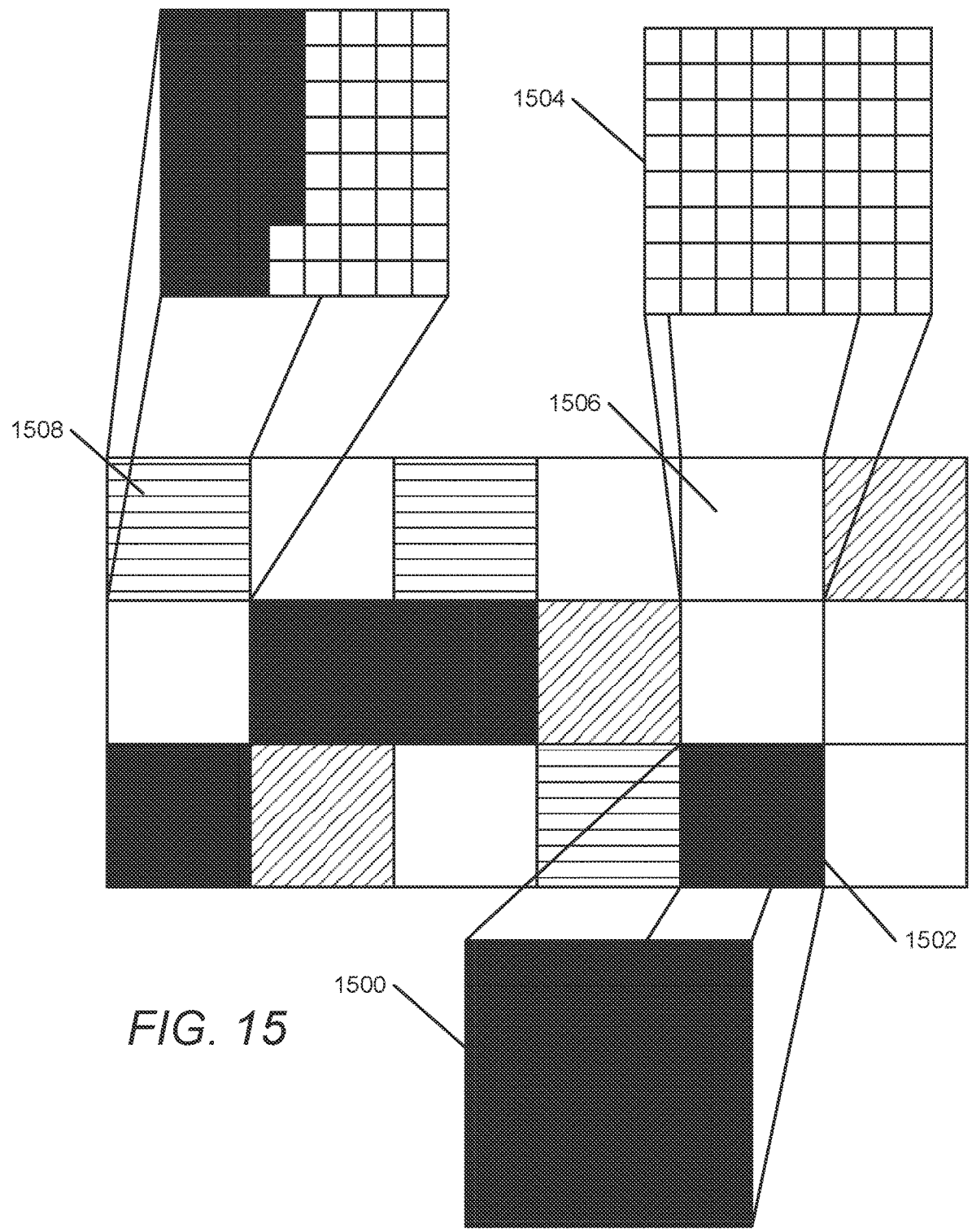
FIG. 15 conceptually illustrates an inkjet printing modulation scheme in accordance with an embodiment of the invention.

FIG. 15 conceptually illustrates an inkjet printing modulation scheme in accordance with an embodiment of the invention. As shown, eighteen discrete unit-squares are each capable of being printed with a varying ratios of two different types of materials. In the illustrated embodiment, the inkjet print head is capable of printing sixty-four dots within each of the eighteen unit squares. Each dot can be printed with either one of two types of material. A close up 1500 of unit square 1502 shows that all sixty-four dot locations within the unit square is printed with the first material. Similarly, a close up 1504 of unit square 1506 is printed completely with the second material. Unit square 1508 shows an intermediate composition where thirty out of the sixty-four dot locations are printed with the first material while the remaining dot locations are printed with the second material. As such, unit square 1508, as a whole, contains an intermediate level of concentrations from both materials. Utilizing this modulation scheme, any pattern of varying material characteristics can be achieved.

The amount of discrete levels of possible concentrations/ratios across a unit square is given by how many dot locations can be printed within the unit square. In the illustrative embodiment, sixty-four discrete dots can be printed within the unit square, which thus results in each unit square having a possibility of sixty-five different concentration combinations, ranging from 100% of the first material to 100% of the second material. Although FIG. 15 discusses the areas in terms of a unit square, the concepts are applicable to real units and can be determined by the precision level of the inkjet print head. Although specific examples of modulating the material composition of the printed layer are discussed, it can readily be appreciated that the concept of modulating material composition using inkjet print head can be expanded to use more than two different material reservoirs and can vary in precision levels, which largely depends on the type of print head used.

Varying the composition of the material printed can be advantageous for several reasons. For example, in many embodiments, varying the composition of the material during deposition can allow for a waveguide with gratings that have varying diffraction efficiencies across different areas of the gratings. In embodiments utilizing HPDLC mixtures, this can be achieved by modulating the relative concentration of liquid crystals in the HPDLC mixture during the printing process, which creates compositions that can produce gratings with varying diffraction efficiencies when exposed. In several embodiments, a first HPDLC mixture with a certain concentration of liquid crystals and a second HPDLC mixture that is liquid crystal-free are used as the printing palette in an inkjet print head for modulating the diffraction efficiencies of gratings that can be formed in the printed material. In such embodiments, discretization can be determined based on the precision of the inkjet print head. For example, if a 150 DPI inkjet print head is utilized, each square inch can be printed with 22,501 discrete levels of liquid crystal concentration. A discrete level can be given by the concentration/ratio of the materials printed across a certain area. In this example, the discrete levels range from no liquid crystal to the maximum concentration of liquid crystals in the first PDLC mixture.

The ability to vary the diffraction efficiency across a waveguide can be used for various purposes. Waveguides are typically designed such that light can be reflected many times between the two planar surfaces of a waveguide. These multiple reflections can allow for a light path to interact with a grating multiple times. In many embodiments, a waveguide cell can be printed with varying compositions such that the gratings formed from the optical recording material layer have varying diffraction efficiencies to compensate for the loss of light during interactions with the gratings to allow for a uniform output intensity. For example, in some waveguide applications, an output grating is configured to provide exit pupil expansion in one direction while also coupling light out of the waveguide. The output grating can be designed such that when light within the waveguide interact with the grating, only a percentage of the light is refracted out of the waveguide. The remaining portion continues in the same light path, which remains within TIR and continues to be reflected within the waveguide. Upon a second interaction with the same output grating again, another portion of light is refracted out of the waveguide. During each refraction, the amount of light still traveling within the waveguide decreases by the amount refracted out of the waveguide. As such, the portions refracted at each interaction gradually decreases in terms of total intensity. By varying the diffraction efficiencies of the grating such that it increases with propagation distance, the decrease in output intensity along each interaction can be compensated, allowing for a uniform output intensity.

Varying the diffraction efficiency can also be used to compensate for other attenuation of light within a waveguide. All objects have a degree of reflection and absorption. Light trapped in TIR within a waveguide are continually reflected between the two surfaces of the waveguide. Depending on the material that makes up the surfaces, portions of light can be absorbed by the material during each interaction. In many cases, this attenuation is small, but can be substantial across a large area where many reflections occur. In many embodiments, a waveguide cell can be printed with varying compositions such that the gratings formed from the optical recording material layer have varying diffraction efficiencies to compensate for the absorption of light from the substrates. Depending on the substrates, certain wavelengths can be more prone to absorption by the substrates. In a multi-layer waveguide design, each layer can be designed to couple in a certain range of wavelengths of light. Accordingly, the light coupled by these individual layers can be absorbed in different amounts by the substrates of the layers. For example, in a number of embodiments, the waveguide is made of a 3-layer stack to implement a color display, where each layer is designed for one of Red, Green, and Blue. In such embodiments, gratings within each of the waveguide layers can be formed to have varying diffraction efficiencies to perform color balance optimization by compensating for color imbalance due to loss of transmission of certain wavelengths of light.

In addition to varying the liquid crystal concentration within the material in order to vary the diffraction efficiency, another technique includes varying the thickness of the waveguide cell. This can be accomplished through the use of beads. In many embodiments, beads are dispersed throughout the optical recording material for structural support during the construction of the waveguide cell. In some embodiments, different sizes of beads are dispersed throughout the optical recording material. The beads can be dispersed in ascending order of sizes across one direction of the layer of optical recording material. When the waveguide cell is constructed through lamination, the substrates sandwich the optical recording material and, with structural support from the varying sizes of beads, create a wedge shaped layer of optical recording material. Beads of varying sizes can be dispersed similar to the modulation process described above. Additionally, modulating bead sizes can be combined with modulation of material compositions. In several embodiments, reservoirs of HPDLC materials each suspended with beads of different sizes are used to print a layer of HPDLC material with beads of varying sizes strategically dispersed to form a wedge shaped waveguide cell. In a number of embodiments, bead size modulation is combined with material composition modulation by providing an amount of reservoirs equal to the product of the number of different sizes of beads and the number of different materials used. For example, in one embodiment, the inkjet print head is configured to print varying concentrations of liquid crystal with two different bead sizes. In such an embodiment, four reservoirs can be prepared: a liquid crystal-free mixture-suspension with beads of a first size, a liquid crystal-free mixture-suspension with beads of a second size, a liquid crystal-rich mixture-suspension with beads of a first size, and a liquid crystal-rich mixture-suspension with beads of a second size.

Lamination Workcell

In many embodiments, the workcell cluster includes a lamination workcell for laminating the waveguide cell. After the deposition of optical recording material onto a substrate, a second substrate can be placed onto the optical recording material, creating a three-layer composite. Oftentimes, the second substrate will be made of the same material and in the same dimensions as the first substrate. In many embodiments, the deposition workcell is configured to place the second substrate onto the optical recording material. In other embodiments, the lamination workcell is configured to place the second substrate onto the optical recording material. The second substrate can be placed manually or through the use of mechanical arms and/or suction mechanisms. Once the second substrate is placed, the three-layer composite may be too unstable to handle manually and, thus, in many embodiments, a laminator is implemented to compact the composite.

The three-layer composite can be laminated in various ways. In many embodiments, a press is implemented to provide downward pressure onto the composite. In other embodiments, the lamination workcell is configured to feed the composite through a roller laminator. The compacted composite and adhesion properties of the optical recording material can result in a waveguide cell with enough stability to be handled manually. In some embodiments, the layer of optical recording material includes beads. Consequently, these relatively incompressible beads can define the height of the layer of optical recording material within the compacted composite. As discussed in the sections above, differently sized beads can be placed throughout the optical recording material. Upon lamination, the sizes of the beads can each determine the local thickness of the waveguide cell. By varying the sizes of the beads, a wedge shaped waveguide cell can be constructed. As can readily be appreciated, the lamination of the substrates-optical recording material layer composite can be achieved using lamination workcells that can be configured and implemented in many different ways. In several embodiments, the lamination workcell is a modular workcell within the workcell cluster. In other embodiments, the lamination workcell is simply a laminator implemented within the deposition workcell, such as the one shown in FIGS. 3A and 3B.

Although specific systems and methods for manufacturing waveguide cells are discussed above, many different configurations can be implemented in accordance with many different embodiments of the invention. It is therefore to be understood that the present invention can be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for manufacturing waveguide cells, the method comprising:
   providing a first substrate;
   determining a predefined grating characteristic;
   depositing a layer of optical recording material onto the first substrate using at least one deposition head; and
   holographically exposing the layer of optical recording material on the first substrate, wherein the optical recording material deposited over the grating region is formulated to achieve the predefined grating characteristic after holographic exposure.

2. The method of claim 1, further comprising:
   providing a second substrate;
   placing the second substrate onto the deposited layer of optical recording material; and
   laminating the first substrate, the layer of optical recording material, and the second substrate.

3. The method of claim 1, wherein depositing the layer of optical recording material comprises:
   providing a first mixture of optical recording material;
   providing a second mixture of optical recording material; and
   depositing the first and second mixtures of optical recording material onto the first substrate in a predetermined pattern using the at least one deposition head.

4. The method of claim 3, wherein:
   the first mixture of optical recording material comprises a first bead; and
   the second mixture of optical recording material comprises a second bead that is a different size from the first bead.

5. The method of claim 3, wherein the first mixture of optical recording material has a different percentage by weight of liquid crystals than the second mixture of optical recording material.

6. The method of claim 3, further comprising defining a grating region and a nongrating region on the first substrate, wherein:
   the first mixture of optical recording material comprises a liquid crystal and a monomer;
   the second mixture of optical recording material comprises a monomer; and
   depositing the first and second mixtures of optical recording material onto the first substrate in the predetermined pattern comprises:
      depositing the first mixture of optical recording material over the grating region; and
      depositing the second mixture of optical recording material over the nongrating region.

7. The method of claim 3, wherein the first mixture of optical recording material is a polymer dispersed liquid crystal mixture comprising:
   a monomer;
   a liquid crystal;
   a photoinitiator dye; and
   a coinitiator.

8. The method of claim 7, wherein the polymer dispersed liquid crystal mixture comprises an additive selected from the group consisting of: a photoinitiator, nano particles, low-functionality monomers, additives for reducing switching voltage, additives for reducing switching time, additives for increasing refractive index modulation, and additives for reducing haze.

9. The method of claim 1, wherein the at least one deposition head comprises at least one inkjet print head.

10. The method of claim 9, wherein depositing the layer of optical recording material comprises:
   providing a first mixture of optical recording material;
   providing a second mixture of optical recording material;
   printing a first dot of the first mixture of optical recording material using the at least one inkjet print head; and
   printing a second dot of the second mixture of optical recording material adjacent to the first dot using the at least one inkjet print head.

11. The method of claim 9, wherein:
   the at least one inkjet print head comprises a first inkjet print head and a second inkjet print head; and
   depositing the layer of optical recording material comprises:
      providing a first mixture of optical recording material;
      providing a second mixture of optical recording material;

printing the first mixture of optical recording material onto the first substrate using the first inkjet print head; and printing the second mixture of optical recording material onto the first substrate using the second inkjet print head.

12. The method of claim 1, wherein the predefined grating characteristic comprises a characteristic selected from the group consisting of: refractive index modulation, refractive index, birefringence, liquid crystal director alignment, and grating layer thickness.

13. The method of claim 1, wherein the predefined grating characteristic comprises a spatial variation of a characteristic selected from the group consisting of: refractive index modulation, refractive index, birefringence, liquid crystal director alignment, and grating layer thickness.

14. The method of claim 1, wherein the predefined grating characteristic results in a grating after exposure, the grating having a spatially varying diffraction efficiency.

* * * * *